(12) United States Patent
Oh

(10) Patent No.: US 11,418,564 B2
(45) Date of Patent: Aug. 16, 2022

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/228,208

(22) Filed: Apr. 12, 2021

(65) Prior Publication Data

US 2022/0060529 A1 Feb. 24, 2022

Related U.S. Application Data

(60) Provisional application No. 63/042,530, filed on Jun. 22, 2020, provisional application No. 63/008,804, filed on Apr. 12, 2020.

(51) Int. Cl.
*H04L 65/60* (2022.01)
*G02B 27/01* (2006.01)
*G06T 9/00* (2006.01)
*H04L 67/06* (2022.01)

(52) U.S. Cl.
CPC ........ *H04L 65/601* (2013.01); *G02B 27/0101* (2013.01); *G06T 9/001* (2013.01); *H04L 65/607* (2013.01); *H04L 67/06* (2013.01)

(58) Field of Classification Search
CPC ..... H04L 65/607; H04L 65/601; H04L 67/06; G06T 9/001; G02B 27/0101
See application file for complete search history.

(56) References Cited

U.S. PATENT DOCUMENTS

| | | | |
|---|---|---|---|
| 10,964,089 B1* | 3/2021 | Graziosi | G06T 7/75 |
| 11,282,239 B2* | 3/2022 | Han | H04N 19/96 |
| 2019/0087978 A1* | 3/2019 | Tourapis | G06T 9/00 |
| 2019/0087979 A1* | 3/2019 | Mammou | G06T 9/001 |
| 2020/0304834 A1* | 9/2020 | Wang | H04N 21/845 |
| 2021/0006833 A1* | 1/2021 | Tourapis | H04N 21/8193 |
| 2021/0092430 A1* | 3/2021 | Schwarz | G06T 9/001 |

(Continued)

FOREIGN PATENT DOCUMENTS

KR 20200005438 1/2020
KR 20200038170 4/2020

(Continued)

OTHER PUBLICATIONS

International Search Report in International Appln. No. PCT/KR2021/004554, dated Jul. 28, 2021, 18 pages (with English translation).

*Primary Examiner* — Dhairya A Patel
(74) *Attorney, Agent, or Firm* — Fish & Richardson P.C.

(57) ABSTRACT

Disclosed herein are a transmitting method and a receiving method of point cloud data. The transmitting method may include encoding point cloud data, encapsulating a bitstream including the encoded point cloud data into a file, and transmitting the file, the bitstream is stored in one or more tracks of the file, the file further includes signaling data, the signaling data includes at least one parameter set and viewport-related information, and the viewport-related information includes at least first viewport information or second viewport information.

12 Claims, 64 Drawing Sheets

(56) References Cited

U.S. PATENT DOCUMENTS

| | | | | |
|---|---|---|---|---|
| 2021/0110577 | A1* | 4/2021 | Graziosi | H04N 19/597 |
| 2021/0218947 | A1* | 7/2021 | Oh | H04N 21/85406 |
| 2021/0218999 | A1* | 7/2021 | Schwarz | H04N 19/70 |
| 2021/0281879 | A1* | 9/2021 | Roimela | G06T 15/08 |
| 2021/0354728 | A1* | 11/2021 | Kaku | B60W 60/00184 |

FOREIGN PATENT DOCUMENTS

| | | | | |
|---|---|---|---|---|
| WO | WO2019079032 | | 4/2019 | |
| WO | WO2019135024 | | 7/2019 | |
| WO | WO-2021050234 | A1 * | 3/2021 | H04L 65/601 |

* cited by examiner

FIG. 2
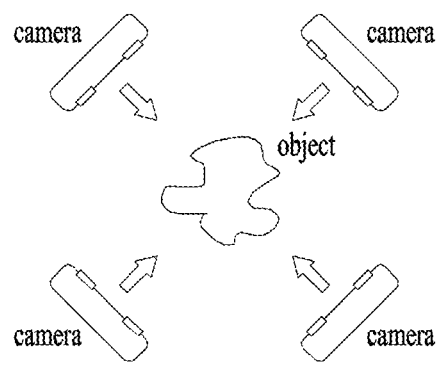
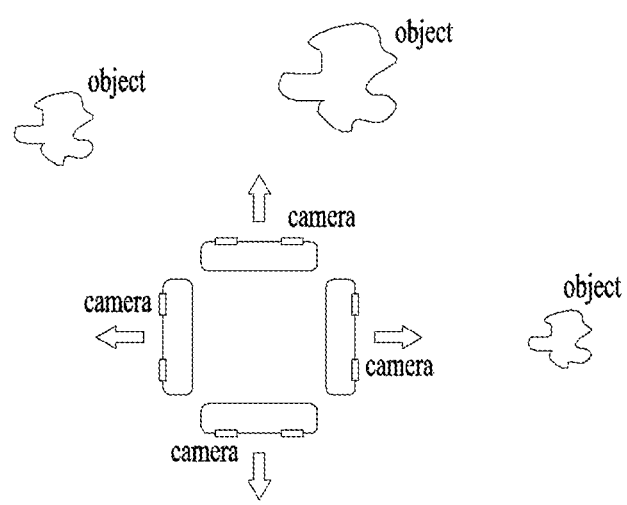

FIG. 3
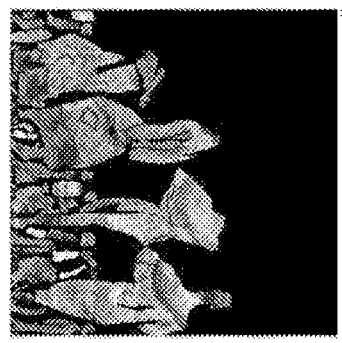
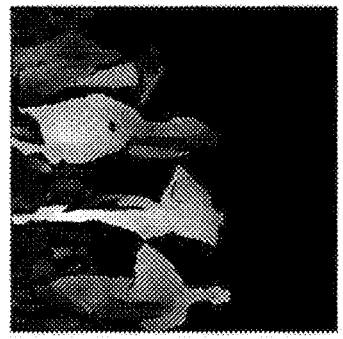
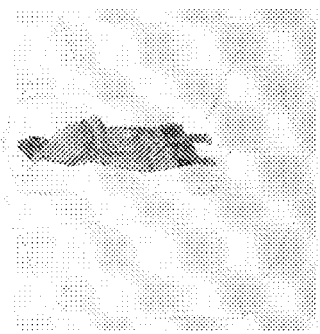

FIG. 26

| sample_stream_vpcc_header ( ) { | Descriptor |
|---|---|
| ssvh_unit_size_precision_bytes_minus1 | u(3) |
| ssvh_reserved_zero_5bits | u(5) |
| } | |

FIG. 27

| sample_stream_vpcc_unit( ) { | Descriptor |
|---|---|
| ssvu_vpcc_unit_size | u(v) |
| vpcc_unit( ssvu_vpcc_unit_size ) | |
| } | |

FIG. 28

| vpcc_unit( numBytesInVPCCUnit) { | Descriptor |
|---|---|
|     vpcc_unit_header( ) | |
|     vpcc_unit_payload( ) | |
|     while( more_data_in_vpcc_unit ) | |
|         trailing_zero_8bits /* equal to 0x00 */ | u(8) |
| } | |

FIG. 29

| vpcc_unit_header( ) { | Descriptor |
|---|---|
| vuh_unit_type | u(5) |
| if( vuh_unit_type == VPCC_AVD \|\| vuh_unit_type == VPCC_GVD \|\|         ( vuh_unit_type == VPCC_AVD \|\| vuh_unit_type == VPCC_AD ) { | |
| vuh_vpcc_parameter_set_id | u(4) |
| vuh_atlas_id | u(6) |
| } | |
| if( vuh_unit_type == VPCC_AVD ) { | |
| vuh_attribute_index | u(7) |
| vuh_attribute_dimension_index | u(5) |
| vuh_map_index | u(4) |
| vuh_raw_video_flag | u(1) |
| } else if( vuh_unit_type == VPCC_GVD ) { | |
| vuh_map_index | u(4) |
| vuh_raw_video_flag | u(1) |
| vuh_reserved_zero_12bits | u(12) |
| } else if( vuh_unit_type == VPCC_OVD \|\| vuh_unit_type == VPCC_AD ) | |
| vuh_reserved_zero_17bits | i(17) |
| else | |
| vuh_reserved_zero_27bits | i(27) |
| } | |

FIG. 30

| vuh_unit_type | Identifier | V-PCC Unit Type | Description |
|---|---|---|---|
| 0 | V-PCC_VPS | V-PCC parameter set | V-PCC level parameters |
| 1 | V-PCC_AD | Atlas data | Atlas information |
| 2 | V-PCC_OVD | Occupancy Video Data | Occupancy information |
| 3 | V-PCC_GVD | Geometry Video Data | Geometry information |
| 4 | V-PCC_AVD | attribute Video Data | Attribute information |
| 5...31 | V-PCC_RSVD | Reserved | - |

FIG. 31

| vpcc_unit_payload( ) { | Descriptor |
|---|---|
|    if( vuh_unit_type == VPCC_VPS ) | |
|       vpcc_parameter_set( ) | |
|    else if( vuh_unit_type == VPCC_AD ) | |
|       atlas_sub_bitstream( ) | |
|    else if( vuh_unit_type == VPCC_OVD \|\| <br>       vuh_unit_type == VPCC_GVD \|\| <br>       vuh_unit_type == VPCC_AVD ) | |
|       video_sub_bitstream( ) | |
| } | |

FIG. 32

| | Descriptor |
|---|---|
| vpcc_parameter_set( ) { | |
|    profile_tier_level() | |
|    vps_vpcc_parameter_set_id | u(4) |
|    vps_atlas_count_minus1 | u(6) |
|    for( j = 0; j < vps_atlas_count_minus1 + 1; j++ ) { | |
|       vps_frame_width[ j ] | u(16) |
|       vps_frame_height[ j ] | u(16) |
|       vps_map_count_minus1[ j ] | u(4) |
|       if( vps_map_count_minus1[ j ] > 0 ) | |
|          vps_multiple_map_streams_present_flag[ j ] | u(1) |
|       vps_map_absolute_coding_enabled_flag[ j ][ 0 ] = 1 | |
|       for( i = 1; i <= vps_map_count_minus1[ j ]; i++ ) { | |
|          if( vps_multiple_map_streams_present_flag[ j ] ) | |
|             vps_map_absolute_coding_enabled_flag[ j ][ i ] | u(1) |
|          else | |
|             vps_map_absolute_coding_enabled_flag[ j ][ i ] = 1 | |
|          if( vps_map_absolute_coding_enabled_flag[ j ][ i ] == 0 ) { | |
|             if( i > 0 ) | |
|                vps_map_predictor_index_diff[ j ][ i ] | ue(v) |
|             else | |
|                vps_map_predictor_index_diff[ j ][ i ] = 0 | |
|          } | |
|       } | |
|       vps_auxiliary_video_present_flag[ j ] | u(1) |
|       occupancy_information( j ) | |
|       geometry_information( j ) | |
|       attribute_information( j ) | |
|    } | |
|    vps_extension_present_flag | u(1) |
|    if(vps_extension_present_flag) { | |
|       vps_extension_length_minus1 | ue(v) |
|       for( j = 0; j < vps_extension_length_minus1 + 1; j++) { | |
|          vps_extension_data_byte | u(8) |
|       } | |
|    } | |
|    byte_alignment( ) | |
| } | |

FIG. 35

| sample_stream_nal_header( ) { | Descriptor |
|---|---|
| ssnh_unit_size_precision_bytes_minus1 | u(3) |
| ssnh_reserved_zero_5bits | u(5) |
| } | |

FIG. 36

| sample_stream_nal_unit( ) { | Descriptor |
|---|---|
| ssnu_nal_unit_size | u(v) |
| nal_unit( ssnu_nal_unit_size ) | |
| } | |

FIG. 37

| nal_unit( NumBytesInNalUnit ) { | Descriptor |
|---|---|
|    nal_unit_header( ) | |
|    NumBytesInRbsp = 0 | |
|    for( i = 2; i < NumBytesInNalUnit; i++ ) | |
|       rbsp_byte[ NumBytesInRbsp++ ] | b(8) |
| } | |

FIG. 38

| nal_unit_header( ) { | Descriptor |
|---|---|
| nal_forbidden_zero_bit | f(1) |
| nal_unit_type | u(6) |
| nal_layer_id | u(6) |
| nal_temporal_id_plus1 | u(3) |
| } | |

FIG. 39

| nal_unit_type | Name of nal_unit_type | Content of NAL unit and RBSP syntax structure | NAL unit type class |
|---|---|---|---|
| 0 | NAL_TRAIL | Coded tile group of a non-TSA, non STSA trailing atlas frame atlas_tile_group_layer_rbsp() | ACL |
| 1 | NAL_TSA | Coded tile group of a TSA atlas frame atlas_tile_group_layer_rbsp() | ACL |
| 2 | NAL_STSA | Coded tile group of a STSA atlas frame atlas_tile_group_layer_rbsp() | ACL |
| 3 | NAL_RADL | Coded tile group of a RADL atlas frame atlas_tile_group_layer_rbsp() | ACL |
| 4 | NAL_RASL | Coded tile group of a RASL atlas frame atlas_tile_group_layer_rbsp() | ACL |
| 5 | NAL_SKIP | Coded tile group of a skipped atlas frame atlas_tile_group_layer_rbsp() | ACL |
| 6..9 | NAL_RSV_ACL_6.. NAL_RSV_ACL_9 | Reserved non-IRAP ACL NAL unit types | ACL |
| 10 | NAL_BLA_W_LP | Coded tile group of a BLA atlas frame atlas_tile_group_layer_rbsp() | ACL |
| 11 | NAL_BLA_W_RADL | | ACL |
| 12 | NAL_BLA_N_LP | | ACL |
| 13 | NAL_GBLA_W_LP | Coded tile group of a GBLA atlas frame atlas_tile_group_layer_rbsp() | ACL |
| 14 | NAL_GBLA_W_RADL | | ACL |
| 15 | NAL_GBLA_N_LP | | ACL |
| 16 | NAL_IDR_W_RADL | Coded tile group of an IDR atlas frame atlas_tile_group_layer_rbsp() | ACL |
| 17 | NAL_IDR_N_LP | | ACL |
| 18 | NAL_GIDR_W_RADL | Coded tile group of a GIDR atlas frame atlas_tile_group_layer_rbsp() | ACL |
| 19 | NAL_GIDR_N_LP | | ACL |
| 20 | NAL_CRA | Coded tile group of a CRA atlas frame atlas_tile_group_layer_rbsp() | ACL |
| 21 | NAL_GCRA | Coded tile group of a GCRA atlas frame atlas_tile_group_layer_rbsp() | ACL |
| 22 | NAL_IRAP_ACL_22 | Reserved IRAP ACL NAL unit types | ACL |
| 23 | NAL_IRAP_ACL_23 | | ACL |
| 24..31 | NAL_RSV_ACL_24.. NAL_RSV_ACL_31 | Reserved non-IRAP ACL NAL unit types | ACL |
| 32 | NAL_ASPS | Atlas sequence parameter set atlas_sequence_parameter_set_rbsp() | non-ACL |
| 33 | NAL_AFPS | Atlas frame parameter set atlas_frame_parameter_set_rbsp() | non-ACL |
| 34 | NAL_AUD | Access unit delimiter access_unit_delimiter_rbsp() | non-ACL |
| 35 | NAL_VPCC_AUD | V-PCC access unit delimiter access_unit_delimiter_rbsp() | non-ACL |
| 36 | NAL_EOS | End of sequence end_of_seq_rbsp() | non-ACL |
| 37 | NAL_EOB | End of bitstream end_of_atlas_sub_bitstream_rbsp() | non-ACL |
| 38 | NAL_FD | Filler filler_data_rbsp() | non-ACL |
| 39 | NAL_PREFIX_NSEI | Non-essential supplemental enhancement information sei_rbsp() | non-ACL |
| 40 | NAL_SUFFIX_NSEI | | non-ACL |
| 41 | NAL_PREFIX_ESEI | Essential supplemental enhancement information sei_rbsp() | non-ACL |
| 42 | NAL_SUFFIX_ESEI | | non-ACL |
| 43 | NAL_AAPS | Atlas adaptation parameter set atlas_adaptation_parameter_set_rbsp() | non-ACL |
| 44..47 | NAL_RSV_NACL_44 NAL_RSV_NACL_47 | Reserved non-ACL NAL unit types | non-ACL |
| 48..63 | NAL_UNSPEC_48 NAL_UNSPEC_63 | Unspecified non-ACL NAL unit types | non-ACL |

FIG. 40

| | Descriptor |
|---|---|
| atlas_sequence_parameter_set_rbsp( ) { | |
|   asps_atlas_sequence_parameter_set_id | ue(v) |
|   asps_frame_width | u(16) |
|   asps_frame_height | u(16) |
|   asps_log2_patch_packing_block_size | u(3) |
|   asps_log2_max_atlas_frame_order_cnt_lsb_minus4 | ue(v) |
|   asps_max_dec_atlas_frame_buffering_minus1 | ue(v) |
|   asps_long_term_ref_atlas_frames_flag | u(1) |
|   asps_num_ref_atlas_frame_lists_in_asps | ue(v) |
|   for( i = 0; i < asps_num_ref_atlas_frame_lists_in_asps; i++) | |
|     ref_list_struct( i ) | |
|   asps_use_eight_orientations_flag | u(1) |
|   asps_extended_projection_enabled_flag | u(1) |
|   asps_normal_axis_limits_quantization_enabled_flag | u(1) |
|   asps_normal_axis_max_delta_value_enabled_flag | u(1) |
|   asps_remove_duplicate_point_enabled_flag | u(1) |
|   asps_pixel_deinterleaving_enabled_flag | u(1) |
|   asps_patch_precedence_order_flag | u(1) |
|   asps_patch_size_quantizer_present_flag | u(1) |
|   asps_raw_patch_enabled_flag | u(1) |
|   asps_eom_patch_enabled_flag | u(1) |
|   if (asps_raw_patch_enabled_flag || asps_eom_patch_enabled_flag ) | |
|     asps_auxiliary_video_enabled_flag | u(1) |
|   asps_point_local_reconstruction_enabled_flag | u(1) |
|   asps_map_count_minus1 | u(4) |
|   if( asps_pixel_deinterleaving_enabled_flag) | |
|     for( j = 0; j < = asps_map_count_minus1; j++) | |
|       asps_pixel_deinterleaving_map_flag[j] | u(1) |
|   if( asps_eom_patch_enabled_flag && asps_map_count_minus1 = = 0 ) | |
|     asps_eom_fix_bit_count_minus1 | u(4) |
|   if( asps_point_local_reconstruction_enabled_flag ) | |
|     asps_point_local_reconstruction_information(asps_map_count_minus1) | |
|   if( asps_pixel_deinterleaving_enabled_flag || asps_point_local_reconstruction_enabled_flag ) | |
|     asps_surface_thickness_minus1 | u(8) |
|   asps_vui_parameters_present_flag | u(1) |
|   if( asps_vui_parameters_present_flag ) | |
|     vui_parameters( ) | |
|   asps_extension_flag | u(1) |
|   if( asps_extension_flag) | |
|     while( more_rbsp_data( )) | |
|       asps_extension_data_flag | u(1) |
|   rbsp_trailing_bits( ) | |
| } | |

FIG. 41

| atlas_frame_parameter_set_rbsp( ) { | Descriptor |
|---|---|
| afps_atlas_frame_parameter_set_id | ue(v) |
| afps_atlas_sequence_parameter_set_id | ue(v) |
| atlas_frame_tile_information( ) | |
| afps_output_flag_present_flag | u(1) |
| afps_num_ref_idx_default_active_minus1 | ue(v) |
| afps_additional_lt_afoc_lsb_len | ue(v) |
| afps_3d_pos_x_bit_count_minus1 | u(5) |
| afps_3d_pos_y_bit_count_minus1 | u(5) |
| afps_lod_mode_enabled_flag | u(1) |
| afps_override_eom_for_depth_flag | u(1) |
| if( afps_override_eom_for_depth_flag ) { | |
| afps_eom_number_of_patch_bit_count_minus1 | u(4) |
| afps_eom_max_bit_count_minus1 | u(4) |
| } | |
| afps_raw_3d_pos_bit_count_explicit_mode_flag | u(1) |
| afps_fixed_camera_model_flag | u(1) |
| afps_extension_flag | u(1) |
| if( afps_extension_flag ) | |
| while( more_rbsp_data( ) ) | |
| afps_extension_data_flag | u(1) |
| rbsp_trailing_bits( ) | |
| } | |

FIG. 42

| atlas_frame_tile_information( ) { | Descriptor |
|---|---|
|    afti_single_tile_in_atlas_frame_flag | u(1) |
|    if( !afti_single_tile_in_atlas_frame_flag ) { | |
|       afti_uniform_tile_spacing_flag | u(1) |
|       if( afti_uniform_tile_spacing_flag ) { | |
|          afti_tile_cols_width_minus1 | ue(v) |
|          afti_tile_rows_height_minus1 | ue(v) |
|       } else { | |
|          afti_num_tile_columns_minus1 | ue(v) |
|          afti_num_tile_rows_minus1 | ue(v) |
|          for( i = 0; i < afti_num_tile_columns_minus1; i++ ) | |
|             afti_tile_column_width_minus1[ i ] | ue(v) |
|          for( i = 0; i < afti_num_tile_rows_minus1; i++ ) | |
|             afti_tile_row_height_minus1[ i ] | ue(v) |
|       } | |
|       afti_single_tile_per_tile_group_flag | u(1) |
|       if( !afti_single_tile_per_tile_group_flag ) { | |
|       afti_num_tile_groups_in_atlas_frame_minus1 | ue(v) |
|       for( i = 0; i < afti_num_tile_groups_in_atlas_frame_minus1 + 1; i++ ) { | |
|          if( i > 0 ) | |
|             afti_top_left_tile_idx[ i ] | u(v) |
|             afti_bottom_right_tile_idx_delta[ i ] | u(v) |
|       } | |
|       } | |
|       afti_signalled_tile_group_id_flag | u(1) |
|       if( afti_signalled_tile_group_id_flag ) { | |
|       afti_signalled_tile_group_id_length_minus1 | ue(v) |
|       for( i = 0; i < afti_num_tile_groups_in_atlas_frame_minus1 + 1; i++ ) | |
|          afti_tile_group_id[ i ] | u(v) |
|       } | |
|    } | |
| } | |

FIG. 43

| atlas_adaptation_parameter_set_rbsp() { | Descriptor |
|---|---|
|     aaps_atlas_adaptation_parameter_set_id | ue(v) |
|     aaps_camera_parameters_present_flag | u(1) |
|     if( aaps_camera_parameters_present_flag ) | |
|         atlas_camera_parameters( ) | |
|     aaps_extension_flag | u(1) |
|     if( aaps_extension_flag ) | |
|         while( more_rbsp_data( ) ) | |
|             aaps_extension_data_flag | u(1) |
|     rbsp_trailing_bits( ) | |
| } | |

FIG. 44

| atlas_camera_parameters() { | Descriptor |
|---|---|
|     acp_camera_model | u(8) |
|     if( acp_camera_model == 1 ) { | |
|         acp_scale_enabled_flag | u(1) |
|         acp_offset_enabled_flag | u(1) |
|         acp_rotation_enabled_flag | u(1) |
|         if( acp_scale_enabled_flag ) | |
|             for( d = 0; d < 3; d++ ) | |
|                 acp_scale_on_axis[ d ] | u(32) |
|         if( acp_offset_enabled_flag ) | |
|             for( d = 0; d < 3; d++ ) | |
|                 acp_offset_on_axis[ d ] | i(32) |
|         if( acp_rotation_enabled_flag ) { | |
|             acp_rotation_qx | i(16) |
|             acp_rotation_qy | i(16) |
|             acp_rotation_qz | i(16) |
|         } | |
|     } | |
| } | |

FIG. 45

| acp_camera_model | Name of acp_camera_model |
|---|---|
| 0 | UNSPECIFIED |
| 1 | Orthographic camera model |
| 2 - 255 | RESERVED |

FIG. 46

| atlas_tile_group_layer_rbsp( ) { | Descriptor |
|---|---|
|     atlas_tile_group_header( ) | |
|     if( atgh_type != SKIP_TILE_GRP ) | |
|         atlas_tile_group_data_unit( ) | |
|     rbsp_trailing_bits( ) | |
| } | |

FIG. 47

| | Descriptor |
|---|---|
| atlas_tile_group_header( ) { | |
|   atgh_atlas_frame_parameter_set_id | ue(v) |
|   atgh_atlas_adaptation_parameter_set_id | ue(v) |
|   atgh_address | u(v) |
|   atgh_type | ue(v) |
|   if( afps_output_flag_present_flag ) | |
|     atgh_atlas_output_flag | u(1) |
|   atgh_atlas_frm_order_cnt_lsb | u(v) |
|   if( asps_num_ref_atlas_frame_lists_in_asps > 0 ) | |
|     atgh_ref_atlas_frame_list_sps_flag | u(1) |
|   if( atgh_ref_atlas_frame_list_sps_flag == 0) | |
|     ref_list_struct( asps_num_ref_atlas_frame_lists_in_asps ) | |
|   else if( asps_num_ref_atlas_frame_lists_in_asps > 1 ) | |
|     atgh_ref_atlas_frame_list_idx | u(v) |
|   for( j = 0; j < NumLtrAtlasFrmEntries; j++ ) { | |
|     atgh_additional_afoc_lsb_present_flag[ j ] | u(1) |
|     if( atgh_additional_afoc_lsb_present_flag[ j ] ) | |
|       atgh_additional_afoc_lsb_val[ j ] | u(v) |
|   } | |
|   if( atgh_type != SKIP_TILE_GRP ) { | |
|     if( asps_normal_axis_limits_quantization_enabled_flag ) { | |
|       atgh_pos_min_z_quantizer | u(5) |
|       if( asps_normal_axis_max_delta_value_enabled_flag ) | |
|         atgh_pos_delta_max_z_quantizer | u(5) |
|     } | |
|     if( asps_patch_size_quantizer_present_flag ) { | |
|       atgh_patch_size_x_info_quantizer | u(3) |
|       atgh_patch_size_y_info_quantizer | u(3) |
|     } | |
|     if( afps_raw_3d_pos_bit_count_explicit_mode_flag ) | |
|       atgh_raw_3d_pos_axis_bit_count_minus1 | u(v) |
|     if( atgh_type == P_TILE_GRP && num_ref_entries[ RlsIdx ] > 1 ) { | |
|       atgh_num_ref_idx_active_override_flag | u(1) |
|       if( atgh_num_ref_idx_active_override_flag ) | |
|         atgh_num_ref_idx_active_minus1 | ue(v) |
|     } | |
|   } | |
| } | |

FIG. 48

| atgh_type | Name of atgh_type |
|---|---|
| 0 | P_TILE_GRP (Inter atlas tile group) |
| 1 | I_TILE_GRP (Intra atlas tile group) |
| 2 | SKIP_TILE_GRP (SKIP atlas tile group) |
| 3 - ... | RESERVED |

FIG. 49

| ref_list_struct( rlsIdx ) { | Descriptor |
|---|---|
|     num_ref_entries[ rlsIdx ] | ue(v) |
|     for( i = 0; i < num_ref_entries[ rlsIdx ]; i++ ) { | |
|         if( asps_long_term_ref_atlas_frames_flag ) | |
|             st_ref_atlas_frame_flag[ rlsIdx ][ i ] | u(1) |
|         if( st_ref_atlas_frame_flag[ rlsIdx ][ i ] ) { | |
|             abs_delta_afoc_st[ rlsIdx ][ i ] | ue(v) |
|             if( abs_delta_afoc_st[ rlsIdx ][ i ] > 0 ) | |
|                 strpf_entry_sign_flag[ rlsIdx ][ i ] | u(1) |
|         } else | |
|             afoc_lsb_lt[ rlsIdx ][ i ] | u(v) |
|     } | |
| } | |

FIG. 50

| atlas_tile_group_data_unit( ) { | Descriptor |
|---|---|
|     p = 0 | |
|     atgdu_patch_mode[ p ] | ue(v) |
|     while( atgdu_patch_mode[ p ] != I_END && atgdu_patch_mode[ p ] != P_END ){ | |
|         patch_information_data( p, atgdu_patch_mode[ p ] ) | |
|         p++ | |
|         atgdu_patch_mode[ p ] | ue(v) |
|     } | |
|     AtgduTotalNumberOfPatches = p | |
| } | |

FIG. 51

| atgdu_patch_mode | Identifier | Description |
| --- | --- | --- |
| 0 | I_INTRA | Non-predicted Patch mode |
| 1 | I_RAW | RAW Point Patch mode |
| 2 | I_EOM | EOM Point Patch mode |
| 3 - 13 | I_RESERVED | Reserved modes |
| 14 | I_END | Patch termination mode |

FIG. 52

| atgdu_patch_mode | Identifier | Description |
|---|---|---|
| 0 | P_SKIP | Patch Skip mode |
| 1 | P_MERGE | Patch Merge mode |
| 2 | P_INTER | Inter predicted Patch mode |
| 3 | P_INTRA | Non-predicted Patch mode |
| 4 | P_RAW | RAW Point Patch mode |
| 5 | P_EOM | EOM Point Patch mode |
| 6 - 13 | P_RESERVED | Reserved modes |
| 14 | P_END | Patch termination mode |

FIG. 53

| atgdu_patch_mode | Identifier | Description |
|---|---|---|
| 0 | P_SKIP | Patch Skip mode |

FIG. 54

| patch_information_data ( patchIdx, patchMode ) { | Descriptor |
|---|---|
| if( atgh_type == SKIP_TILE_GR ) | |
|   skip_patch_data_unit( patchIdx ) | |
| else if( atgh_type == P_TILE_GR ) { | |
|   if( patchMode == P_SKIP ) | |
|     skip_patch_data_unit( patchIdx ) | |
|   else if( patchMode == P_MERGE ) | |
|     merge_patch_data_unit( patchIdx ) | |
|   else if( patchMode == P_INTRA ) | |
|     patch_data_unit( patchIdx ) | |
|   else if( patchMode == P_INTER ) | |
|     inter_patch_data_unit( patchIdx ) | |
|   else if( patchMode == P_RAW ) | |
|     raw_patch_data_unit( patchIdx ) | |
|   else if( patchMode == P_EOM ) | |
|     eom_patch_data_unit( patchIdx ) | |
| } | |
| else if( atgh_type == I_TILE_GR ) { | |
|   if( patchMode == I_INTRA ) | |
|     patch_data_unit( patchIdx ) | |
|   else if( patchMode == I_RAW ) | |
|     raw_patch_data_unit( patchIdx ) | |
|   else if( patchMode == I_EOM ) | |
|     eom_patch_data_unit( patchIdx ) | |
|   } | |
| } | |

FIG. 55

| patch_data_unit( patchIdx ) { | Descriptor |
|---|---|
| pdu_2d_pos_x[ patchIdx ] | ue(v) |
| pdu_2d_pos_y[ patchIdx ] | ue(v) |
| pdu_2d_size_x_minus1[ patchIdx ] | ue(v) |
| pdu_2d_size_y_minus1[ patchIdx ] | ue(v) |
| pdu_3d_pos_x[ patchIdx ] | u(v) |
| pdu_3d_pos_y[ patchIdx ] | u(v) |
| pdu_3d_pos_min_z[ patchIdx ] | u(v) |
| if( asps_normal_axis_max_delta_value_enabled_flag ) | |
|     pdu_3d_pos_delta_max_z[ patchIdx ] | u(v) |
| pdu_projection_id[ patchIdx ] | u(v) |
| pdu_orientation_index[ patchIdx ] | u(v) |
| if( afps_lod_mode_enabled_flag ) { | |
|     pdu_lod_enabled_flag[ patchIndex ] | u(1) |
|     if( pdu_lod_enabled_flag[ patchIndex ] > 0 ) { | |
|         pdu_lod_scale_x_minus1[ patchIndex ] | ue(v) |
|         pdu_lod_scale_y[ patchIndex ] | ue(v) |
|     } | |
| } | u(v) |
| if( asps_point_local_reconstruction_enabled_flag ) | |
|     point_local_reconstruction_data( patchIdx ) | |
| } | |

FIG. 56

| X | Identifier | Rotation(x) | Offset(x) |
|---|---|---|---|
| 0 | FPO_NULL | $\begin{bmatrix} 1 & 0 \\ 0 & 1 \end{bmatrix}$ | $\begin{bmatrix} 0 \\ 0 \end{bmatrix}$ |
| 1 | FPO_SWAP | $\begin{bmatrix} 0 & 1 \\ 1 & 0 \end{bmatrix}$ | $\begin{bmatrix} 0 \\ 0 \end{bmatrix}$ |
| 2 | FPO_ROT90 | $\begin{bmatrix} 0 & -1 \\ 1 & 0 \end{bmatrix}$ | $\begin{bmatrix} Patch2dSizeY[p] -1 \\ 0 \end{bmatrix}$ |
| 3 | FPO_ROT180 | $\begin{bmatrix} -1 & 0 \\ 0 & -1 \end{bmatrix}$ | $\begin{bmatrix} Patch2dSizeX[p] -1 \\ Patch2dSizeY[p] -1 \end{bmatrix}$ |
| 4 | FPO_ROT270 | $\begin{bmatrix} 0 & 1 \\ -1 & 0 \end{bmatrix}$ | $\begin{bmatrix} 0 \\ Patch2dSizeX[p] -1 \end{bmatrix}$ |
| 5 | FPO_MIRROR | $\begin{bmatrix} -1 & 0 \\ 0 & 1 \end{bmatrix}$ | $\begin{bmatrix} Patch2dSizeX[p] -1 \\ 0 \end{bmatrix}$ |
| 6 | FPO_MROT90 | $\begin{bmatrix} 0 & -1 \\ -1 & 0 \end{bmatrix}$ | $\begin{bmatrix} Patch2dSizeY[p] -1 \\ Patch2dSizeX[p] -1 \end{bmatrix}$ |
| 7 | FPO_MROT180 | $\begin{bmatrix} 1 & 0 \\ 0 & -1 \end{bmatrix}$ | $\begin{bmatrix} 0 \\ Patch2dSizeY[p] -1 \end{bmatrix}$ |

FIG. 57

| sei_rbsp( ) { | Descriptor |
|---|---|
|     do | |
|         sei_message( ) | |
|     while( more_rbsp_data( ) ) | |
| } | |

FIG. 58

| | Descriptor |
|---|---|
| sei_payload( payloadType, payloadSize ) { | |
|     if(( nal_unit_type == NAL_PREFIX_NSEI ) \|\| ( nal_unit_type == NAL_PREFIX_ESEI )) { | |
|         if( payloadType == XX ) | |
|             sei( payloadSize ) | |
|         else | |
|             reserved_sei_message( payloadSize ) | |
|     } | |
|     else { /*( nal_unit_type == NAL_SUFFIX_NSEI ) \|\| ( nal_unit_type == NAL_SUFFIX_ESEI )*/ | |
|         if( payloadType == XX) | |
|             sei( payloadSize ) | |
|         else | |
|             reserved_sei_message( payloadSize ) | |
|     } | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

Pursuant to 35 U.S.C. § 119(e), this application claims the benefit of earlier filing date and right of priority to U.S. Provisional Applications No. 63/008,804, filed on Apr. 12, 2020, and 63/042,530, filed on Jun. 22, 2020, the contents of which are hereby incorporated by reference herein in their entirety.

TECHNICAL FIELD

Embodiments provide a method for providing point cloud contents to provide a user with various services such as virtual reality (VR), augmented reality (AR), mixed reality (MR), and autonomous driving services.

BACKGROUND

A point cloud is a set of points in a three-dimensional (3D) space. It is difficult to generate point cloud data because the number of points in the 3D space is large.

A large throughput is required to transmit and receive data of a point cloud.

SUMMARY

An object of the present disclosure is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for providing optimized point cloud content to a user by signaling viewport related information of the point cloud data.

Another object of the present disclosure is to provide a point cloud data transmission device, a point cloud data transmission method, a point cloud data reception device, and a point cloud data reception method for providing optimized point cloud content to a user by allowing viewport information, recommended viewport information, and initial viewing orientation (i.e., viewpoint) for data processing and rendering in a V-PCC bitstream to be transmitted in a bitstream.

Another object of the present disclosure is to provide a point cloud data transmission device, a point cloud data transmission method, a point cloud data reception device, and a point cloud data reception method for providing optimized point cloud data to a user by signaling viewport-related information of the point cloud data at a file format level.

Another object of the present disclosure is to provide a point cloud data transmission device, a point cloud data transmission method, a point cloud data reception device, and a point cloud data reception method for effectively providing point cloud data to a user by signaling user viewport-related information that is static or changes with time in a track or item.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of transmitting point cloud data may include encoding point cloud data, encapsulating a bitstream including the encoded point cloud data into a file, and transmitting the file.

According to embodiments, the bitstream is stored in one or more tracks of the file, the file further includes signaling data, the signaling data includes at least one parameter set and viewport-related information, and the viewport-related information includes at least first viewport information or second viewport information.

According to embodiments, the point cloud data includes geometry data, attribute data and occupancy map data that are encoded by a video-based point cloud compression (V-PCC) scheme.

According to embodiments, the first viewport information includes identification information for identifying viewport camera parameters related to a viewport camera and type information for indicating a projection type of the viewport camera.

According to embodiments, the second viewport information includes identification information for identifying a viewport and position information of the viewport.

According to embodiments, the second viewport information further includes information for indicating whether a position of the viewport corresponds to a center of the viewport or one of two stereo positions of the viewport.

According to embodiments, a point cloud data transmission apparatus may include an encoder to encode point cloud data, an encapsulator to encapsulating a bitstream including the encoded point cloud data into a file, and a transmitter to transmit the file.

According to embodiments, the bitstream is stored in one or more tracks of the file, the file further includes signaling data, the signaling data includes at least one parameter set and viewport-related information, and wherein the viewport-related information includes at least first viewport information or second viewport information.

According to embodiments, the point cloud data includes geometry data, attribute data and occupancy map data that are encoded by a video-based point cloud compression (V-PCC) scheme.

According to embodiments, the first viewport information includes identification information for identifying viewport camera parameters related to a viewport camera and type information for indicating a projection type of the viewport camera.

According to embodiments, the second viewport information includes identification information for identifying a viewport and position information of the viewport.

According to embodiments, the second viewport information further includes information for indicating whether a position of the viewport corresponds to a center of the viewport or one of two stereo positions of the viewport.

According to embodiments, a point cloud data reception method may include receiving a file, decapsulating the file into a bitstream including point cloud data, the bitstream is stored in one or more tracks of the file and the file further includes signaling data, decoding the point cloud data based on the signaling data, and redering the decoded point cloud data based on the signaling data.

According to embodiments, signaling data includes at least one parameter set and viewport-related information and the viewport-related information includes at least first viewport information or second viewport information.

According to embodiments, the point cloud data includes geometry data, attribute data and occupancy map data that are encoded by a video-based point cloud compression (V-PCC) scheme.

According to embodiments, the first viewport information includes identification information for identifying viewport camera parameters related to a viewport camera and type information for indicating a projection type of the viewport camera.

According to embodiments, the second viewport information includes identification information for identifying a viewport and position information of the viewport.

According to embodiments, the second viewport information further includes information for indicating whether a position of the viewport corresponds to a center of the viewport or one of two stereo positions of the viewport.

According to embodiments, a point cloud data reception apparatus may include a receiver to receive a file, a decapsulator to decapsulate the file into a bitstream including point cloud data, the bitstream is stored in one or more tracks of the file and the file further includes signaling data, a decoder to decode the point cloud data based on the signaling data, and a render to reder the decoded point cloud data based on the signaling data.

According to embodiments, signaling data includes at least one parameter set and viewport-related information and the viewport-related information includes at least first viewport information or second viewport information.

According to embodiments, the point cloud data includes geometry data, attribute data and occupancy map data that are encoded by a video-based point cloud compression (V-PCC) scheme.

According to embodiments, the first viewport information includes identification information for identifying viewport camera parameters related to a viewport camera and type information for indicating a projection type of the viewport camera.

According to embodiments, the second viewport information includes identification information for identifying a viewport and position information of the viewport.

According to embodiments, the second viewport information further includes information for indicating whether a position of the viewport corresponds to a center of the viewport or one of two stereo positions of the viewport.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 illustrates capture of point cloud data according to embodiments;

FIG. 3 illustrates an exemplary point cloud, geometry, and texture image according to embodiments;

FIG. 26 shows an example of a syntax structure of a sample stream V-PCC header included in a V-PCC bitstream according to embodiments;

FIG. 27 shows an example of a syntax structure of a sample stream V-PCC unit according to embodiments;

FIG. 28 shows an example of a syntax structure of a V-PCC unit according to embodiments;

FIG. 29 shows an example of a syntax structure of a V-PCC unit header according to embodiments;

FIG. 30 shows an example of V-PCC unit types assigned to the vuh_unit_type field according to embodiments;

FIG. 31 shows an example of a syntax structure of a V-PCC unit payload (vpcc_unit_payload( )) according to embodiments;

FIG. 32 shows an example of a syntax structure of a V-PCC parameter set included in a V-PCC unit payload according to embodiments;

FIG. 35 shows an example of a syntax structure of a sample stream NAL header contained in an atlas substream according to embodiments;

FIG. 36 shows an example of a syntax structure of a sample stream NAL unit according to embodiments;

FIG. 37 shows an example of a syntax structure of nal_unit(NumBytesInNalUnit) according to embodiments;

FIG. 38 shows an example of a syntax structure of a NAL unit header according to embodiments;

FIG. 39 shows examples of types of RBSP data structures allocated to a nal_unit_type field according to embodiments;

FIG. 40 shows syntax of an RBSP data structure included in a NAL unit when a NAL unit type according to embodiments is an atlas sequence parameter set;

FIG. 41 shows an atlas frame parameter set according to embodiments;

FIG. 42 shows a syntax structure of atlas frame tile information according to embodiments;

FIG. 43 shows an atlas adaptation parameter set according to embodiments;

FIG. 44 shows a syntax structure of camera parameters according to embodiments;

FIG. 45 shows examples of a camera model assigned to an acp_camera_model field according to embodiments;

FIG. 46 shows a syntax structure of an atlas tile group layer header according to embodiments;

FIG. 47 shows a syntax structure of an atlas tile group (or tile) header included in an atlas tile group layer according to embodiments;

FIG. 48 shows examples of a coding type assigned to an atgh_type field according to embodiments;

FIG. 49 shows an example of a syntax structure of ref_list_struct( ) according to embodiments;

FIG. 50 illustrates atlas tile group data according to embodiments;

FIG. 51 shows an example of patch mode types allocated to an atgdu_patch_mode field when an atgh_type field indicates I_TILE_GRP according to embodiments;

FIG. 52 shows an example of patch mode types allocated to the atgdu_patch_mode field when the atgh_type field indicates P_TILE_GRP according to embodiments;

FIG. 53 shows an example of a patch mode type allocated to the atgdu_patch_mode field when the atgh_type field indicates SKIP_TILE_GRP according to embodiments;

FIG. 54 shows patch information data according to embodiments;

FIG. 55 shows a syntax structure of a patch data unit according to embodiments;

FIG. 56 shows rotations and offsets with respect to patch orientations according to embodiments;

FIG. 57 shows a syntax structure of SEI information according to embodiments;

FIG. 58 shows an example of a syntax structure of an SEI message payload according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
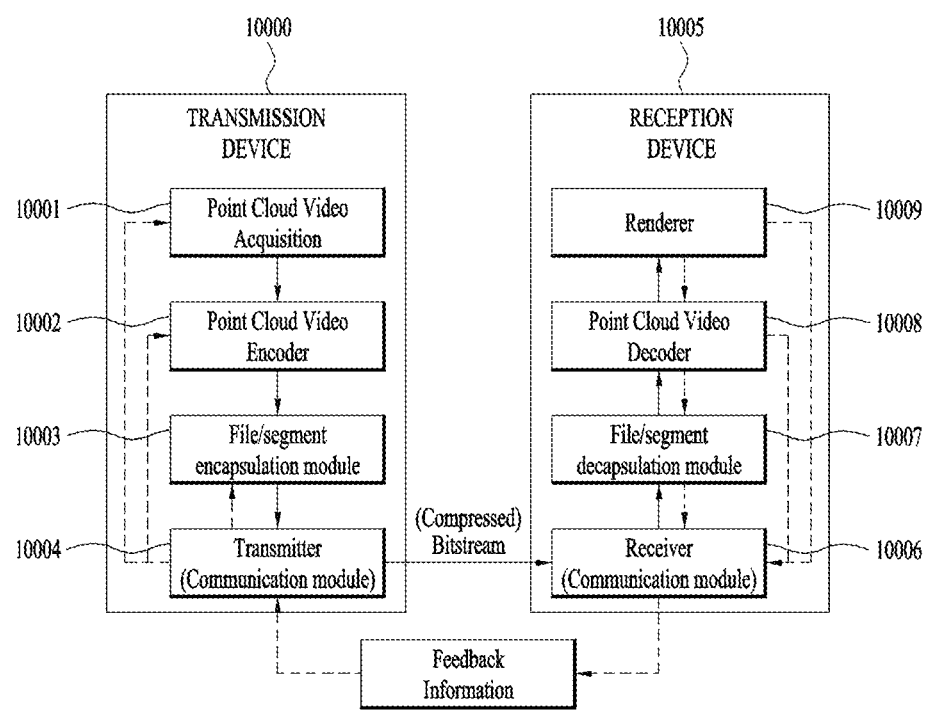
FIG. 1 illustrates an exemplary structure of a transmission/reception system for providing point cloud content according to embodiments.

FIG. 1 illustrates an exemplary structure of a transmission/reception system for providing point cloud content according to embodiments.

The present disclosure provides a method of providing point cloud content to provide a user with various services such as virtual reality (VR), augmented reality (AR), mixed reality (MR), and autonomous driving. The point cloud content according to the embodiments represent data representing objects as points, and may be referred to as a point cloud, point cloud data, point cloud video data, point cloud image data, or the like.

A point cloud data transmission device 10000 according to embodiment may include a point cloud video acquisition unit 10001, a point cloud video encoder 10002, a file/segment encapsulation module (or file/segment encapsulator) 10003, and/or a transmitter (or communication module) 10004. The transmission device according to the embodiments may secure and process point cloud video (or point cloud content) and transmit the same. According to embodiments, the transmission device may include a fixed station, a base transceiver system (BTS), a network, an artificial intelligence (AI) device and/or system, a robot, and an AR/VR/XR device and/or a server. According to embodiments, the transmission device 10000 may include a device a robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The point cloud video acquisition unit 10001 according to the embodiments acquires a point cloud video through a process of capturing, synthesizing, or generating a point cloud video.

The point cloud video encoder 10002 according to the embodiments encodes the point cloud video data acquired from the point cloud video acquisition unit 10001. According to embodiments, the point cloud video encoder 10002 may be referred to as a point cloud encoder, a point cloud data encoder, an encoder, or the like. The point cloud compression coding (encoding) according to the embodiments is not limited to the above-described embodiment. The point cloud video encoder may output a bitstream including the encoded point cloud video data. The bitstream may include not only the encoded point cloud video data, but also signaling information related to encoding of the point cloud video data.

The point cloud video encoder 10002 according to the embodiments may support both the geometry-based point cloud compression (G-PCC) encoding scheme and/or the video-based point cloud compression (V-PCC) encoding scheme. In addition, the point cloud video encoder 10002 may encode a point cloud (referring to either point cloud data or points) and/or signaling data related to the point cloud.

The file/segment encapsulation module 10003 according to the embodiments encapsulates the point cloud data in the form of a file and/or segment form. The point cloud data transmission method/device according to the embodiments may transmit the point cloud data in a file and/or segment form.

The transmitter (or communication module) 10004 according to the embodiments transmits the encoded point cloud video data in the form of a bitstream. According to embodiments, the file or segment may be transmitted to a reception device over a network, or stored in a digital storage medium (e.g., USB, SD, CD, DVD, Blu-ray, HDD, SSD, etc.). The transmitter according to the embodiments is capable of wired/wireless communication with the reception device (or the receiver) over a network of 4G, 5G, 6G, etc. In addition, the transmitter may perform necessary data processing operation according to the network system (e.g., a 4G, 5G or 6G communication network system). The transmission device may transmit the encapsulated data in an on-demand manner.

A point cloud data reception device 10005 according to the embodiments may include a receiver 10006, a file/segment decapsulator (or file/segment decapsulation module) 10007, a point cloud video decoder 10008, and/or a renderer 10009. According to embodiments, the reception device may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The receiver 10006 according to the embodiments receives a bitstream containing point cloud video data. According to embodiments, the receiver 10006 may transmit feedback information to the point cloud data transmission device 10000.

The file/segment decapsulation module 10007 decapsulates a file and/or a segment containing point cloud data.

The point cloud video decoder 10008 decodes the received point cloud video data.

The renderer 10009 renders the decoded point cloud video data. According to embodiments, the renderer 10009 may transmit the feedback information obtained at the reception side to the point cloud video decoder 10008. The point cloud video data according to the embodiments may carry feedback information to the receiver 10006. According to embodiments, the feedback information received by the point cloud transmission device may be provided to the point cloud video encoder 10002.

The arrows indicated by dotted lines in the drawing represent a transmission path of feedback information acquired by the reception device 10005. The feedback information is information for reflecting interactivity with a user who consumes point cloud content, and includes user information (e.g., head orientation information), viewport information, and the like). In particular, when the point cloud content is content for a service (e.g., autonomous driving service, etc.) that requires interaction with a user, the feedback information may be provided to the content transmitting side (e.g., the transmission device 10000) and/or the service provider. According to embodiments, the feedback information may be used in the reception device 10005 as well as the transmission device 10000, and may not be provided.

The head orientation information according to embodiments is information about a user's head position, orientation, angle, motion, and the like. The reception device 10005 according to the embodiments may calculate viewport information based on the head orientation information. The viewport information may be information about a region of the point cloud video that the user is viewing. A viewpoint (or orientation) is a point where a user is viewing a point cloud video, and may refer to a center point of the viewport region. That is, the viewport is a region centered on the viewpoint, and the size and shape of the region may be determined by a field of view (FOV). In other words, a viewport is determined according to a position and a viewpoint (or orientation) of a virtual camera or a user, point cloud data is rendered in the viewport based on viewport information. Accordingly, the reception device 10005 may extract the viewport information based on a vertical or horizontal FOV supported by the device in addition to the head orientation information. In addition, the reception device 10005 performs gaze analysis to check how the user consumes a point cloud, a region that the user gazes at in the point cloud video, a gaze time, and the like. According to embodiments, the reception device 10005 may transmit feedback information including the result of the gaze analysis to the transmission device 10000. The feedback information according to the embodiments may be acquired in the rendering and/or display process. The feedback information according to the embodiments may be secured by one or more sensors included in the reception device 10005. In addition, according to embodiments, the feedback information may be secured by the renderer 10009 or a separate external element (or device, component, etc.). The dotted lines in FIG. 1 represent a process of transmitting the feedback information secured by the renderer 10009. The point cloud content providing system may process (encode/decode) point cloud data based on the feedback information. Accordingly, the point cloud video decoder 10008 may perform a decoding operation based on the feedback information. The reception device 10005 may transmit the feedback information to the transmission device. The transmission device (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) all point cloud data, and provide point cloud content to the user.

According to embodiments, the transmission device 10000 may be called an encoder, a transmission device, a transmitter, or the like, and the reception device 10005 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to point cloud data.

The elements of the point cloud content providing system illustrated in FIG. 1 may be implemented by hardware, software, a processor, and/or combinations thereof.

Embodiments may provide a method of providing point cloud content to provide a user with various services such as virtual reality (VR), augmented reality (AR), mixed reality (MR), and autonomous driving.

In order to provide a point cloud content service, a point cloud video may be acquired first. The acquired point cloud video may be transmitted to a reception side through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

According to embodiments, the process of providing point cloud content (or point cloud data) may be referred to as a point cloud compression process. According to embodiments, the point cloud compression process may represent a video-based point cloud compression (V-PCC) process.

Each element of the point cloud data transmission device and the point cloud data reception device according to the embodiments may be hardware, software, a processor, and/ or a combination thereof.

The point cloud compression system may include a transmission device and a reception device. According to embodiments, the transmission device may be called an encoder, a transmission apparatus, a transmitter, a point cloud transmission apparatus and so on. According to embodiments, the reception device may be called a decoder, a reception apparatus, a receiver, a point cloud reception apparatus and so on. The transmission device may output a bitstream by encoding a point cloud video, and deliver the same to the reception device through a digital storage medium or a network in the form of a file or a stream (streaming segment). The digital storage medium may include various storage media such as a USB, SD, CD, DVD, Blu-ray, HDD, and SSD.

The transmission device may include a point cloud video acquisition unit, a point cloud video encoder, a file/segment encapsulator, and a transmitting unit (or transmitter) as shown in FIG. 1. The reception device may include a receiver, a file/segment decapsulator, a point cloud video decoder, and a renderer as shown in FIG. 1. The encoder may be referred to as a point cloud video/picture/picture/ frame encoder, and the decoder may be referred to as a point cloud video/picture/picture/frame decoding device. The renderer may include a display. The renderer and/or the display may be configured as separate devices or external components. The transmission device and the reception device may further include a separate internal or external module/unit/ component for the feedback process. According to embodiments, each element in a transmission device and a reception device may be configured of hardware, software and/or processor.

According to embodiments, the operation of the reception device may be the reverse process of the operation of the transmission device.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the stanford triangle format) file may be generated. For a video having multiple frames, one or more files may be acquired. During the capture process, point cloud related metadata (e.g., capture related metadata) may be generated.

A point cloud data transmission device according to embodiments may include an encoder configured to encode point cloud data, and a transmitter configured to transmit the point cloud data or a bitstream including the point cloud data.

A point cloud data reception device according to embodiments may include a receiver configured to receive a bitstream including point cloud data, a decoder configured to decode the point cloud data, and a renderer configured to render the point cloud data.

The method/device according to the embodiments represents the point cloud data transmission device and/or the point cloud data reception device.

FIG. 2 illustrates capture of point cloud data according to embodiments.

Point cloud data (or point cloud video data) according to embodiments may be acquired by a camera or the like. A capturing technique according to embodiments may include, for example, inward-facing and/or outward-facing.

In the inward-facing according to the embodiments, one or more cameras inwardly facing an object of point cloud data may photograph the object from the outside of the object.

In the outward-facing according to the embodiments, one or more cameras outwardly facing an object of point cloud data may photograph the object. For example, according to embodiments, there may be four cameras.

The point cloud data or the point cloud content according to the embodiments may be a video or a still image of an object/environment represented in various types of 3D spaces. According to embodiments, the point cloud content may include video/audio/an image of an object.

Equipment for capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, z) and color (YCbCr or RGB) or reflectance (r) of the points. For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as autonomous driving, the configuration of the capture camera may be based on the outward-facing technique. Because the point cloud content may be captured by multiple cameras, a camera calibration process may need to be performed before the content is captured to configure a global coordinate system for the cameras.

The point cloud content may be a video or still image of an object/environment presented in various types of 3D spaces.

Additionally, in the point cloud content acquisition method, any point cloud video may be composed based on the captured point cloud video. Alternatively, when a point cloud video for a computer-generated virtual space is to be provided, capturing with an actual camera may not be performed. In this case, the capture process may be replaced simply by a process of generating related data.

Post-processing may be needed for the captured point cloud video to improve the quality of the content. In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

The point cloud video encoder 10002 may encode the input point cloud video into one or more video streams. One point cloud video may include a plurality of frames, each of which may correspond to a still image/picture. In this specification, a point cloud video may include a point cloud image/frame/picture/video/audio. In addition, the term "point cloud video" may be used interchangeably with a point cloud image/frame/picture. The point cloud video encoder 10002 may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and auxiliary information (or auxiliary data), which will be described later. The geometry video may include a geometry image, the attribute video may include an attribute image, and the occupancy map video may include an occupancy map image. The auxiliary information may include auxiliary patch information. The attribute video/image may include a texture video/image.

The file/segment encapsulator (file/segment encapsulation module) 10003 may encapsulate the encoded point cloud video data and/or metadata related to the point cloud video in the form of, for example, a file. Here, the metadata related to the point cloud video may be received from the metadata processor. The metadata processor may be included in the point cloud video encoder 10002 or may be configured as a separate component/module. The file/segment encapsulator 10003 may encapsulate the data in a file format such as ISOBMFF or process the same in the form of a DASH segment or the like. According to an embodiment, the file/segment encapsulator 10003 may include the point cloud video-related metadata in the file format. The point cloud video metadata may be included, for example, in boxes at various levels on the ISOBMFF file format or as data in a separate track within the file. According to an embodiment, the file/segment encapsulator 10003 may encapsulate the point cloud video-related metadata into a file. The transmission processor may perform processing for transmission on the point cloud video data encapsulated according to the file format. The transmission processor may be included in the transmitter 10004 or may be configured as a separate component/module. The transmission processor may process the point cloud video data according to a transmission protocol. The processing for transmission may include processing for delivery over a broadcast network and processing for delivery through a broadband. According to an embodiment, the transmission processor may receive point cloud video-related metadata from the metadata processor along with the point cloud video data, and perform processing of the point cloud video data for transmission.

The transmitter 10004 may transmit the encoded video/image information or data that is output in the form of a bitstream to the receiver 10006 of the reception device through a digital storage medium or a network in the form of a file or streaming. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoding device.

The receiver 10006 may receive point cloud video data transmitted by the point cloud video transmission device according to the present disclosure. Depending on the transmission channel, the receiver may receive the point cloud video data over a broadcast network or through a broadband. Alternatively, the point cloud video data may be received through a digital storage medium.

The reception processor may process the received point cloud video data according to the transmission protocol. The reception processor may be included in the receiver 10006 or may be configured as a separate component/module. The reception processor may reversely perform the above-described process of the transmission processor such that the processing corresponds to the processing for transmission performed at the transmission side. The reception processor may deliver the acquired point cloud video data to the file/segment decapsulator 10007, and the acquired point cloud video-related metadata to the metadata processor (not shown). The point cloud video-related metadata acquired by the reception processor may take the form of a signaling table.

The file/segment decapsulator (file/segment decapsulation module) 10007 may decapsulate the point cloud video data received in the form of a file from the reception processor. The file/segment decapsulator 10007 may decapsulate the files according to ISOBMFF or the like, and may acquire a point cloud video bitstream or point cloud video-related metadata (a metadata bitstream). The acquired point cloud video bitstream may be delivered to the point cloud video decoder 10008, and the acquired point cloud video-related metadata (metadata bitstream) may be delivered to the metadata processor (not shown). The point cloud video bitstream may include the metadata (metadata bitstream). The metadata processor may be included in the point cloud video decoder 10008 or may be configured as a separate component/module. The point cloud video-related metadata acquired by the file/segment decapsulator 10007 may take the form of a box or a track in the file format. The file/segment decapsulator 10007 may receive metadata necessary for decapsulation from the metadata processor, when necessary. The point cloud video-related metadata may be delivered to the point cloud video decoder 10008 and used in a point cloud video decoding procedure, or may be transferred to the renderer 10009 and used in a point cloud video rendering procedure.

The point cloud video decoder 10008 may receive the bitstream and decode the video/image by performing an operation corresponding to the operation of the point cloud video encoder. In this case, the point cloud video decoder 10008 may decode the point cloud video by dividing the same into a geometry video, an attribute video, an occupancy map video, and auxiliary information as described below. The geometry video may include a geometry image, and the attribute video may include an attribute image. The occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. A color point cloud image/picture may be reconstructed by assigning color values to the smoothed 3D geometry based on the texture image. The renderer 10009 may render the reconstructed geometry and the color point cloud image/picture. The rendered video/image may be displayed through the display (not shown). The user may view all or part of the rendered result through a VR/AR display or a typical display.

The feedback process may include transferring various kinds of feedback information that may be acquired in the rendering/displaying process to the transmission side or to the decoder of the reception side. Interactivity may be provided through the feedback process in consuming point cloud video. According to an embodiment, head orientation information, viewport information indicating a region currently viewed by a user, and the like may be delivered to the transmission side in the feedback process. According to an embodiment, the user may interact with things implemented in the VR/AR/MR/autonomous driving environment. In this case, information related to the interaction may be delivered to the transmission side or a service provider during the feedback process. According to an embodiment, the feedback process may be skipped.

The head orientation information may represent information about the location, angle and motion of a user's head. On the basis of this information, information about a region of the point cloud video currently viewed by the user, that is, viewport information, may be calculated.

The viewport information may be information about a region of the point cloud video currently viewed by the user. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmission side on a feedback channel. A device such as a VR/AR/MR display may extract a viewport region based on the location/direction of the user's head, vertical or horizontal FOV supported by the device, and the like.

According to an embodiment, the aforementioned feedback information may not only be delivered to the transmission side, but also be consumed at the reception side. That is, decoding and rendering processes at the reception side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently viewed by the user. A viewpoint is a point which is viewed by the user in the point cloud video and may represent a center point of the viewport region. That is, a viewport is a region around a viewpoint, and the size and form of the region may be determined by the field of view (FOV).

The present disclosure relates to point cloud video compression as described above. For example, the methods/embodiments disclosed in the present disclosure may be applied to the point cloud compression or point cloud coding (PCC) standard of the moving picture experts group (MPEG) or the next generation video/image coding standard.

As used herein, a picture/frame may generally represent a unit representing one image in a specific time interval.

A pixel or a pel may be the smallest unit constituting one picture (or image). Also, "sample" may be used as a term corresponding to a pixel. A sample may generally represent a pixel or a pixel value. It may represent only a pixel/pixel value of a luma component, only a pixel/pixel value of a chroma component, or only a pixel/pixel value of a depth component.

A unit may represent a basic unit of image processing. The unit may include at least one of a specific region of the picture and information related to the region. The unit may be used interchangeably with term such as block or area or module in some cases. In a general case, an M×N block may include samples (or a sample array) or a set (or array) of transform coefficients configured in M columns and N rows.

FIG. 3 illustrates an example of a point cloud, a geometry image, and a texture image according to embodiments.

A point cloud according to the embodiments may be input to the V-PCC encoding process of FIG. 4, which will be described later, to generate a geometric image and a texture image. According to embodiments, a point cloud may have the same meaning as point cloud data.

As shown in the FIG. 3, the left part shows a point cloud, in which a point cloud object is positioned in a 3D space and may be represented by a bounding box or the like. The middle part in FIG. 3 shows a geometry image, and the right part in FIG. 3 shows a texture image (non-padded image). In the present disclosure, a geometry image may be called a geometry patch frame/picture or a geometry frame/picture and a texture image may be called an attribute patch frame/picture or an attribute frame/picture.

A video-based point cloud compression (V-PCC) according to embodiments is a method of compressing 3D point cloud data based on a 2D video codec such as High Efficiency Video Coding (HEVC) or Versatile Video Coding (VVC). Data and information that may be generated in the V-PCC compression process are as follows:

Occupancy map: this is a binary map indicating whether there is data at a corresponding position in a 2D plane, using a value of 0 or 1 in dividing the points constituting a point cloud into patches and mapping the same to the 2D plane. The occupancy map may represent a 2D array corresponding to atlas, and the values of the occupancy map may indicate whether each sample position in the atlas corresponds to a 3D point. Atlas means an object including information about 2D patches for each point cloud frame. For example, atlas may include 2D arrangement and size of patches, the position of a corresponding 3D region within a 3D point, a projection plan, and a level of detail parameters.

Patch: A set of points constituting a point cloud, which indicates that points belonging to the same patch are adjacent to each other in 3D space and are mapped in the same direction among 6-face bounding box planes in the process of mapping to a 2D image.

Geometry image: this is an image in the form of a depth map that presents position information (geometry) about each point constituting a point cloud on a patch-by-patch basis. The geometry image may be composed of pixel values of one channel. Geometry represents a set of coordinates associated with a point cloud frame.

Texture image: this is an image representing the color information about each point constituting a point cloud on a patch-by-patch basis. A texture image may be composed of pixel values of a plurality of channels (e.g., three channels of R, G, and B). The texture is included in an attribute. According to embodiments, a texture and/or attribute may be interpreted as the same object and/or having an inclusive relationship.

Auxiliary patch info: this indicates metadata needed to reconstruct a point cloud with individual patches. Auxiliary patch information may include information about the position, size, and the like of a patch in a 2D/3D space.

Point cloud data according to the embodiments, for example, V-PCC components may include an atlas, an occupancy map, geometry, and attributes.

Atlas represents a collection of 2D bounding boxes. It may be a group of patches, for example, patches projected into a rectangular frame that correspond to a 3-dimensional bounding box in 3D space, which may represent a subset of a point cloud. In this case, a patch may represent a rectangular region in the atlas corresponding to a rectangular region in a planar projection. In addition, patch data may represent data in which transformation of patches included in the atlas needs to be performed from 2D to 3D. Additionally, a patch data group is also referred to as an atlas.

An attribute may represent a scalar or vector associated with each point in the point cloud. For example, the attributes may include color, reflectance, surface normal, time stamps, material ID.

The point cloud data according to the embodiments represents PCC data according to video-based point cloud compression (V-PCC) scheme. The point cloud data may include a plurality of components. For example, it may include an occupancy map, a patch, geometry and/or texture.

Figure 4:
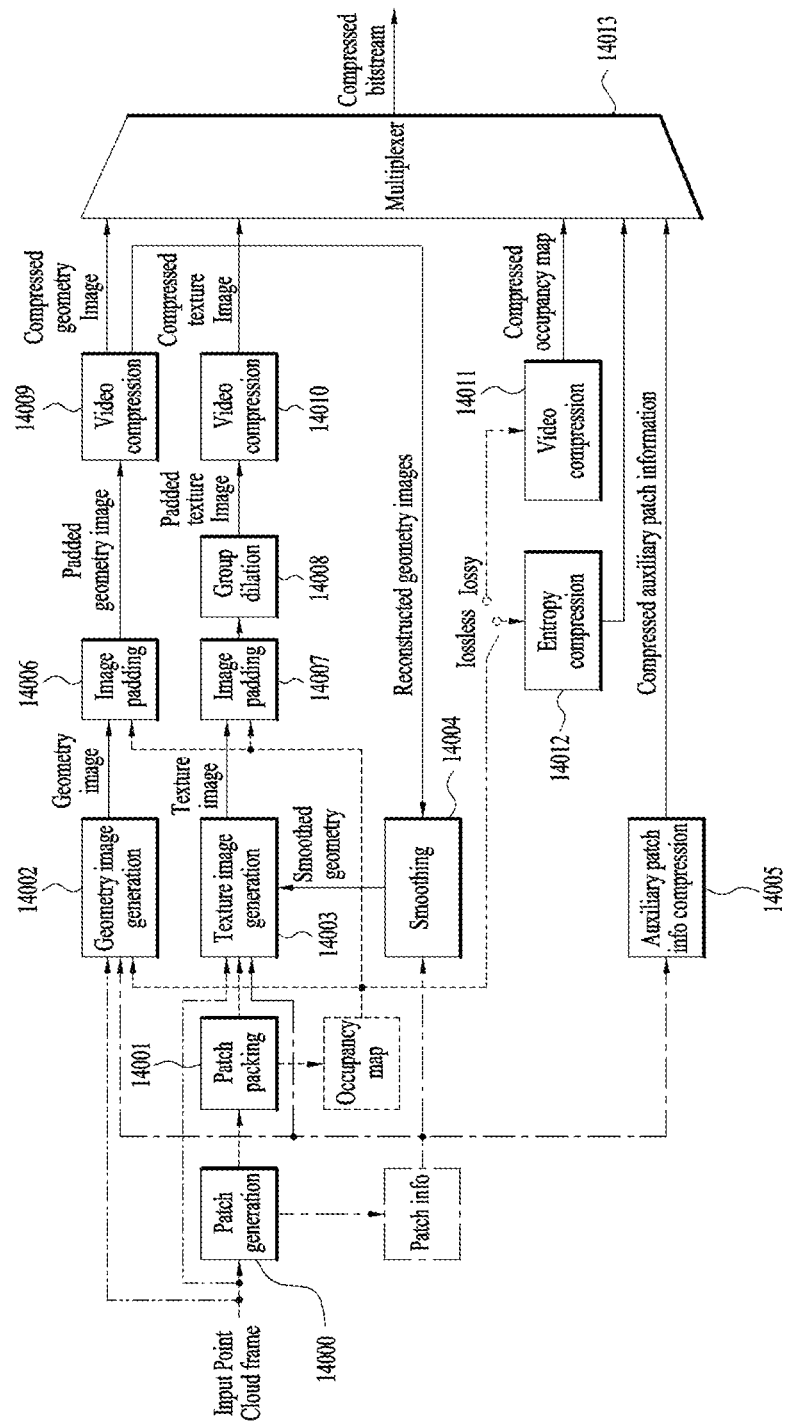
FIG. 4 illustrates an exemplary V-PCC encoding process according to embodiments.

FIG. 4 illustrates an example of a point cloud video encoder according to embodiments.

FIG. 4 illustrates a V-PCC encoding process for generating and compressing an occupancy map, a geometry image, a texture image, and auxiliary patch information. The V-PCC encoding process of FIG. 4 may be processed by the point cloud video encoder 10002 of FIG. 1. Each element of FIG. 4 may be performed by software, hardware, processor and/or a combination thereof.

The patch generation or patch generator 14000 receives a point cloud frame (which may be in the form of a bitstream containing point cloud data). The patch generator 14000 generates a patch from the point cloud data. In addition, patch information including information about patch generation is generated.

The patch packing or patch packer 14001 packs one or more patches. In addition, the patch packer 14001 generates an occupancy map containing information about patch packing.

The geometry image generation or geometry image generator 14002 generates a geometry image based on the point cloud data, patch information (or auxiliary information), and/or occupancy map information. The geometry image means data (i.e., 3D coordinate values of points) containing geometry related to the point cloud data and refers as to a geometry frame.

The texture image generation or texture image generator 14003 generates a texture image based on the point cloud data, patches, packed patches, patch information (or auxiliary information) and/or the smoothed geometry. The texture image refers as to an attribute frame. That is, the texture image may be generated further based on smoothed geometry generated by smoothing processing of smoothing based on the patch information.

The smoothing or smoother 14004 may mitigate or eliminate errors contained in the image data. For example, the reconstructed geometry images are smothered based on the patch information. That is, portions that may cause errors between data may be smoothly filtered out to generate smoothed geometry.

The auxiliary patch information compression or auxiliary patch information compressor 14005 may compress auxiliary patch information related to the patch information generated in the patch generation. In addition, the compressed auxiliary patch information in the auxiliary patch information compressor 14005 may be transmitted to the multiplexer 14013. The auxiliary patch information may be used in the geometry image generator 14002.

The image padding or image padders 14006 and 14007 may pad the geometry image and the texture image, respectively. The padding data may be padded to the geometry image and the texture image.

The group dilation or group dilator 14008 may add data to the texture image in a similar manner to image padding. The auxiliary patch information may be inserted into the texture image.

The video compression or video compressors 14009, 14010, and 14011 may compress the padded geometry image, the padded texture image, and/or the occupancy map, respectively. In other words, the video compressors 14009, 14010, and 14011 may compress the input geometry frame, attribute frame, and/or occupancy map frame, respectively, to output a video bitstream of the geometry image, a video bitstream of the texture image, a video bitstream of the occupancy map. The video compression may encode geometry information, texture information, and occupancy information.

The entropy compression or entropy compressor 14012 may compress the occupancy map based on an entropy scheme.

According to embodiments, the entropy compression and/or video compression may be performed on an occupancy map frame depending on whether the point cloud data is lossless and/or lossy.

The multiplexer 14013 multiplexes the video bitstream of the compressed geometry, the video bitstream of the compressed texture image, the video bitstream of the compressed occupancy map, and the bitstream of compressed auxiliary patch information from the respective compressors into one bitstream.

The blocks described above may be omitted or may be replaced by blocks having similar or identical functions. In addition, each of the blocks shown in FIG. 4 may operate as at least one of a processor, software, and hardware.

Detailed operations of each process of FIG. 4 according to embodiments are described below.

Patch Generation (14000)

The patch generation process refers to a process of dividing a point cloud into patches, which are mapping units, in order to map the point cloud to the 2D image. The patch generation process may be divided into three steps: normal value calculation, segmentation, and patch segmentation.

The normal value calculation process will be described in detail with reference to FIG. 5.

Figure 5:
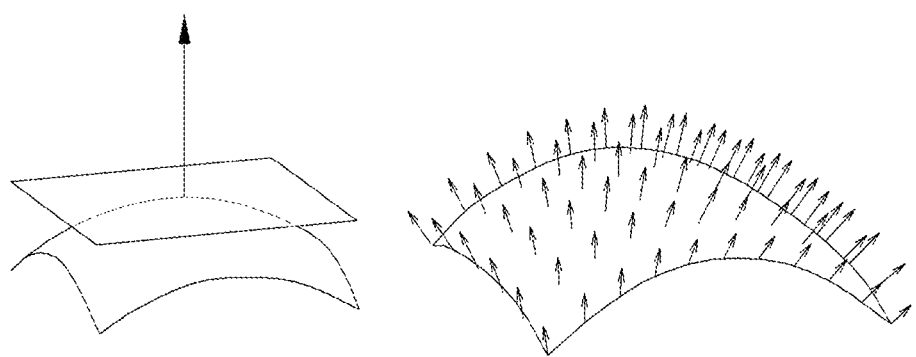
FIG. 5 illustrates an example of a tangent plane and a normal vector of a surface according to embodiments.

FIG. 5 illustrates an example of a tangent plane and a normal vector of a surface according to embodiments.

The surface of FIG. 5 is used in the patch generator 14000 of the V-PCC encoding process of FIG. 4 as follows.

Normal Calculation Related to Patch Generation

Each point of a point cloud has its own direction, which is represented by a 3D vector called a normal vector. Using the neighbors of each point obtained using a K-D tree or the like, a tangent plane and a normal vector of each point constituting the surface of the point cloud as shown in FIG. 5 may be obtained. The search range applied to the process of searching for neighbors may be defined by the user.

The tangent plane refers to a plane that passes through a point on the surface and completely includes a tangent line to the curve on the surface.

Figure 6:
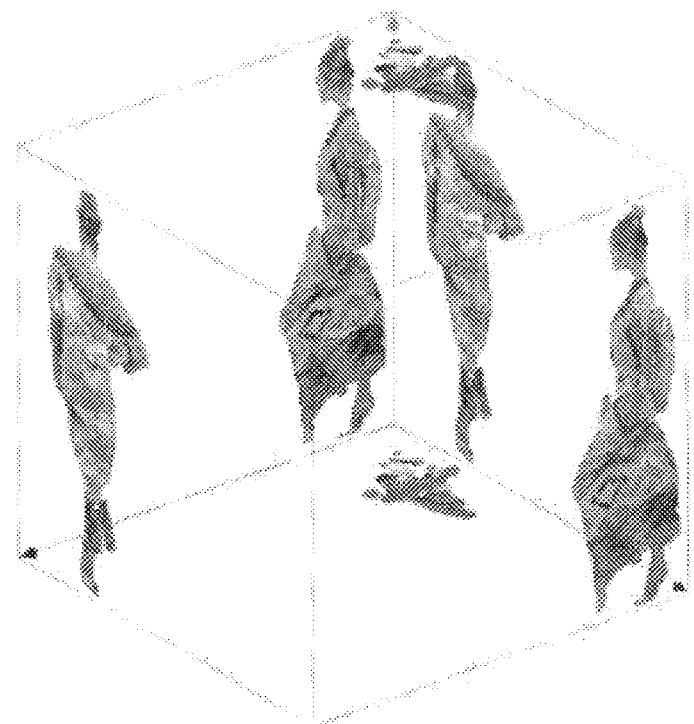
FIG. 6 illustrates an exemplary bounding box of a point cloud according to embodiments.

FIG. 6 illustrates an exemplary bounding box of a point cloud according to embodiments.

The bounding box according to the embodiments refers to a box of a unit for dividing point cloud data based on a hexahedron in a 3D space.

A method/device according to embodiments, for example, patch generator 14000 may use a bounding box in a process generating a patch from point cloud data.

The bounding box may be used in the process of projecting a target object of the point cloud data onto a plane of each planar face of a hexahedron in a 3D space. The bounding box may be generated and processed by the point cloud video acquisition unit 10001 and the point cloud video encoder 10002 of FIG. 1. Further, based on the bounding box, the patch generation 14000, patch packing 14001, geometry image generation 14002, and texture image generation 14003 of the V-PCC encoding process of FIG. 4 may be performed.

Segmentation Related to Patch Generation

Segmentation is divided into two processes: initial segmentation and refine segmentation.

The point cloud video encoder 10002 according to the embodiments projects a point onto one face of a bounding box. Specifically, each point constituting a point cloud is projected onto one of the six faces of a bounding box surrounding the point cloud as shown in FIG. 6. Initial segmentation is a process of determining one of the planar faces of the bounding box onto which each point is to be projected.

$\vec{n}_{Pidx}$, which is a normal value corresponding to each of the six planar faces, is defined as follows:
(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0).

As shown in the equation below, a face that yields the maximum value of dot product of the normal vector $\vec{n}_{pi}$ of each point, which is obtained in the normal value calculation process, and $\vec{n}_{Pidx}$ is determined as a projection plane of the corresponding point. That is, a plane whose normal vector is most similar to the direction of the normal vector of a point is determined as the projection plane of the point.

$$\max_{p_{idx}} \{\vec{n}_{p_i} \cdot \vec{n}_{p_{idx}}\}$$

The determined plane may be identified by one cluster index, which is one of 0 to 5.

Refine segmentation is a process of enhancing the projection plane of each point constituting the point cloud determined in the initial segmentation process in consideration of the projection planes of neighboring points. In this process, a score normal, which represents the degree of similarity between the normal vector of each point and the normal of each planar face of the bounding box which are considered in determining the projection plane in the initial segmentation process, and score smooth, which indicates the degree of similarity between the projection plane of the current point and the projection planes of neighboring points, may be considered together.

Score smooth may be considered by assigning a weight to the score normal. In this case, the weight value may be defined by the user. The refine segmentation may be performed repeatedly, and the number of repetitions may also be defined by the user.

Patch Segmentation Related to Patch Generation

Patch segmentation is a process of dividing the entire point cloud into patches, which are sets of neighboring points, based on the projection plane information about each point constituting the point cloud obtained in the initial/refine segmentation process. The patch segmentation may include the following steps:

1) Calculate neighboring points of each point constituting the point cloud, using the K-D tree or the like. The maximum number of neighbors may be defined by the user;

2) When the neighboring points are projected onto the same plane as the current point (when they have the same cluster index), extract the current point and the neighboring points as one patch;

3) Calculate geometry values of the extracted patch.

4) Repeat operations 2) to 3) until there is no unextracted point.

The occupancy map, geometry image and texture image for each patch as well as the size of each patch are determined through the patch segmentation process.

Figure 7:
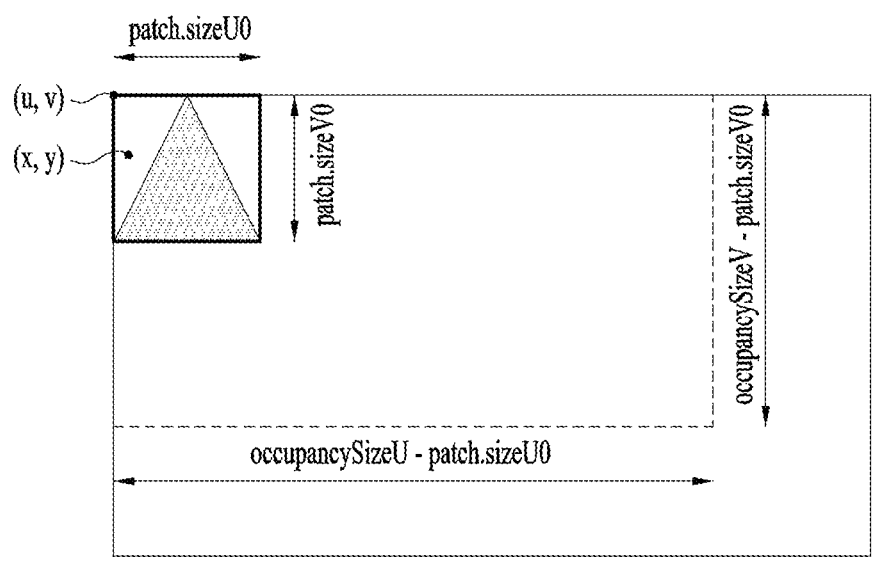
FIG. 7 illustrates an example of determination of individual patch positions on an occupancy map according to embodiments.

FIG. 7 illustrates an example of determination of individual patch positions on an occupancy map according to embodiments.

The point cloud video encoder 10002 according to the embodiments may perform patch packing and generate an occupancy map.

Patch Packing & Occupancy Map Generation (14001)

This is a process of determining the positions of individual patches in a 2D image to map the segmented patches to the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The process of determining the positions of individual patches on the occupancy map may be configured as follows:

1) Set all positions on the occupancy map to 0;

2) Place a patch at a point (u, v) having a horizontal coordinate within the range of (0, occupancySizeU-patch.sizeU0) and a vertical coordinate within the range of (0, occupancySizeV-patch.sizeV0) in the occupancy map plane;

3) Set a point (x, y) having a horizontal coordinate within the range of (0, patch.sizeU0) and a vertical coordinate within the range of (0, patch.sizeV0) in the patch plane as a current point;

4) Change the position of point (x, y) in raster order and repeat operations 3) and 4) if the value of coordinate (x, y) on the patch occupancy map is 1 (there is data at the point in the patch) and the value of coordinate (u+x, v+y) on the global occupancy map is 1 (the occupancy map is filled with the previous patch). Otherwise, proceed to operation 6);

5) Change the position of (u, v) in raster order and repeat operations 3) to 5);

6) Determine (u, v) as the position of the patch and copy the occupancy map data about the patch onto the corresponding portion on the global occupancy map; and 7) Repeat operations 2) to 6) for the next patch.

occupancySizeU: indicates the width of the occupancy map. The unit thereof is occupancy packing block size.

occupancySizeV: indicates the height of the occupancy map. The unit thereof is occupancy packing block size.

patch.sizeU0: indicates the width of the occupancy map. The unit thereof is occupancy packing block size.

patch.sizeV0: indicates the height of the occupancy map. The unit thereof is occupancy packing block size.

For example, as shown in FIG. 7, there is a box corresponding to a patch having a patch size in a box corresponding to an occupancy packing size block, and a point (x, y) may be located in the box.

Figure 8:
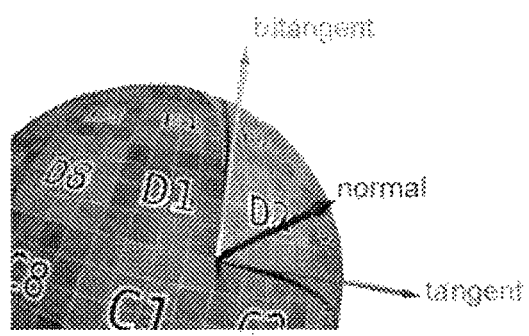
FIG. 8 shows an exemplary relationship among normal, tangent, and bitangent axes according to embodiments.

FIG. 8 shows an exemplary relationship among normal, tangent, and bitangent axes according to embodiments.

The point cloud video encoder 10002 according to embodiments may generate a geometry image. The geometry image refers to image data including geometry information about a point cloud. The geometry image generation process may employ three axes (normal, tangent, and bitangent) of a patch in FIG. 8.

Geometry Image Generation (14002)

In this process, the depth values constituting the geometry images of individual patches are determined, and the entire geometry image is generated based on the positions of the patches determined in the patch packing process described above. The process of determining the depth values constituting the geometry images of individual patches may be configured as follows.

1) Calculate parameters related to the position and size of an individual patch. The parameters may include the following information. According to an embodiment, a position of a patch is included in patch information.

A normal index indicating the normal axis is obtained in the previous patch generation process. The tangent axis is an axis coincident with the horizontal axis u of the patch image among the axes perpendicular to the normal axis, and the bitangent axis is an axis coincident with the vertical axis v of the patch image among the axes perpendicular to the normal axis. The three axes may be expressed as shown in FIG. 8.

Figure 9:
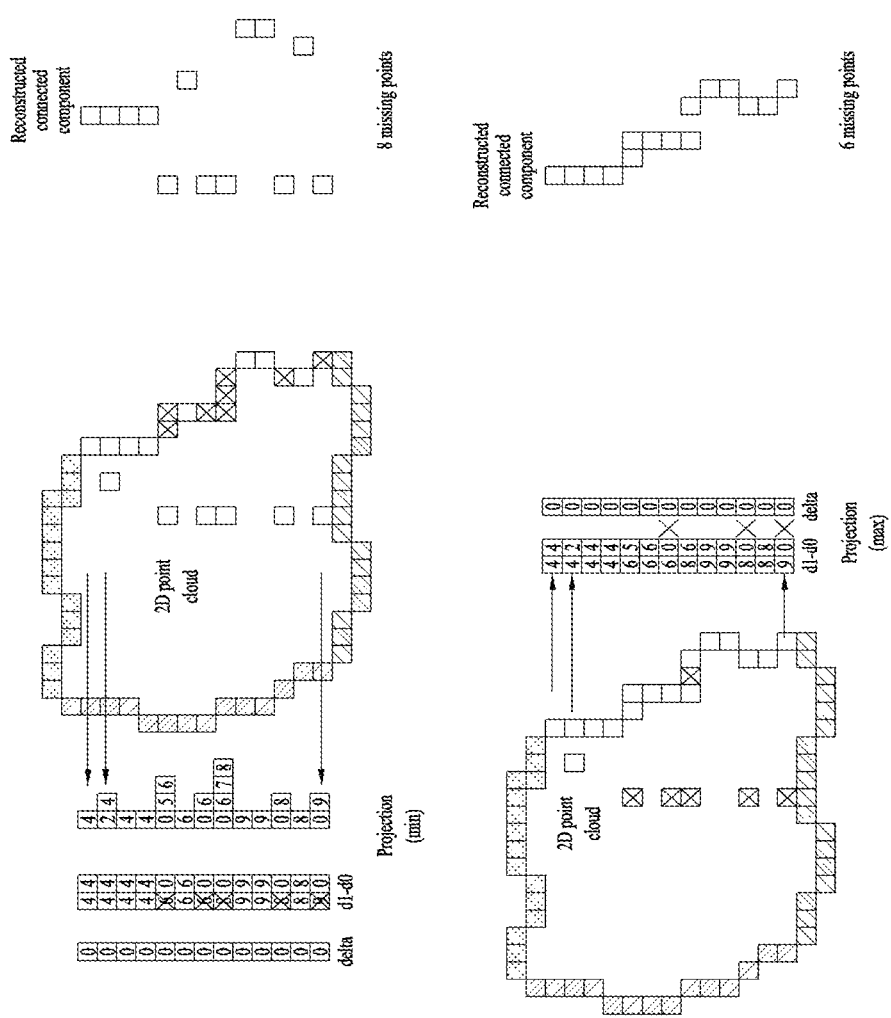
FIG. 9 shows an exemplary configuration of minimum mode and maximum mode of a projection mode according to embodiments.

FIG. 9 shows an exemplary configuration of the minimum mode and maximum mode of a projection mode according to embodiments.

The point cloud video encoder 10002 according to embodiments may perform patch-based projection to generate a geometry image, and the projection mode according to the embodiments includes a minimum mode and a maximum mode.

3D spatial coordinates of a patch may be calculated based on the bounding box of the minimum size surrounding the patch. For example, the 3D spatial coordinates may include the minimum tangent value of the patch (on the patch 3d shift tangent axis) of the patch, the minimum bitangent value of the patch (on the patch 3d shift bitangent axis), and the minimum normal value of the patch (on the patch 3d shift normal axis).

2D size of a patch indicates the horizontal and vertical sizes of the patch when the patch is packed into a 2D image. The horizontal size (patch 2d size u) may be obtained as a difference between the maximum and minimum tangent values of the bounding box, and the vertical size (patch 2d size v) may be obtained as a difference between the maximum and minimum bitangent values of the bounding box.

2) Determine a projection mode of the patch. The projection mode may be either the min mode or the max mode. The geometry information about the patch is expressed with a depth value. When each point constituting the patch is projected in the normal direction of the patch, two layers of images, an image constructed with the maximum depth value and an image constructed with the minimum depth value, may be generated.

In the min mode, in generating the two layers of images d0 and d1, the minimum depth may be configured for d0, and the maximum depth within the surface thickness from the minimum depth may be configured for d1, as shown in FIG. 9.

For example, when a point cloud is located in 2D as illustrated in FIG. 9, there may be a plurality of patches including a plurality of points. As shown in the figure, it is indicated that points marked with the same style of shadow may belong to the same patch. The figure illustrates the process of projecting a patch of points marked with blanks.

When projecting points marked with blanks to the left/right, the depth may be incremented by 1 as 0, 1, 2, . . . 6, 7, 8, 9 with respect to the left side, and the number for calculating the depths of the points may be marked on the right side.

The same projection mode may be applied to all point clouds or different projection modes may be applied to respective frames or patches according to user definition. When different projection modes are applied to the respective frames or patches, a projection mode that may enhance compression efficiency or minimize missed points may be adaptively selected.

3) Calculate the Depth Values of the Individual Points.

In the min mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the minimum normal value of each point. If there is another depth value within the range between depth0 and the surface thickness at the same position, this value is set to depth1. Otherwise, the value of depth0 is assigned to depth1. Image d1 is constructed with the value of depth1.

For example, a minimum value may be calculated in determining the depth of points of image d0 (4 2 4 4 0 6 0 0 9 9 0 8 0). In determining the depth of points of image d1, a greater value among two or more points may be calculated. When only one point is present, the value thereof may be calculated (4 4 4 4 6 6 8 9 9 8 8 9). In the process of encoding and reconstructing the points of the patch, some points may be lost (For example, in the figure, eight points are lost).

In the max mode, image d0 is constructed with depth0 which is a value obtained by subtracting the minimum normal value of the patch (on the patch 3d shift normal axis) calculated in operation 1) from the minimum normal value of the patch (on the patch 3d shift normal axis) for the maximum normal value of each point. If there is another depth value within the range between depth0 and the surface thickness at the same position, this value is set to depth1. Otherwise, the value of depth0 is assigned to depth1. Image d1 is constructed with the value of depth1.

For example, a maximum value may be calculated in determining the depth of points of d0 (4 4 4 4 6 6 6 8 9 9 8 8 9). In addition, in determining the depth of points of d1, a lower value among two or more points may be calculated. When only one point is present, the value thereof may be calculated (4 2 4 4 5 6 0 6 9 9 0 8 0). In the process of encoding and reconstructing the points of the patch, some points may be lost (For example, in the figure, six points are lost).

The entire geometry image may be generated by placing the geometry images of the individual patches generated through the above-described processes onto the entire geometry image based on the patch position information determined in the patch packing process.

Layer d1 of the generated entire geometry image may be encoded using various methods. A first method (absolute d1 encoding method) is to encode the depth values of the previously generated image d1. A second method (differential encoding method) is to encode a difference between the depth values of previously generated image d1 and the depth values of image d0.

In the encoding method using the depth values of the two layers, d0 and d1 as described above, if there is another point between the two depths, the geometry information about the point is lost in the encoding process, and therefore an enhanced-delta-depth (EDD) code may be used for lossless coding.

Hereinafter, the EDD code will be described in detail with reference to FIG. 10.

Figure 10:
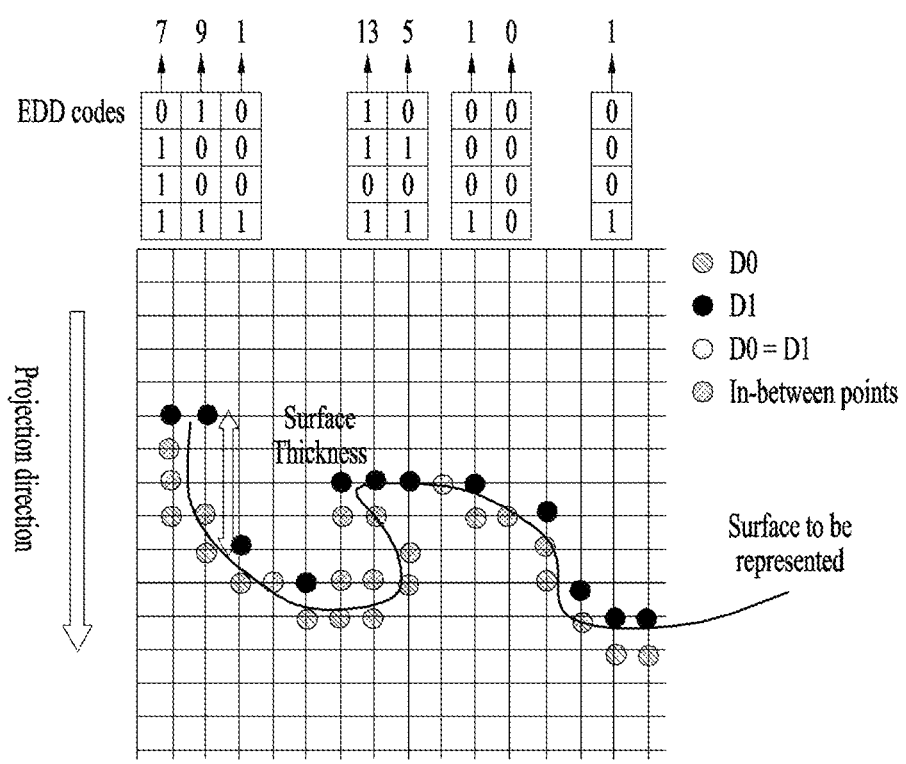
FIG. 10 illustrates an exemplary EDD code according to embodiments.

FIG. 10 illustrates an exemplary EDD code according to embodiments.

In some/all processes of the point cloud video encoder 10002 and/or V-PCC encoding (e.g., video compression 14009), the geometry information about points may be encoded based on the EOD code.

As shown in FIG. 10, the EDD code is used for binary encoding of the positions of all points within the range of surface thickness including d1. For example, in FIG. 10, the points included in the second left column may be represented by an EDD code of 0b1001 (=9) because the points are present at the first and fourth positions over D0 and the second and third positions are empty. When the EDD code is encoded together with D0 and transmitted, a reception terminal may restore the geometry information about all points without loss.

For example, when there is a point present above a reference point, the value is 1. When there is no point, the value is 0. Thus, the code may be expressed based on 4 bits.

Smoothing (14004)

Smoothing is an operation for eliminating discontinuity that may occur on the patch boundary due to deterioration of the image quality occurring during the compression process. Smoothing may be performed by the point cloud video encoder 10002 or smoother 14004:

1) Reconstruct the point cloud from the geometry image. This operation may be the reverse of the geometry image generation described above. For example, the reverse process of encoding may be reconstructed;

2) Calculate neighboring points of each point constituting the reconstructed point cloud using the K-D tree or the like;

3) Determine whether each of the points is positioned on the patch boundary. For example, when there is a neighboring point having a different projection plane (cluster index) from the current point, it may be determined that the point is positioned on the patch boundary;

4) If there is a point present on the patch boundary, move the point to the center of mass of the neighboring points (positioned at the average x, y, z coordinates of the neighboring points). That is, change the geometry value. Otherwise, maintain the previous geometry value.

Figure 11:
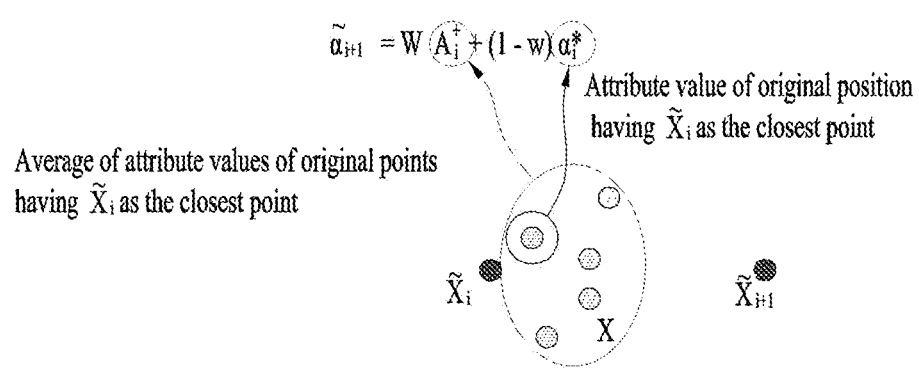
FIG. 11 illustrates an example of recoloring based on color values of neighboring points according to embodiments.

FIG. 11 illustrates an example of recoloring based on color values of neighboring points according to embodiments.

The point cloud video encoder 10002 or the texture image generator 14003 according to the embodiments may generate a texture image based on recoloring.

Texture Image Generation (14003)

The texture image generation process, which is similar to the geometry image generation process described above, includes generating texture images of individual patches and generating an entire texture image by arranging the texture images at determined positions. However, in the operation of generating texture images of individual patches, an image with color values (e.g., R, G, and B values) of the points constituting a point cloud corresponding to a position is generated in place of the depth values for geometry generation.

In estimating a color value of each point constituting the point cloud, the geometry previously obtained through the smoothing process may be used. In the smoothed point cloud, the positions of some points may have been shifted from the original point cloud, and accordingly a recoloring process of finding colors suitable for the changed positions may be required. Recoloring may be performed using the color values of neighboring points. For example, as shown in FIG. 11, a new color value may be calculated in consideration of the color value of the nearest neighboring point and the color values of the neighboring points.

For example, referring to FIG. 11, in the recoloring, a suitable color value for a changed position may be calculated based on the average of the attribute information about the closest original points to a point and/or the average of the attribute information about the closest original positions to the point.

Texture images may also be generated in two layers of t0 and t1, like the geometry images generated in two layers of d0 and d1.

Auxiliary Patch Information Compression (14005)

The point cloud video encoder 10002 or the auxiliary patch information compressor 14005 according to the embodiments may compress the auxiliary patch information (auxiliary information about the point cloud).

The auxiliary patch information compressor 14005 compresses the auxiliary patch information generated in the patch generation, patch packing, and geometry generation processes described above. The auxiliary patch information may include the following parameters:

Index (cluster index) for identifying the projection plane (normal plane);

3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);

2D spatial position and size of the patch, i.e., the horizontal size (patch 2d size u), the vertical size (patch 2d size v), the minimum horizontal value (patch 2d shift u), and the minimum vertical value (patch 2d shift v); and Mapping information about each block and patch, i.e., a candidate index (when patches are disposed in order based on the 2D spatial position and size information about the patches, multiple patches may be mapped to one block in an overlapping manner. In this case, the mapped patches constitute a candidate list, and the candidate index indicates the position in sequential order of a patch whose data is present in the block), and a local patch index (which is an index indicating one of the patches present in the frame). Table 1 shows a pseudo code representing the process of matching between blocks and patches based on the candidate list and the local patch indexes.

The maximum number of candidate lists may be defined by a user.

TABLE 1

```
for( i = 0; i < BlockCount; i++ ) {
if( candidatePatches[ i ].size( ) = = 1 ) {
blockToPatch[ i ] = candidatePatches[ i ][ 0 ]
} else {
candidate_index
if( candidate_index = = max_candidate_count ) {
blockToPatch[ i ] = local_patch_index
} else {
blockToPatch[ i ] = candidatePatches[ i ][ candidate_index ]
}
}
}
```

Figure 12:
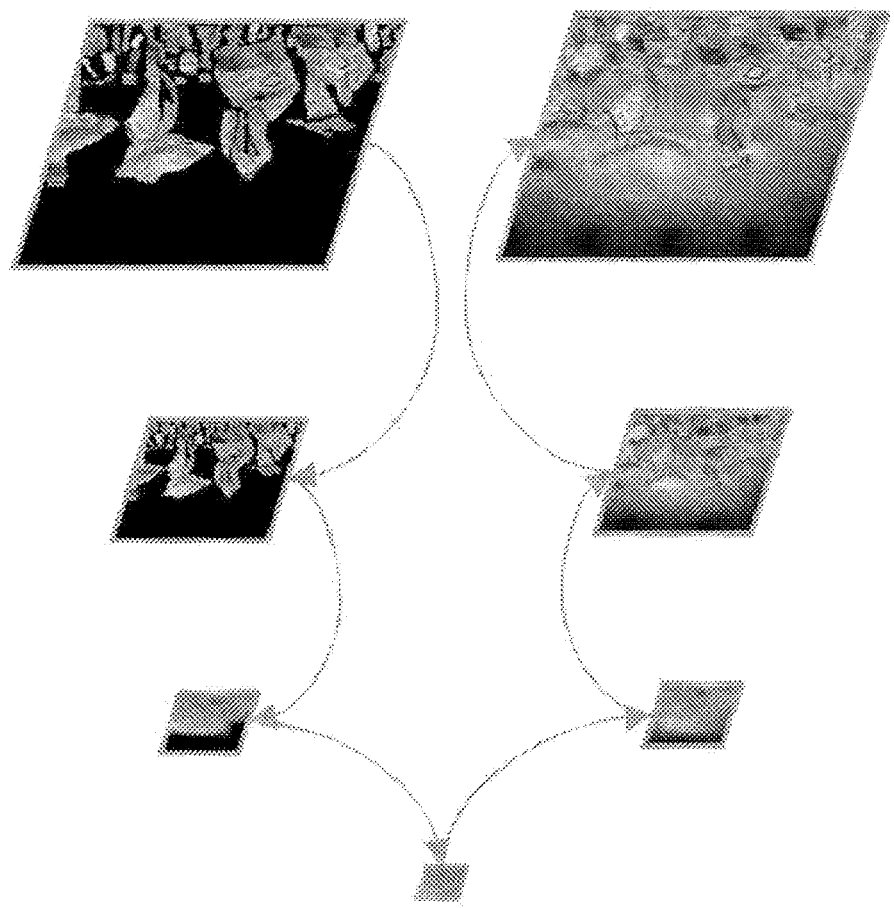
FIG. 12 illustrates an example of push-pull background filling according to embodiments.

FIG. 12 illustrates push-pull background filling according to embodiments.

Image Padding and Group Dilation (14006, 14007, 14008)

The image padder according to the embodiments may fill the space except the patch area with meaningless supplemental data based on the push-pull background filling technique.

Image padding 14006 and 14007 is a process of filling the space other than the patch region with meaningless data to improve compression efficiency. For image padding, pixel values in columns or rows close to a boundary in the patch may be copied to fill the empty space. Alternatively, as shown in FIG. 12, a push-pull background filling method may be used. According to this method, the empty space is filled with pixel values from a low resolution image in the process of gradually reducing the resolution of a non-padded image and increasing the resolution again.

Group dilation 14008 is a process of filling the empty spaces of a geometry image and a texture image configured in two layers, d0/d1 and t0/t1, respectively. In this process, the empty spaces of the two layers calculated through image padding are filled with the average of the values for the same position.

Figure 13:
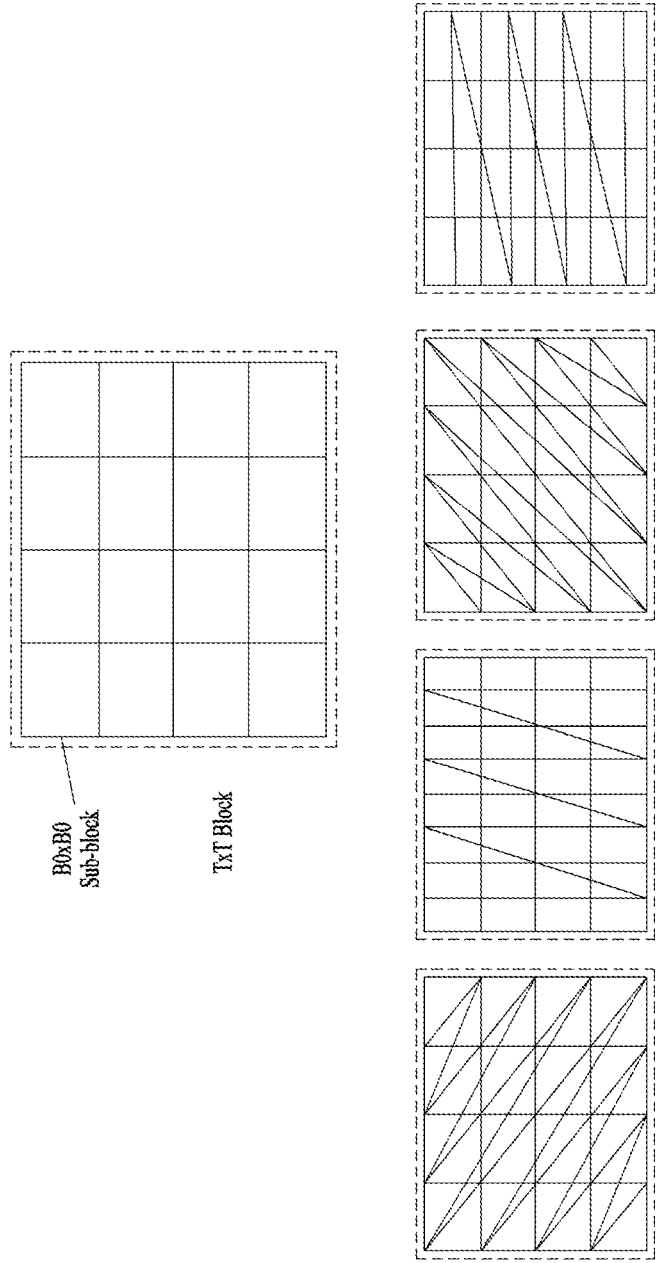
FIG. 13 shows an exemplary possible traversal order for a 4*4 block according to embodiments.

FIG. 13 shows an exemplary possible traversal order for a 4*4 block according to embodiments.

Occupancy Map Compression (14012, 14011)

The occupancy map compressor according to the embodiments may compress the previously generated occupancy map. Specifically, two methods, namely video compression for lossy compression and entropy compression for lossless compression, may be used. Video compression is described below.

The entropy compression may be performed through the following operations.

1) If a block constituting an occupancy map is fully occupied, encode 1 and repeat the same operation for the next block of the occupancy map. Otherwise, encode 0 and perform operations 2) to 5).

2) Determine the best traversal order to perform run-length coding on the occupied pixels of the block. FIG. 13 shows four possible traversal orders for a 4*4 block.

Figure 14:
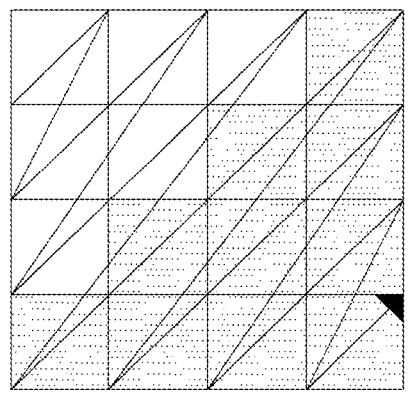
FIG. 14 illustrates an exemplary best traversal order according to embodiments.

FIG. 14 illustrates an exemplary best traversal order according to embodiments.

As described above, the entropy compressor according to the embodiments may code (encode) a block based on the traversal order scheme as shown in FIG. 14.

For example, the best traversal order with the minimum number of runs is selected from among the possible traversal orders and the index thereof is encoded. FIG. 14 illustrates a case where the third traversal order in FIG. 13 is selected. In the illustrated case, the number of runs may be minimized to 2, and therefore the third traversal order may be selected as the best traversal order.

3) Encode the number of runs. In the example of FIG. 14, there are two runs, and therefore 2 is encoded.

4) Encode the occupancy of the first run. In the example of FIG. 14, 0 is encoded because the first run corresponds to unoccupied pixels.

5) Encode lengths of the individual runs (as many as the number of runs). In the example of FIG. 14, the lengths of the first run and the second run, 6 and 10, are sequentially encoded.

Video Compression (14009, 14010, 14011)

The video compressors 14009, 14010, and 14011 according to the embodiments encodes a sequence of a geometry image, a texture image, an occupancy map image, and the like generated in the above-described operations, using a 2D video codec such as HEVC or VVC.

Figure 15:
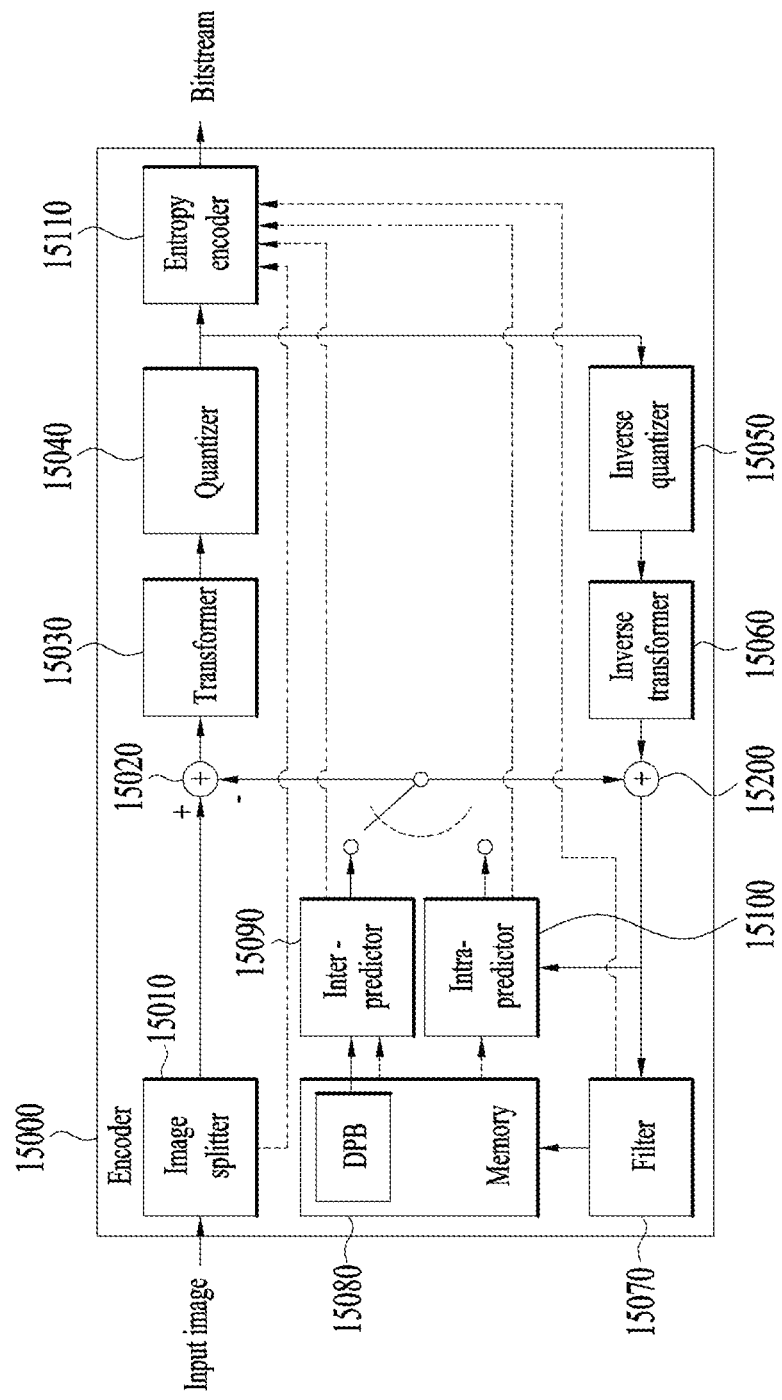
FIG. 15 illustrates an exemplary 2D video/image encoder according to embodiments.

FIG. 15 illustrates an exemplary 2D video/image encoder according to embodiments. According to embodiments, the 2D video/image encoder may be called an encoding device.

FIG. 15, which represents an embodiment to which the video compressors 14009, 14010, and 14011 described above is applied, is a schematic block diagram of a 2D video/image encoder 15000 configured to encode a video/image signal. The 2D video/image encoder 15000 may be included in the point cloud video encoder 10002 described above or may be configured as an internal/external component. Each component of FIG. 15 may correspond to software, hardware, processor and/or a combination thereof.

Here, the input image may be one of the geometry image, the texture image (attribute(s) image), and the occupancy map image described above. When the 2D video/image encoder of FIG. 15 is applied to the video compressor 14009, the image input to the 2D video/image encoder 15000 is a padded geometry image, and the bitstream output from the 2D video/image encoder 15000 is a bitstream of a compressed geometry image. When the 2D video/image encoder of FIG. 15 is applied to the video compressor 14010, the image input to the 2D video/image encoder 15000 is a padded texture image, and the bitstream output from the 2D video/image encoder 15000 is a bitstream of a compressed texture image. When the 2D video/image encoder of FIG. 15 is applied to the video compressor 14011, the image input to the 2D video/image encoder 15000 is an occupancy map image, and the bitstream output from the 2D video/image encoder 15000 is a bitstream of a compressed occupancy map image.

An inter-predictor 15090 and an intra-predictor 15100 may be collectively called a predictor. That is, the predictor may include the inter-predictor 15090 and the intra-predictor 15100. A transformer 15030, a quantizer 15040, an inverse quantizer 15050, and an inverse transformer 15060 may be collectively called a residual processor. The residual processor may further include a subtractor 15020. According to an embodiment, the image splitter 15010, the subtractor 15020, the transformer 15030, the quantizer 15040, the inverse quantizer 15050, the inverse transformer 15060, the adder 15200, the filter 15070, the inter-predictor 15090, the intra-predictor 15100, and the entropy encoder 15110 of FIG. 15 may be configured by one hardware component (e.g., an encoder or a processor). In addition, the memory 15080 may include a decoded picture buffer (DPB) and may be configured by a digital storage medium.

The image splitter 15010 may spit an image (or a picture or a frame) input to the encoder 15000 into one or more processing units. For example, the processing unit may be called a coding unit (CU). In this case, the CU may be recursively split from a coding tree unit (CTU) or a largest coding unit (LCU) according to a quad-tree binary-tree (QTBT) structure. For example, one CU may be split into a plurality of CUs of a lower depth based on a quad-tree structure and/or a binary-tree structure. In this case, for example, the quad-tree structure may be applied first and the binary-tree structure may be applied later. Alternatively, the binary-tree structure may be applied first. The coding procedure according to the present disclosure may be performed based on a final CU that is not split anymore. In this case, the LCU may be used as the final CU based on coding efficiency according to characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area or modle. In a general case, an M×N block may represent a set of samples or transform coefficients configured in M columns and N rows. A sample may generally represent a pixel or a value of a pixel, and may indicate only a pixel/pixel value of a luma component, or only a pixel/pixel value of a chroma component. "Sample" may be used as a term corresponding to a pixel or a pel in one picture (or image).

The subtractor 15020 of the encoding device 15000 may generate a residual signal (residual block or residual sample array) by subtracting a prediction signal (predicted block or predicted sample array) output from the inter-predictor 15090 or the intra-predictor 15100 from an input image signal (original block or original sample array), and the generated residual signal is transmitted to the transformer 15030. In this case, as shown in the figure, the unit that subtracts the prediction signal (predicted block or predicted sample array) from the input image signal (original block or original sample array) in the encoding device 15000 may be called a subtractor 15020. The predictor may perform prediction for a processing target block (hereinafter referred to as a current block) and generate a predicted block including prediction samples for the current block. The predictor may determine whether intra-prediction or inter-prediction is applied on a current block or CU basis. As will be described later in the description of each prediction mode, the predictor may generate various kinds of information about prediction, such as prediction mode information, and deliver the generated information to the entropy encoder 15110. The information about the prediction may be encoded and output in the form of a bitstream by the entropy encoder 15110.

The intra-predictor 15100 of the predictor may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes according to fineness of the prediction directions. However, this is merely an example, and more or fewer directional prediction modes may be used depending on the setting. The intra-predictor 15100 may determine a prediction mode to be applied to the current block, based on the prediction mode applied to the neighboring block.

The inter-predictor 15090 of the predictor may derive a predicted block for the current block based on a reference block (reference sample array) specified by a motion vector on the reference picture. In this case, in order to reduce the amount of motion information transmitted in the inter-prediction mode, the motion information may be predicted on a per block, subblock, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block. The temporal neighboring block may be referred to as a collocated reference block or a collocated CU (colCU), and the reference picture including the temporal neighboring block may be referred to as a collocated picture (colPic). For example, the inter-predictor 15090 may configure a motion information candidate list based on the neighboring blocks and generate information indicating a candidate to be used to derive a motion vector and/or a reference picture index of the current block. Inter-prediction may be performed based on various prediction modes. For example, in a skip mode and a merge mode, the inter-predictor 15090 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The prediction signal generated by the inter-predictor 15090 or the intra-predictor 15100 may be used to generate a reconstruction signal or to generate a residual signal.

The transformer 15030 may generate transform coefficients by applying a transformation technique to the residual signal. For example, the transformation technique may include at least one of discrete cosine transform (DCT), discrete sine transform (DST), Karhunen-Loève transform (KLT), graph-based transform (GBT), or conditionally non-linear transform (CNT). Here, the GBT refers to transformation obtained from a graph depicting the relationship between pixels. The CNT refers to transformation obtained based on a prediction signal generated based on all previously reconstructed pixels. In addition, the transformation operation may be applied to pixel blocks having the same size of a square, or may be applied to blocks of a variable size other than the square.

The quantizer 15040 may quantize the transform coefficients and transmit the same to the entropy encoder 15110. The entropy encoder 15110 may encode the quantized signal (information about the quantized transform coefficients) and output a bitstream of the encoded signal. The information about the quantized transform coefficients may be referred to as residual information. The quantizer 15040 may rearrange the quantized transform coefficients, which are in a block form, in the form of a one-dimensional vector based on a coefficient scan order, and generate information about the quantized transform coefficients based on the quantized transform coefficients in the form of the one-dimensional vector.

The entropy encoder 15110 may employ various encoding techniques such as, for example, exponential Golomb, context-adaptive variable length coding (CAVLC), and context-adaptive binary arithmetic coding (CABAC). The entropy encoder 15110 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis.

The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 15110 and/or a storage (not shown) to store the signal may be configured as internal/external elements of the encoder 15000. Alternatively, the transmitter may be included in the entropy encoder 15110.

The quantized transform coefficients output from the quantizer 15040 may be used to generate a prediction signal. For example, inverse quantization and inverse transform may be applied to the quantized transform coefficients through the inverse quantizer 15050 and the inverse transformer 15060 to reconstruct the residual signal (residual block or residual samples). The adder 15200 may add the reconstructed residual signal to the prediction signal output from the inter-predictor 15090 or the intra-predictor 15100. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 15200 may be called a reconstructor or a reconstructed block generator. The generated reconstructed signal may be used for intra-prediction of the next processing target block in the current picture, or may be used for inter-prediction of the next picture through filtering as described below.

The filter 15070 may improve subjective/objective image quality by applying filtering to the reconstructed signal output from the adder 15200. For example, the filter 15070 may generate a modified reconstructed picture by applying various filtering techniques to the reconstructed picture, and the modified reconstructed picture may be stored in the memory 15080, specifically, the DPB of the memory 15080. The various filtering techniques may include, for example, deblocking filtering, sample adaptive offset, adaptive loop filtering, and bilateral filtering. As described below in the description of the filtering techniques, the filter 15070 may generate various kinds of information about filtering and deliver the generated information to the entropy encoder 15110. The information about filtering may be encoded and output in the form of a bitstream by the entropy encoder 15110.

The modified reconstructed picture stored in the memory 15080 may be used as a reference picture by the inter-predictor 15090. Thus, when inter-prediction is applied, the encoder may avoid prediction mismatch between the encoder 15000 and the decoder and improve encoding efficiency.

The DPB of the memory 15080 may store the modified reconstructed picture so as to be used as a reference picture by the inter-predictor 15090. The memory 15080 may store the motion information about a block from which the motion information in the current picture is derived (or encoded) and/or the motion information about the blocks in a picture that has already been reconstructed. The stored motion information may be delivered to the inter-predictor 15090 so as to be used as motion information about a spatial neighboring block or motion information about a temporal neighboring block. The memory 15080 may store the reconstructed samples of the reconstructed blocks in the current picture and deliver the reconstructed samples to the intra-predictor 15100.

At least one of the prediction, transform, and quantization procedures described above may be skipped. For example, for a block to which the pulse code modulation (PCM) is applied, the prediction, transform, and quantization procedures may be skipped, and the value of the original sample may be encoded and output in the form of a bitstream.

Figure 16:
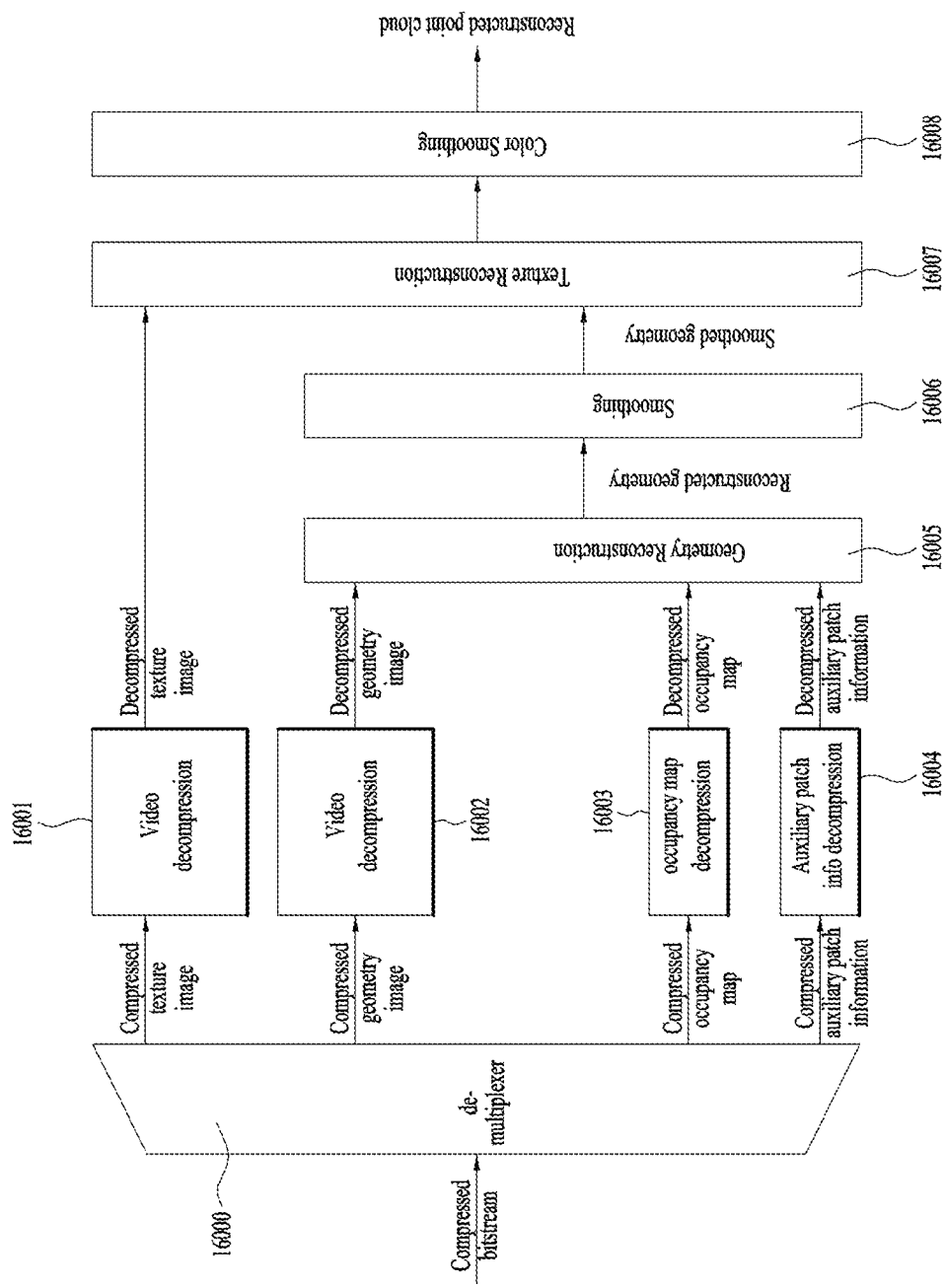
FIG. 16 illustrates an exemplary V-PCC decoding process according to embodiments.

FIG. 16 illustrates an exemplary V-PCC decoding process according to embodiments.

The V-PCC decoding process or V-PCC decoder may follow the reverse process of the V-PCC encoding process (or encoder) of FIG. 4. Each component in FIG. 16 may correspond to software, hardware, a processor, and/or a combination thereof.

The demultiplexer 16000 demultiplexes the compressed bitstream to output a compressed texture image, a compressed geometry image, a compressed occupancy map, and a compressed auxiliary patch information, respectively.

The video decompression or video decompressors 16001 and 16002 decompress each of the compressed texture image and the compressed geometry image.

The occupancy map decompression or occupancy map decompressor 16003 decompresses the compressed occupancy map image.

The auxiliary patch information decompression or auxiliary patch information decompressor 16004 decompresses the compressed auxiliary patch information.

The geometry reconstruction or geometry reconstructor 16005 restores (reconstructs) the geometry information based on the decompressed geometry image, the decompressed occupancy map, and/or the decompressed auxiliary patch information. For example, the geometry changed in the encoding process may be reconstructed.

The smoothing or smoother 16006 may apply smoothing to the reconstructed geometry. For example, smoothing filtering may be applied.

The texture reconstruction or texture reconstructor 16007 reconstructs the texture from the decompressed texture image and/or the smoothed geometry.

The color smoothing or color smoother 16008 smooths color values from the reconstructed texture. For example, smoothing filtering may be applied.

As a result, reconstructed point cloud data may be generated.

FIG. 16 illustrates a decoding process of the V-PCC for reconstructing a point cloud by decompressing (decoding) the compressed occupancy map, geometry image, texture image, and auxiliary patch information.

Each of the units illustrated in FIG. 16 may operate as at least one of a processor, software, and hardware. Detailed operations of each unit of FIG. 16 according to embodiments are described below.

Video Decompression (16001, 16002)

Video decompression is a reverse process of the video compression described above. It is a process of decoding the bitstream of a geometry image, the bitstream of a compressed texture image, and/or the bitstream of a compressed occupancy map image generated in the above-described process, using a 2D video codec such as HEVC and VVC.

Figure 17:
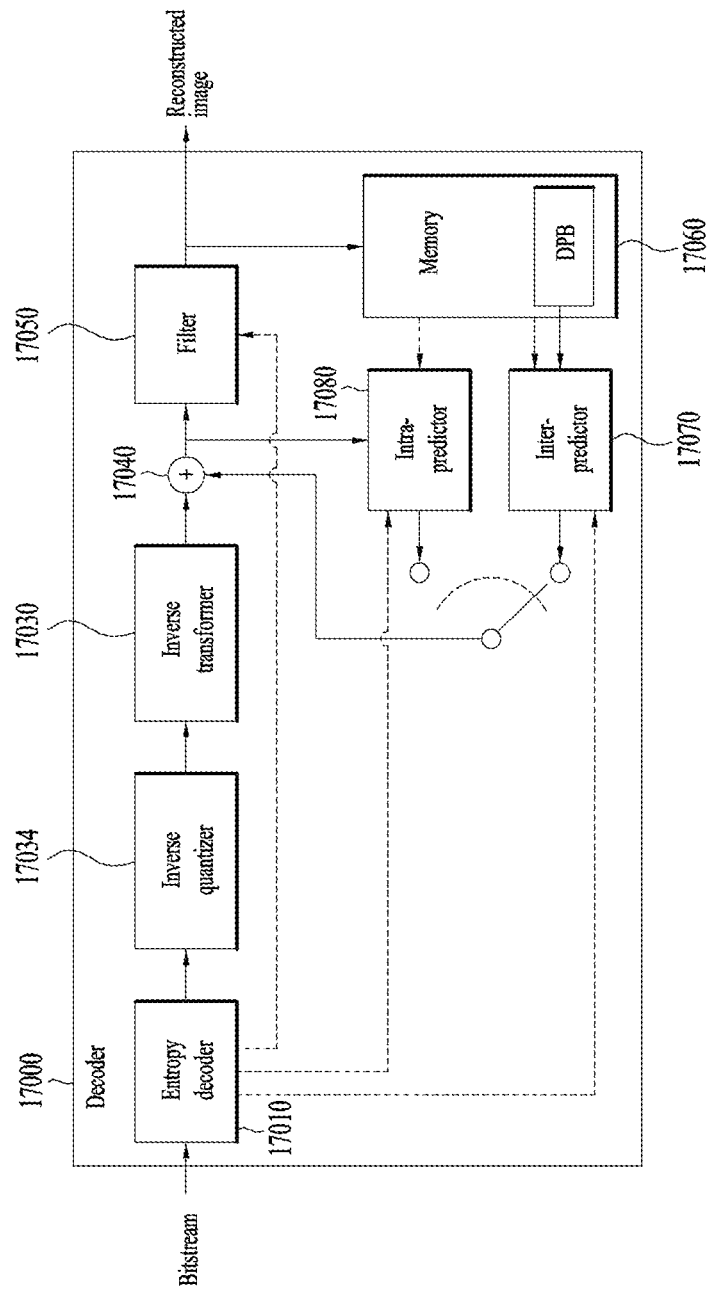
FIG. 17 shows an exemplary 2D video/image decoder according to embodiments.

FIG. 17 illustrates an exemplary 2D video/image decoder according to embodiments, which is also referred to as a decoding device.

The 2D video/image decoder may follow the reverse process of the operation of the 2D video/image encoder of FIG. 15.

The 2D video/image decoder of FIG. 17 is an embodiment of the video decompressors 16001 and 16002 of FIG. 16. FIG. 17 is a schematic block diagram of a 2D video/image decoder 17000 by which a video/image signal is decoded. The 2D video/image decoder 17000 may be included in the point cloud video decoder 10008 described above, or may be configured as an internal/external component. Each component in FIG. 17 may correspond to software, hardware, a processor, and/or a combination thereof.

Here, the input bitstream may be one of a bitstream of a geometry image, a bitstream of a texture image (attribute(s) image), and a bitstream of an occupancy map image. When the 2D video/image decoder of FIG. 17 is applied to the video decompressor 16001, the bitstream input to the 2D video/image decoder is a bitstream of a compressed texture image, and the reconstructed image output from the 2D video/image decoder is a decompressed texture image. When the 2D video/image decoder of FIG. 17 is applied to the video decompressor 16002, the bitstream input to the 2D video/image decoder is a bitstream of a compressed geometry image, and the reconstructed image output from the 2D video/image decoder is a decompressed geometry image. The 2D video/image decoder of FIG. 17 may receive a bitstream of a compressed occupancy map image and decompress the same. The reconstructed image (or the output image or decoded image) may represent a reconstructed image for the above-described geometry image, texture image (attribute(s) image), and occupancy map image.

Referring to FIG. 17, an inter-predictor 17070 and an intra-predictor 17080 may be collectively referred to as a predictor. That is, the predictor may include the inter-predictor 17070 and the intra-predictor 17080. An inverse quantizer 17020 and an inverse transformer 17030 may be collectively referred to as a residual processor. That is, the residual processor may include the inverse quantizer 17020 and the inverse transformer 17030. The entropy decoder 17010, the inverse quantizer 17020, the inverse transformer 17030, the adder 17040, the filter 17050, the inter-predictor 17070, and the intra-predictor 17080 of FIG. 17 may be configured by one hardware component (e.g., a decoder or a processor) according to an embodiment. In addition, the memory 17060 may include a decoded picture buffer (DPB) or may be configured by a digital storage medium.

When a bitstream containing video/image information is input, the decoder 17000 may reconstruct an image in a process corresponding to the process in which the video/image information is processed by the encoder of FIG. 15. For example, the decoder 17000 may perform decoding using a processing unit applied in the encoder. Thus, the processing unit of decoding may be, for example, a CU. The CU may be split from a CTU or an LCU along a quad-tree structure and/or a binary-tree structure. Then, the reconstructed video signal decoded and output through the decoder 17000 may be played through a player.

The decoder 17000 may receive a signal output from the encoder in the form of a bitstream, and the received signal may be decoded through the entropy decoder 17010. For example, the entropy decoder 17010 may parse the bitstream to derive information (e.g., video/image information) necessary for image reconstruction (or picture reconstruction). For example, the entropy decoder 17010 may decode the information in the bitstream based on a coding technique such as exponential Golomb coding, CAVLC, or CABAC, output values of syntax elements required for image reconstruction, and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted according to the determined context model, and arithmetic decoding of the bin may be performed to generate a symbol corresponding to the value of each syntax element. According to the CABAC entropy decoding, after a context model is determined, the context model may be updated based on the information about the symbol/bin decoded for the context model of the next symbol/bin. Information about the prediction in the information decoded by the entropy decoder 17010 may be provided to the predictors (the inter-predictor 17070 and the intra-predictor 17080), and the residual values on which entropy decoding has been performed by the entropy decoder 17010, that is, the quantized transform coefficients and related parameter information, may be input to the inverse quantizer 17020. In addition, information about filtering of the information decoded by the entropy decoder 17010 may be provided to the filter 17050. A receiver (not shown) configured to receive a signal output from the encoder may be further configured as an internal/external element of the decoder 17000. Alternatively, the receiver may be a component of the entropy decoder 17010.

The inverse quantizer 17020 may output transform coefficients by inversely quantizing the quantized transform coefficients. The inverse quantizer 17020 may rearrange the quantized transform coefficients in the form of a two-dimensional block. In this case, the rearrangement may be performed based on the coefficient scan order implemented by the encoder. The inverse quantizer 17020 may perform inverse quantization on the quantized transform coefficients using a quantization parameter (e.g., quantization step size information), and acquire transform coefficients.

The inverse transformer 17030 acquires a residual signal (residual block and residual sample array) by inversely transforming the transform coefficients.

The predictor may perform prediction on the current block and generate a predicted block including prediction samples for the current block. The predictor may determine whether intra-prediction or inter-prediction is to be applied to the current block based on the information about the prediction output from the entropy decoder 17010, and may determine a specific intra-/inter-prediction mode.

The intra-predictor 17080 of the predictor may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 17080 may determine a prediction mode to be applied to the current block, using the prediction mode applied to the neighboring block.

The inter-predictor 17070 of the predictor may derive a predicted block for the current block based on a reference block (reference sample array) specified by a motion vector on the reference picture. In this case, in order to reduce the amount of motion information transmitted in the inter-prediction mode, the motion information may be predicted on per a block, subblock, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 17070 may configure a motion information candidate list based on neighboring blocks and derive a motion vector of the current block and/or a reference picture index based on the received candidate selection information. Inter-prediction may be performed based on various prediction modes. The information about the prediction may include information indicating an inter-prediction mode for the current block.

The adder 17040 may add the acquired residual signal in the inverse transformer 17030 to the prediction signal (predicted block or prediction sample array) output from the inter-predictor 17070 or the intra-predictor 17080, thereby generating a reconstructed signal (a reconstructed picture, a reconstructed block, or a reconstructed sample array). When there is no residual signal for a processing target block as in the case where the skip mode is applied, the predicted block may be used as the reconstructed block.

The adder 17040 may be called a reconstructor or a reconstructed block generator. The generated reconstructed signal may be used for intra-prediction of the next processing target block in the current picture, or may be used for inter-prediction of the next picture through filtering as described below.

The filter 17050 may improve subjective/objective image quality by applying filtering to the reconstructed signal output from the adder 17040. For example, the filter 17050 may generate a modified reconstructed picture by applying various filtering techniques to the reconstructed picture, and may transmit the modified reconstructed picture to the memory 17060, specifically, the DPB of the memory 17060. The various filtering techniques may include, for example, deblocking filtering, sample adaptive offset, adaptive loop filtering, and bilateral filtering.

The reconstructed picture stored in the DPB of the memory 17060 may be used as a reference picture in the inter-predictor 17070. The memory 17060 may store the motion information about a block from which the motion information is derived (or decoded) in the current picture and/or the motion information about the blocks in a picture that has already been reconstructed. The stored motion information may be delivered to the inter-predictor 17070 so as to be used as the motion information about a spatial neighboring block or the motion information about a temporal neighboring block. The memory 17060 may store the reconstructed samples of the reconstructed blocks in the current picture, and deliver the reconstructed samples to the intra-predictor 17080.

In the present disclosure, the embodiments described regarding the filter 15070, the inter-predictor 15090, and the intra-predictor 15100 of the encoder 15000 of FIG. 15 may be applied to the filter 17050, the inter-predictor 17070 and the intra-predictor 17080 of the decoder 17000, respectively, in the same or corresponding manner.

At least one of the prediction, inverse transform, and inverse quantization procedures described above may be skipped. For example, for a block to which the pulse code modulation (PCM) is applied, the prediction, inverse transform, and inverse quantization procedures may be skipped, and the value of a decoded sample may be used as a sample of the reconstructed image.

Occupancy Map Decompression (16003)

This is a reverse process of the occupancy map compression described above.

Occupancy map decompression is a process for reconstructing the occupancy map by decompressing the occupancy map bitstream.

Auxiliary Patch Information Decompression (16004)

The auxiliary patch information may be reconstructed by performing the reverse process of the aforementioned auxiliary patch information compression and decoding the compressed auxiliary patch information bitstream.

Geometry Reconstruction (16005)

This is a reverse process of the geometry image generation described above. Initially, a patch is extracted from the geometry image using the reconstructed occupancy map, the 2D position/size information about the patch included in the auxiliary patch information, and the information about mapping between a block and the patch. Then, a point cloud is reconstructed in a 3D space based on the geometry image of the extracted patch and the 3D position information about the patch included in the auxiliary patch information. When the geometry value corresponding to a point (u, v) within the patch is g(u, v), and the coordinates of the position of the patch on the normal, tangent and bitangent axes of the 3D space are (δ0, s0, r0), δ(u, v), s(u, v), and r(u, v), which are the normal, tangent, and bitangent coordinates in the 3D space of a position mapped to point (u, v) may be expressed as follows:

$$\delta(u,v)=\delta 0+g(u,v)$$

$$s(u,v)=s0+u$$

$$r(u,v)=r0+v.$$

Smoothing (16006)

Smoothing, which is the same as the smoothing in the encoding process described above, is a process for eliminating discontinuity that may occur on the patch boundary due to deterioration of the image quality occurring during the compression process.

Texture Reconstruction (16007)

Texture reconstruction is a process of reconstructing a color point cloud by assigning color values to each point constituting a smoothed point cloud. It may be performed by assigning color values corresponding to a texture image pixel at the same position as in the geometry image in the 2D space to points of a point of a point cloud corresponding to the same position in the 3D space, based on the geometry image reconstructed in the geometry reconstruction process and the mapping information of the point cloud described above.

Color Smoothing (16008)

Color smoothing is similar to the process of geometry smoothing described above. Color smoothing is a process for eliminating discontinuity that may occur on the patch boundary due to deterioration of the image quality occurring during the compression process. Color smoothing may be performed through the following operations:

1) Calculate neighboring points of each point constituting the reconstructed point cloud using the K-D tree or the like. The neighboring point information calculated in the geometry smoothing process described above may be used.

2) Determine whether each of the points is positioned on the patch boundary. These operations may be performed based on the boundary information calculated in the geometry smoothing process described above.

3) Check the distribution of color values for the neighboring points of the points present on the boundary and determine whether smoothing is to be performed. For example, when the entropy of luminance values is less than or equal to a threshold local entry (there are many similar luminance values), it may be determined that the corresponding portion is not an edge portion, and smoothing may be performed. As a method of smoothing, the color value of the point may be replaced with the average of the color values of the neighboring points.

Figure 18:
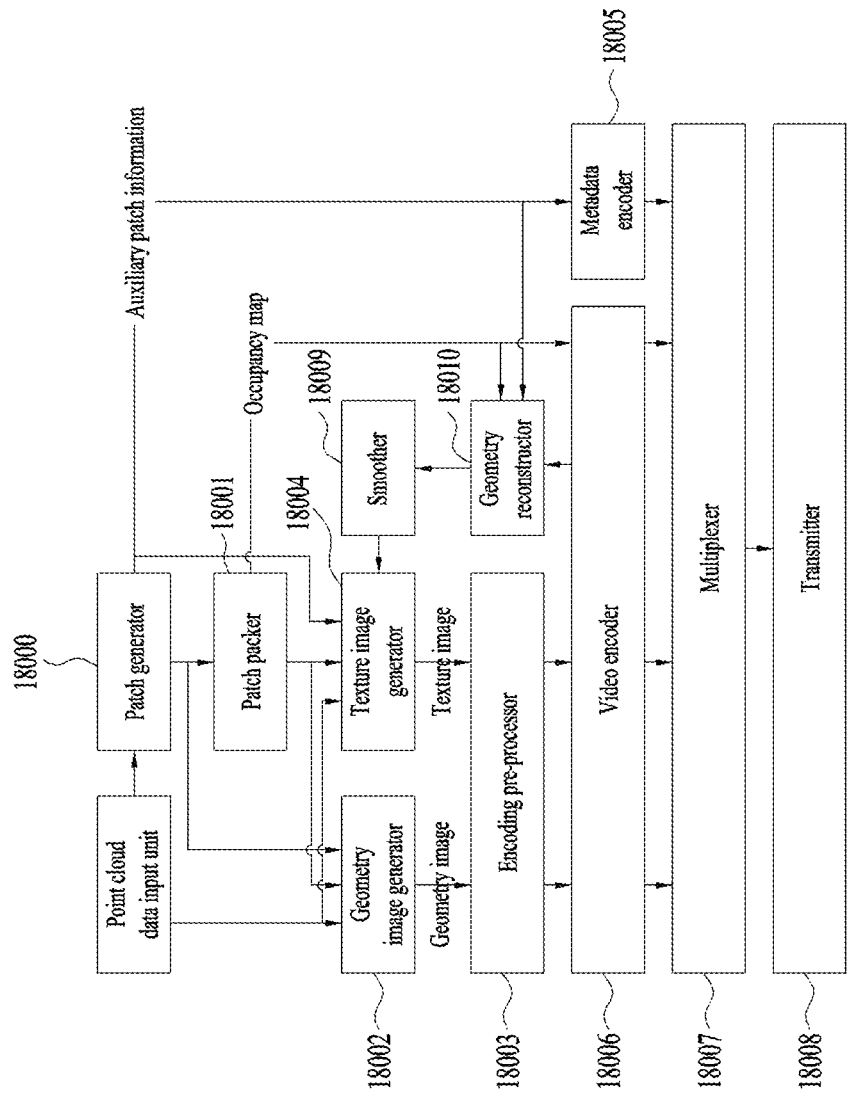
FIG. 18 is a flowchart illustrating operation of a transmission device according to embodiments of the present disclosure.

FIG. 18 is a flowchart illustrating operation of a transmission device for compression and transmission of V-PCC based point cloud data according to embodiments of the present disclosure.

The transmission device according to the embodiments may correspond to the transmission device of FIG. 1, the encoding process of FIG. 4, and the 2D video/image encoder of FIG. 15, or perform some/all of the operations thereof. Each component of the transmission device may correspond to software, hardware, a processor and/or a combination thereof.

An operation process of the transmission terminal for compression and transmission of point cloud data using V-PCC may be performed as illustrated in the figure.

The point cloud data transmission device according to the embodiments may be referred to as a transmission device or a transmission system.

Regarding a patch generator 18000, a patch for 2D image mapping of a point cloud is generated based on input point cloud data. Patch information and/or auxiliary patch information is generated as a result of the patch generation. The generated patch information and/or auxiliary patch information may be used in the processes of geometry image generation, texture image generation, smoothing, and geometry reconstruction for smoothing.

The patch packer 18001 performs a patch packing process of mapping the patches generated by the patch generator 18000 into a 2D image. For example, one or more patches may be packed. An occupancy map may be generated as a result of the patch packing. The occupancy map may be used in the processes of geometry image generation, geometry image padding, texture image padding, and/or geometry reconstruction for smoothing.

The geometry image generator 18002 generates a geometry image based on the point cloud data, the patch information (or auxiliary patch information), and/or the occupancy map. The generated geometry image is pre-processed by the encoding pre-processor 18003 and then encoded into one bitstream by the video encoder 18006.

The encoding pre-processor 18003 may include an image padding procedure. In other words, the generated geometry image and some spaces in the generated texture image may be padded with meaningless data. The encoding pre-processor 18003 may further include a group dilation procedure for the generated texture image or the texture image on which image padding has been performed.

The geometry reconstructor 18010 reconstructs a 3D geometry image based on the geometry bitstream, auxiliary patch information, and/or occupancy map encoded by the video encoder 18006.

The smoother 18009 smoothes the 3D geometry image reconstructed and output by the geometry reconstructor 18010 based on the auxiliary patch information, and outputs the smoothed 3D geometry image to the texture image generator 18004.

The texture image generator 18004 may generate a texture image based on the smoothed 3D geometry, point cloud data, patch (or packed patch), patch information (or auxiliary patch information), and/or occupancy map. The generated texture image may be pre-processed by the encoding pre-processor 18003 and then encoded into one video bitstream by the video encoder 18006.

The metadata encoder 18005 may encode the auxiliary patch information into one metadata bitstream.

The video encoder 18006 may encode the geometry image and the texture image output from the encoding pre-processor 18003 into respective video bitstreams, and may encode the occupancy map into one video bitstream. According to an embodiment, the video encoder 18006 encodes each input image by applying the 2D video/image encoder of FIG. 15.

The multiplexer 18007 multiplexes the video bitstream of geometry, the video bitstream of the texture image, the video bitstream of the occupancy map, which are output from the video encoder 18006, and the bitstream of the metadata (including auxiliary patch information), which is output from the metadata encoder 18005, into one bitstream.

The transmitter 18008 transmits the bitstream output from the multiplexer 18007 to the receiving side. Alternatively, a file/segment encapsulator may be further provided between the multiplexer 18007 and the transmitter 18008, and the bitstream output from the multiplexer 18007 may be encapsulated in the form of a file and/or segment and output to the transmitter 18008.

The patch generator 18000, the patch packer 18001, the geometry image generator 18002, the texture image generator 18004, the metadata encoder 18005, and the smoother 18009 of FIG. 18 may correspond to the patch generation 14000, the patch packing 14001, the geometry image generation 14002, the texture image generation 14003, the auxiliary patch information compression 14005, and the smoothing 14004, respectively. The encoding pre-processor 18003 of FIG. 18 may include the image padders 14006 and 14007 and the group dilator 14008 of FIG. 4, and the video encoder 18006 of FIG. 18 may include the video compressors 14009, 14010, and 14011 and/or the entropy pressor 14012 of FIG. 4. For parts not described with reference to FIG. 18, refer to the description of FIGS. 4 to 15. The above-described blocks may be omitted or may be replaced by blocks having similar or identical functions. In addition, each of the blocks shown in FIG. 18 may operate as at least one of a processor, software, or hardware. Alternatively, the generated video bitstreams of the geometry, the texture image, and the occupancy map and the metadata bitstream of the auxiliary patch information may be formed into one or more track data in a file or encapsulated into segments and transmitted to the receiving side through a transmitter.

Procedure of Operating the Reception Device

Figure 19:
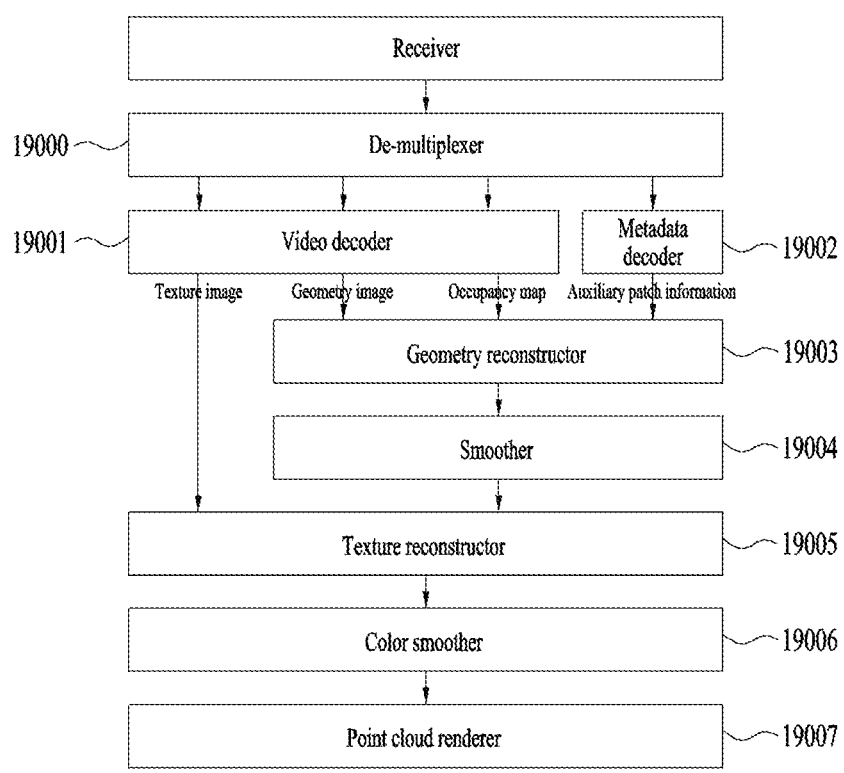
FIG. 19 is a flowchart illustrating operation of a reception device according to embodiments.

FIG. 19 is a flowchart illustrating operation of a reception device for receiving and restoring V-PCC-based point cloud data according to embodiments.

The reception device according to the embodiments may correspond to the reception device of FIG. 1, the decoding process of FIG. 16, and the 2D video/image encoder of FIG. 17, or perform some/all of the operations thereof. Each component of the reception device may correspond to software, hardware, a processor and/or a combination thereof.

The operation of the reception terminal for receiving and reconstructing point cloud data using V-PCC may be performed as illustrated in the figure. The operation of the V-PCC reception terminal may follow the reverse process of the operation of the V-PCC transmission terminal of FIG. 18.

The point cloud data reception device according to the embodiments may be referred to as a reception device, a reception system, or the like.

The receiver receives a bitstream (i.e., compressed bitstream) of a point cloud, and the demultiplexer 19000 demultiplexes a bitstream of a texture image, a bitstream of a geometry image, and a bitstream of an occupancy map image, and a bitstream of metadata (i.e., auxiliary patch information) from the received point cloud bitstream. The demultiplexed bitstreams of the texture image, the geometry image, and the occupancy map image are output to the video decoder 19001, and the bitstream of the metadata is output to the metadata decoder 19002.

According to an embodiment, when the transmission device of FIG. 18 is provided with a file/segment encapsulator, a file/segment decapsulator is provided between the receiver and the demultiplexer 19000 of the receiving device of FIG. 19 as. In this case, the transmission device encapsulates and transmits the point cloud bitstream in the form of a file and/or segment, and the reception device receives and decapsulates the file and/or segment containing the point cloud bitstream.

The video decoder 19001 decodes the bitstream of the geometry image, the bitstream of the texture image, and the bitstream of the occupancy map image into the geometry image, the texture image, and the occupancy map image, respectively. According to an embodiment, the video decoder 19001 performs the decoding operation by applying the 2D video/image decoder of FIG. 17 to each input bitstream. The metadata decoder 19002 decodes the bitstream of metadata into auxiliary patch information, and outputs the information to the geometry reconstructor 19003.

The geometry reconstructor 19003 reconstructs the 3D geometry based on the geometry image, the occupancy map, and/or auxiliary patch information output from the video decoder 19001 and the metadata decoder 19002.

The smoother 19004 smoothes the 3D geometry reconstructed by the geometry reconstructor 19003.

The texture reconstructor 19005 reconstruct the texture using the texture image output from the video decoder 19001 and/or the smoothed 3D geometry. That is, the texture reconstructor 19005 reconstructs the color point cloud image/picture by assigning color values to the smoothed 3D geometry using the texture image. Thereafter, in order to improve objective/subjective visual quality, a color smoothing process may be additionally performed on the color point cloud image/picture by the color smoother 19006. The modified point cloud image/picture derived through the operation above is displayed to the user after the rendering process in the point cloud renderer 19007. In some cases, the color smoothing process may be omitted.

The above-described blocks may be omitted or may be replaced by blocks having similar or identical functions. In addition, each of the blocks shown in FIG. 19 may operate as at least one of a processor, software, and hardware.

Figure 20:
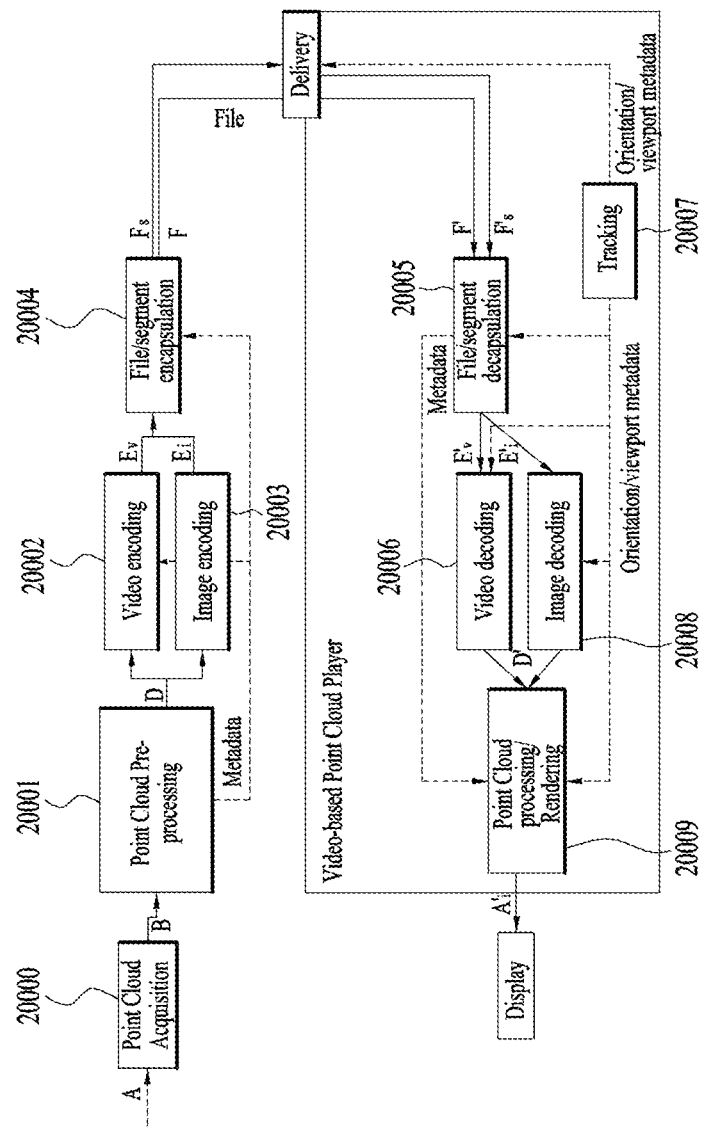
FIG. 20 illustrates an exemplary architecture for V-PCC based storage and streaming of point cloud data according to embodiments.

FIG. 20 illustrates an exemplary architecture for V-PCC based storage and streaming of point cloud data according to embodiments.

A part/the entirety of the system of FIG. 20 may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. Each component in the figure may correspond to software, hardware, a processor and/or a combination thereof.

FIG. 20 shows the overall architecture for storing or streaming point cloud data compressed based on video-based point cloud compression (V-PCC). The process of storing and streaming the point cloud data may include an acquisition process, an encoding process, a transmission process, a decoding process, a rendering process, and/or a feedback process.

The embodiments propose a method of effectively providing point cloud media/content/data.

In order to effectively provide point cloud media/content/data, a point cloud acquirer 20000 may acquire a point cloud video. For example, one or more cameras may acquire point cloud data through capture, composition or generation of a point cloud. Through this acquisition process, a point cloud video including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like containing the point cloud video may be generated. For point cloud data having multiple frames, one or more files may be acquired. In this process, point cloud related metadata (e.g., metadata related to capture, etc.) may be generated.

Post-processing for improving the quality of the content may be needed for the captured point cloud video. In the video capture process, the maximum/minimum depth may be adjusted within the range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, a point cloud video with a high density of points may be acquired.

A point cloud pre-processor 20001 may generate one or more pictures/frames for the point cloud video. Generally, a picture/frame may be a unit representing one image in a specific time interval. In addition, in dividing the points constituting the point cloud video into one or more patches and mapping the same to a 2D plane, the point cloud pre-processor 20001 may generate an occupancy map picture/frame, which is a binary map indicating presence or absence of data at the corresponding position in the 2D plane with a value of 0 or 1. Here, a patch is a set of points that constitute the point cloud video, wherein the points belonging to the same patch are adjacent to each other in the 3D space and are mapped to the same face among the planar faces of a 6-face bounding box in mapping to a 2D image). In addition, the point cloud pre-processor 20001 may generate a geometry picture/frame, which is in the form of a depth map that represents the information about the position (geometry) of each point constituting the point cloud video on a patch-by-patch basis. The point cloud pre-processor 20001 may also generate a texture picture/frame, which represents the color information about each point constituting the point cloud video on a patch-by-patch basis. In this process, metadata needed to reconstruct the point cloud from the individual patches may be generated. The metadata may contain information (auxiliary information or auxiliary patch information) about the patches, such as the position and size of each patch in the 2D/3D space. These pictures/frames may be generated continuously in temporal order to construct a video stream or metadata stream.

A point cloud video encoder 20002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder 20002 may perform a video-based point cloud compression (V-PCC) procedure. The point cloud video encoder 20002 may perform a series of procedures such as prediction, transform, quantization, and entropy coding for compression and coding efficiency. The encoded data (encoded video/image information) may be output in the form of a bitstream. Based on the V-PCC procedure, the point cloud video encoder 20002 may encode point cloud video by dividing the same into a geometry video, an attribute video, an occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 20003 may encode one or more images related to a point cloud video. The point cloud image encoder 20003 may perform a video-based point cloud compression (V-PCC) procedure. The point cloud image encoder 20003 may perform a series of procedures such as prediction, transform, quantization, and entropy coding for compression and coding efficiency. The encoded image may be output in the form of a bitstream. Based on the V-PCC procedure, the point cloud image encoder 20003 may encode the point cloud image by dividing the same into a geometry image, an attribute image, an occupancy map image, and metadata, for example, information about patches, as described below.

According to embodiments, the point cloud video encoder 20002, the point cloud image encoder 20003, the point cloud video decoder 20006, and the point cloud image decoder 20008 may be performed by one encoder/decoder as described above, and may be performed along separate paths as shown in the figure.

In file/segment encapsulator 20004, the encoded point cloud data and/or point cloud-related metadata may be encapsulated into a file or a segment for streaming. Here, the point cloud-related metadata may be received from the metadata processor (not shown) or the like. The metadata processor may be included in the point cloud video/image encoders 20002/20003 or may be configured as a separate component/module. The file/segment encapsulator 20004 may encapsulate the corresponding video/image/metadata in a file format such as ISOBMFF or in the form of a DASH segment or the like. According to an embodiment, the file/segment encapsulator 20004 may include the point cloud metadata in the file format. The point cloud-related metadata may be included, for example, in boxes at various levels on the ISOBMFF file format or as data in a separate track within the file. According to an embodiment, the file/segment encapsulator 20004 may encapsulate the point cloud-related metadata into a file.

The file/segment encapsulator 20004 according to the embodiments may store one bitstream or individually bitstreams into one or multiple tracks in a file, and may also encapsulate signaling information for this operation. In addition, an atlas stream (or patch stream) included on the bitstream may be stored as a track in the file, and related signaling information may be stored. Furthermore, an SEI message present in the bitstream may be stored in a track in the file and related signaling information may be stored.

A transmission processor (not shown) may perform processing of the encapsulated point cloud data for transmission according to the file format. The transmission processor may be included in the transmitter (not shown) or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver (not shown) of the reception device over a digital storage medium or a network. For transmission, processing according to any transmission protocol may be performed. The data processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor (not shown) may perform processing on the received point cloud video data according to the transmission protocol. The reception processor may be included in the receiver or may be configured as a separate component/module. The reception processor may reversely perform the process of the transmission processor above described so as to correspond to the processing for transmission performed at the transmission side. The reception processor may deliver the acquired point cloud video to a file/segment decapsulator 20005, and the acquired point cloud-related metadata to a metadata parser.

The file/segment decapsulator 20005 may decapsulate the point cloud data received in the form of a file from the reception processor. The file/segment decapsulator 20005 may decapsulate files according to ISOBMFF or the like, and may acquire a point cloud bitstream or point cloud-related metadata (or a separate metadata bitstream). The acquired point cloud bitstream may be delivered to the point cloud video decoder 20006 and the point cloud image decoder 20008, and the acquired point cloud video-related metadata (metadata bitstream) may be delivered to the metadata processor(not shown). The point cloud bitstream may include the metadata (metadata bitstream). The metadata processor may be included in the point cloud video decoder 20006 or may be configured as a separate component/module. The point cloud video-related metadata acquired by the file/segment decapsulator 20005 may take the form of a box or track in the file format. The file/segment decapsulator 20005 may receive metadata necessary for decapsulation from the metadata processor, when necessary. The point cloud-related metadata may be delivered to the point cloud video decoder 20006 and/or the point cloud image decoder 20008 and used in a point cloud decoding procedure, or may be transferred to the renderer 20009 and used in a point cloud rendering procedure.

The point cloud video decoder 20006 may receive the bitstream and decode the video/image by performing an operation corresponding to the operation of the point cloud video encoder 20002. In this case, the point cloud video decoder 20006 may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The point cloud image decoder 20008 may receive a bitstream and perform a reverse process corresponding to the operation of the point cloud image encoder 20003. In this case, the point cloud image decoder 20008 may partition the point cloud image into a geometry image, an attribute image, an occupancy map image, and metadata, which is, for example, auxiliary patch information, to decode the same.

The 3D geometry may be reconstructed based on the decoded geometry video/image, the occupancy map, and auxiliary patch information, and then may be subjected to a smoothing process. The color point cloud image/picture may be reconstructed by assigning a color value to the smoothed 3D geometry based on the texture video/image. The renderer 20009 may render the reconstructed geometry and the color point cloud image/picture. The rendered video/image may be displayed through the display. All or part of the rendered result may be shown to the user through a VR/AR display or a typical display.

A sensor/tracker (sensing/tracking) 20007 acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the reception side. The orientation or viewport information analyzed at the reception side may be transmitted to the transmission side on a feedback channel.

Based on the orientation information acquired by the sensor/tracker 20007 and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker 20007, the transmitter may efficiently encode only the media data of the specific area, that is, the area indicated by the orientation information and/or the viewport information, or generate and transmit a file therefor.

The renderer 20009 may render the decoded point cloud data in a 3D space. The rendered video/image may be displayed through the display. The user may view all or part of the rendered result through a VR/AR display or a typical display.

The feedback process may include transferring various feedback information that may be acquired in the rendering/displaying process to the transmitting side or the decoder of the receiving side. Through the feedback process, interactivity may be provided in consumption of point cloud data.

According to an embodiment, head orientation information, viewport information indicating an area currently viewed by a user, and the like may be delivered to the transmitting side in the feedback process. According to an embodiment, the user may interact with what is implemented in the VR/AR/MR/autonomous driving environment. In this case, information related to the interaction may be delivered to the transmitting side or a service provider in the feedback process. According to an embodiment, the feedback process may be skipped.

According to an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the area currently viewed by the user may be preferentially decapsulated, decoded, and rendered based on the orientation information and/or the viewport information.

Figure 21:
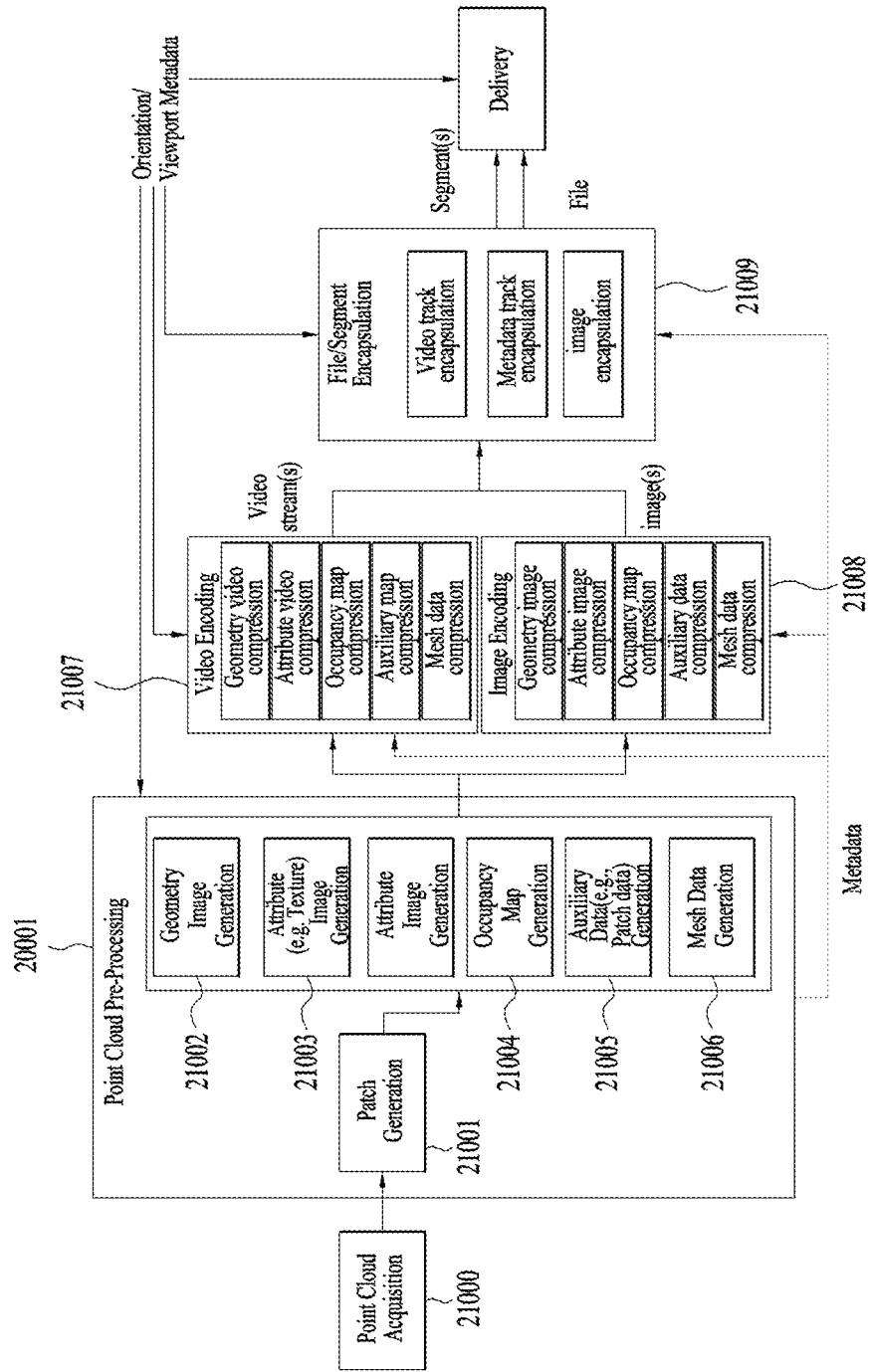
FIG. 21 is an exemplary block diagram of a device for storing and transmitting point cloud data according to embodiments.

FIG. 21 is an exemplary block diagram of a device for storing and transmitting point cloud data according to embodiments.

FIG. 21 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20.

A point cloud data transmission device according to embodiments may be configured as shown in the figure. Each element of the transmission device may be a module/unit/component/hardware/software/a processor.

The geometry, attribute, occupancy map, auxiliary data (or auxiliary information), and mesh data of the point cloud may each be configured as a separate stream or stored in different tracks in a file. Furthermore, they may be included in a separate segment.

A point cloud acquirer 21000 acquires a point cloud. For example, one or more cameras may acquire point cloud data through capture, composition or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like including the point cloud data may be generated. For point cloud data having multiple frames, one or more files may be acquired. In this process, point cloud related metadata (e.g., metadata related to capture, etc.) may be generated. A patch generator 21001 generates patches from the point cloud data. The patch generator 21001 generates point cloud data or point cloud video as one or more pictures/frames. A picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame in a binary map, which indicates presence or absence of data at the corresponding position in the 2D plane with 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

In addition, the patches may be used for 2D image mapping. For example, the point cloud data may be projected onto each face of a cube. After patch generation, a geometry image, one or more attribute images, an occupancy map, auxiliary data, and/or mesh data may be generated based on the generated patches.

Geometry image generation, attribute image generation, occupancy map generation, auxiliary data generation, and/or mesh data generation are performed by a point cloud pre-processor 20001 or a controller (not shown). The point cloud pre-processor 20001 may include a patch generator 21001, a geometry image generator 21002, an attribute image generator 21003, an occupancy map generator 21004, an auxiliary data generator 21005, and a mesh data generator 21006.

The geometry image generator 21002 generates a geometry image based on the result of the patch generation. Geometry represents a point in a 3D space. The geometry image is generated using the occupancy map, which includes information related to 2D image packing of the patches, auxiliary data (including patch data), and/or mesh data based on the patches. The geometry image is related to information such as a depth (e.g., near, far) of the patch generated after the patch generation.

The attribute image generator 21003 generates an attribute image. For example, an attribute may represent a texture. The texture may be a color value that matches each point. According to embodiments, images of a plurality of attributes (such as color and reflectance) (N attributes) including a texture may be generated. The plurality of attributes may include material information and reflectance. According to an embodiment, the attributes may additionally include information indicating a color, which may vary depending on viewing angle and light even for the same texture.

The occupancy map generator 21004 generates an occupancy map from the patches. The occupancy map includes information indicating presence or absence of data in the pixel, such as the corresponding geometry or attribute image.

The auxiliary data generator 21005 generates auxiliary data (or auxiliary information) including information about the patches. That is, the auxiliary data represents metadata about a patch of a point cloud object. For example, it may represent information such as normal vectors for the patches. Specifically, the auxiliary data may include information needed to reconstruct the point cloud from the patches (e.g., information about the positions, sizes, and the like of the patches in 2D/3D space, and projection (normal) plane identification information, patch mapping information, etc.)

The mesh data generator 21006 generates mesh data from the patches. Mesh represents connection between neighboring points. For example, it may represent data of a triangular shape. For example, the mesh data refers to connectivity between the points.

A point cloud pre-processor 20001 or controller generates metadata related to patch generation, geometry image generation, attribute image generation, occupancy map generation, auxiliary data generation, and mesh data generation.

The point cloud transmission device performs video encoding and/or image encoding in response to the result generated by the point cloud pre-processor 20001. The point cloud transmission device may generate point cloud image data as well as point cloud video data. According to embodiments, the point cloud data may have only video data, only image data, and/or both video data and image data.

A video encoder 21007 performs geometry video compression, attribute video compression, occupancy map video compression, auxiliary data compression, and/or mesh data compression. The video encoder 21007 generates video stream(s) containing encoded video data.

Specifically, in the geometry video compression, point cloud geometry video data is encoded. In the attribute video compression, attribute video data of the point cloud is encoded. In the auxiliary data compression, auxiliary data associated with the point cloud video data is encoded. In the mesh data compression, mesh data of the point cloud video data is encoded. The respective operations of the point cloud video encoder may be performed in parallel.

An image encoder 21008 performs geometry image compression, attribute image compression, occupancy map image compression, auxiliary data compression, and/or mesh data compression. The image encoder generates image(s) containing encoded image data.

Specifically, in the geometry image compression, the point cloud geometry image data is encoded. In the attribute image compression, the attribute image data of the point cloud is encoded. In the auxiliary data compression, the auxiliary data associated with the point cloud image data is encoded. In the mesh data compression, the mesh data associated with the point cloud image data is encoded. The respective operations of the point cloud image encoder may be performed in parallel.

The video encoder 21007 and/or the image encoder 21008 may receive metadata from the point cloud pre-processor 20001. The video encoder 21007 and/or the image encoder 21008 may perform each encoding process based on the metadata.

A file/segment encapsulator 21009 encapsulates the video stream(s) and/or image(s) in the form of a file and/or segment. The file/segment encapsulator 21009 performs video track encapsulation, metadata track encapsulation, and/or image encapsulation.

In the video track encapsulation, one or more video streams may be encapsulated into one or more tracks.

In the metadata track encapsulation, metadata related to a video stream and/or an image may be encapsulated in one or more tracks. The metadata includes data related to the content of the point cloud data. For example, it may include initial viewing orientation metadata. According to embodiments, the metadata may be encapsulated into a metadata track, or may be encapsulated together in a video track or an image track.

In the image encapsulation, one or more images may be encapsulated into one or more tracks or items.

For example, according to embodiments, when four video streams and two images are input to the encapsulator, the four video streams and two images may be encapsulated in one file.

The file/segment encapsulator 21009 may receive metadata from the point cloud pre-processor 20001. The file/segment encapsulator 21009 may perform encapsulation based on the metadata.

A file and/or a segment generated by the file/segment encapsulator 21009 are transmitted by the point cloud transmission device or the transmitter. For example, the segment(s) may be delivered based on a DASH-based protocol.

The deliverer may transmit a point cloud bitstream or a file/segment including the bitstream to the receiver of the reception device over a digital storage medium or a network. Processing according to any transmission protocol may be performed for transmission. The data that has been processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD.

The file/segment encapsulator 21009 according to the embodiments may partition and store one bitstream or individual bitstreams into one or a plurality of tracks in a file, and encapsulate signaling information for this. In addition, a patch (or atlas) stream included in the bitstream may be stored as a track in the file, and related signaling information may be stored. Furthermore, the SEI message present in the bitstream may be stored in a track in the file, and related signaling information may be stored.

The deliverer may include an element for generating a media file in a predetermined file format, and may include an element for transmission over a broadcast/communication network. The deliverer receives orientation information and/or viewport information from the receiver. The deliverer may deliver the acquired orientation information and/or viewport information (or information selected by the user) to the point cloud pre-processor 20001, the video encoder 21007, the image encoder 21008, the file/segment encapsulator 21009, and/or the point cloud encoder. Based on the orientation information and/or the viewport information, the point cloud encoder may encode all point cloud data or the point cloud data indicated by the orientation information and/or the viewport information. Based on the orientation information and/or the viewport information, the file/segment encapsulator may encapsulate all point cloud data or the point cloud data indicated by the orientation information and/or the viewport information. Based on the orientation information and/or the viewport information, the deliverer may deliver all point cloud data or the point cloud data indicated by the orientation information and/or the viewport information.

For example, the point cloud pre-processor 20001 may perform the above-described operation on all the point cloud data or on the point cloud data indicated by the orientation information and/or the viewport information. The video encoder 21007 and/or the image encoder 21008 may perform the above-described operation on all the point cloud data or on the point cloud data indicated by the orientation information and/or the viewport information. The file/segment encapsulator 21009 may perform the above-described operation on all the point cloud data or on the point cloud data indicated by the orientation information and/or the viewport information. The transmitter may perform the above-described operation on all the point cloud data or on the point cloud data indicated by the orientation information and/or the viewport information.

Figure 22:
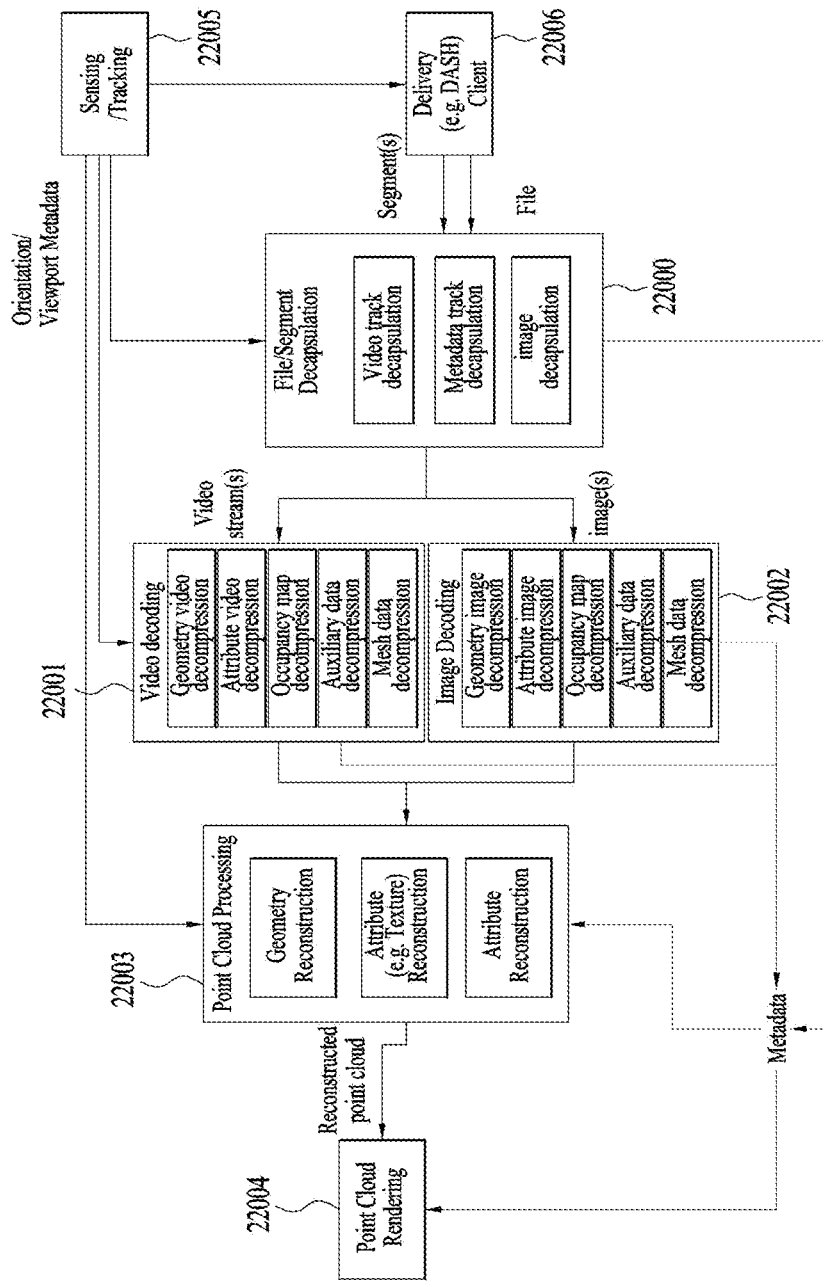
FIG. 22 is an exemplary block diagram of a point cloud data reception device according to embodiments.

FIG. 22 is an exemplary block diagram of a point cloud data reception device according to embodiments.

FIG. 22 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20 and FIG. 21.

Each component of the reception device may be a module/unit/component/hardware/software/processor. A delivery client may receive point cloud data, a point cloud bitstream, or a file/segment including the bitstream transmitted by the point cloud data transmission device according to the embodiments. The receiver may receive the point cloud data over a broadcast network or through a broadband depending on the channel used for the transmission. Alternatively, the point cloud data may be received through a digital storage medium. The receiver may include a process of decoding the received data and rendering the received data according to the user viewport. The reception processor may perform processing on the received point cloud data according to a transmission protocol. A delivery client (or reception processor) 22006 may be included in the receiver or configured as a separate component/module. The reception processor may reversely perform the process of the transmission processor described above so as to correspond to the processing for transmission performed at the transmitting side. The reception processor may deliver the acquired point cloud data to the file/segment decapsulator 22000 and the acquired point cloud related metadata to the metadata processor (not shown).

The sensor/tracker 22005 acquires orientation information and/or viewport information. The sensor/tracker 22005 may deliver the acquired orientation information and/or viewport information to the delivery client 22006, the file/segment decapsulator 22000, the point cloud decoder 22001 and 22002, and the point cloud processor 22003.

The delivery client 22006 may receive all point cloud data or the point cloud data indicated by the orientation information and/or the viewport information based on the orientation information and/or the viewport information. The file/segment decapsulator 22000 may decapsulate all point cloud data or the point cloud data indicated by the orientation information and/or the viewport information based on the orientation information and/or the viewport information. The point cloud decoder (the video decoder 22001 and/or the image decoder 22002) may decode all point cloud data or the point cloud data indicated by the orientation information and/or the viewport information based on the orientation information and/or the viewport information. The point cloud processor 22003 may process all point cloud data or the point cloud data indicated by the orientation information and/or the viewport information based on the orientation information and/or the viewport information.

The file/segment decapsulator 22000 performs video track decapsulation, metadata track decapsulation, and/or image decapsulation. The file/segment decapsulator 22000 may decapsulate the point cloud data in the form of a file received from the reception processor. The file/segment decapsulator 22000 may decapsulate files or segments according to ISOBMFF, etc., to acquire a point cloud bitstream or point cloud-related metadata (or a separate metadata bitstream). The acquired point cloud bitstream may be delivered to the point cloud decoders 22001 and 22002, and the acquired point cloud-related metadata (or metadata bitstream) may be delivered to the metadata processor (not shown). The point cloud bitstream may include the metadata (metadata bitstream). The metadata processor may be included in the point cloud video decoder or may be configured as a separate component/module. The point cloud-related metadata acquired by the file/segment decapsulator 22000 may take the form of a box or track in a file format. The file/segment decapsulator 22000 may receive metadata necessary for decapsulation from the metadata processor, when necessary. The point cloud-related metadata may be delivered to the point cloud decoders 22001 and 22002 and used in a point cloud decoding procedure, or may be delivered to the renderer 22004 and used in a point cloud rendering procedure. The file/segment decapsulator 22000 may generate metadata related to the point cloud data.

In the video track decapsulation by the file/segment decapsulator 22000, a video track contained in the file and/or segment is decapsulated. Video stream(s) including a geometry video, an attribute video, an occupancy map, auxiliary data, and/or mesh data are decapsulated.

In the metadata track decapsulation by the file/segment decapsulator 22000, a bitstream including metadata related to the point cloud data and/or auxiliary data is decapsulated.

In the image decapsulation by the file/segment decapsulator 22000, image(s) including a geometry image, an attribute image, an occupancy map, auxiliary data and/or mesh data are decapsulated.

The in the file/segment decapsulator 22000 according to the embodiments may store one bitstream or individually bitstreams in one or multiple tracks in a file, and may also decapsulate signaling information therefor. In addition, the atlas (or patch) stream included in the bitstream may be decapsulated based on a track in the file, and related signaling information may be parsed. Furthermore, an SEI message present in the bitstream may be decapsulated based on a track in the file, and related signaling information may be also acquired.

The video decoder 22001 performs geometry video decompression, attribute video decompression, occupancy map decompression, auxiliary data decompression, and/or mesh data decompression. The video decoder 22001 decodes the geometry video, the attribute video, the auxiliary data, and/or the mesh data in a process corresponding to the process performed by the video encoder of the point cloud transmission device according to the embodiments.

The image decoder 22002 performs geometry image decompression, attribute image decompression, occupancy map decompression, auxiliary data decompression, and/or mesh data decompression. The image decoder 22002 decodes the geometry image, the attribute image, the auxiliary data, and/or the mesh data in a process corresponding to the process performed by the image encoder of the point cloud transmission device according to the embodiments.

The video decoder 22001 and the image decoder 22002 according to the embodiments may be processed by one video/image decoder as described above, and may be performed along separate paths as illustrated in the figure.

The video decoder 22001 and/or the image decoder 22002 may generate metadata related to the video data and/or the image data.

In point cloud processor 22003, geometry reconstruction and/or attribute reconstruction are performed.

In the geometry reconstruction, the geometry video and/or geometry image are reconstructed from the decoded video data and/or decoded image data based on the occupancy map, auxiliary data and/or mesh data.

In the attribute reconstruction, the attribute video and/or the attribute image are reconstructed from the decoded attribute video and/or the decoded attribute image based on the occupancy map, auxiliary data, and/or mesh data. According to embodiments, for example, the attribute may be a texture. According to embodiments, an attribute may represent a plurality of pieces of attribute information. When there is a plurality of attributes, the point cloud processor 22003 according to the embodiments performs a plurality of attribute reconstructions.

The point cloud processor 22003 may receive metadata from the video decoder 22001, the image decoder 22002, and/or the file/segment decapsulator 22000, and process the point cloud based on the metadata.

The point cloud renderer 22004 renders the reconstructed point cloud. The point cloud renderer 22004 may receive metadata from the video decoder 22001, the image decoder 22002, and/or the file/segment decapsulator 22000, and render the point cloud based on the metadata.

The display displays the result of rendering on an actual display device.

According to the method/device according to the embodiments, as shown in FIG. 20 to FIG. 22, the transmitting side may encode the point cloud data into a bitstream, encapsulate the bitstream in the form of a file and/or segment, and transmits the same. The receiving side may decapsulate the file and/or segment into a bitstream containing the point cloud, and may decode the bitstream into point cloud data. For example, a point cloud data device according to the embodiments may encapsulate point cloud data based on a file. The file may include a V-PCC track containing parameters for a point cloud, a geometry track containing geometry, an attribute track containing an attribute, and an occupancy track containing an occupancy map.

In addition, a point cloud data reception device according to embodiments decapsulates the point cloud data based on a file. The file may include a V-PCC track containing parameters for a point cloud, a geometry track containing geometry, an attribute track containing an attribute, and an occupancy track containing an occupancy map.

The encapsulation operation described above may be performed by the file/segment encapsulator 20004 of FIG. 20, the file/segment encapsulator 21009 of FIG. 21. The decapsulation operation described above may be performed by the file/segment decapsulator 20005 of FIG. 20 or the file/segment decapsulator 22000 of FIG. 22.

Figure 23:
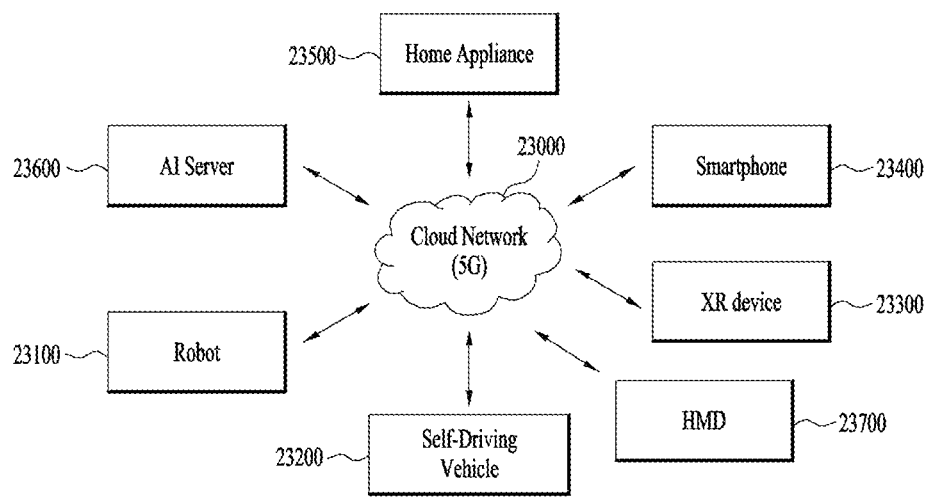
FIG. 23 illustrates an exemplary structure operable in connection with point cloud data transmission/reception methods/devices according to embodiments.

FIG. 23 illustrates an exemplary structure operable in connection with point cloud data transmission/reception methods/devices according to embodiments.

In the structure according to the embodiments, at least one of a server 23600, a robot 23100, a self-driving vehicle 23200, an XR device 23300, a smartphone 23400, a home appliance 23500 and/or a head-mount display (HMD) 23700 is connected to a cloud network 23000. Here, the robot 23100, the self-driving vehicle 23200, the XR device 23300, the smartphone 23400, or the home appliance 23500 may be referred to as a device. In addition, the XR device 23300 may correspond to a point cloud data (PCC) device according to embodiments or may be operatively connected to the PCC device.

The cloud network 23000 may represent a network that constitutes part of the cloud computing infrastructure or is present in the cloud computing infrastructure. Here, the cloud network 23000 may be configured using a 3G network, 4G or Long Term Evolution (LTE) network, or a 5G network.

The server 23600 may be connected to at least one of the robot 23100, the self-driving vehicle 23200, the XR device 23300, the smartphone 23400, the home appliance 23500, and/or the HMD 23700 over the cloud network 23000 and may assist at least a part of the processing of the connected devices 23100 to 23700.

The HMD 23700 represents one of the implementation types of the XR device and/or the PCC device according to the embodiments. An HMD type device according to embodiments includes a communication unit, a control unit, a memory, an I/O unit, a sensor unit, and a power supply unit.

Hereinafter, various embodiments of the devices 23100 to 23500 to which the above-described technology is applied will be described. The devices 23100 to 23500 illustrated in FIG. 23 may be operatively connected/coupled to a point cloud data transmission and reception device according to the above-described embodiments.

<PCC+XR>

The XR/PCC device 23300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 23300 may analyze 3D point cloud data or image data acquired through various sensors or from an external device and generate position data and attribute data about 3D points. Thereby, the XR/PCC device 23300 may acquire information about the surrounding space or a real object, and render and output an XR object. For example, the XR/PCC device 23300 may match an XR object including auxiliary information about a recognized object with the recognized object and output the matched XR object.

<PCC+Self-Driving+XR>

The self-driving vehicle 23200 may be implemented as a mobile robot, a vehicle, an unmanned aerial vehicle, or the like by applying the PCC technology and the XR technology.

The self-driving vehicle 23200 to which the XR/PCC technology is applied may represent an autonomous vehicle provided with means for providing an XR image, or an autonomous vehicle that is a target of control/interaction in the XR image. In particular, the self-driving vehicle 23200, which is a target of control/interaction in the XR image, may be distinguished from the XR device 23300 and may be operatively connected thereto.

The self-driving vehicle 23200 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device according to the embodiments may be applied to the self-driving vehicle 23200 that provides a self-driving service.

The self-driving vehicle 23200 that provides the self-driving service is connected to a PCC device for wired/wireless communication.

When the point cloud compression data transmission and reception device (PCC device) according to the embodiments is connected to self-driving vehicle 23200 for wired/wireless communication, the device may receive and process content data related to an AR/VR/PCC service that may be provided together with the self-driving service and transmit the processed content data to the self-driving vehicle 23200. In the case where the point cloud data transmission and reception device is mounted on the self-driving vehicle 23200, the point cloud transmitting and reception device may receive and process content data related to the AR/VR/PCC service according to a user input signal input through a user interface device and provide the processed content data to the user. The self-driving vehicle 23200 or the user interface device according to the embodiments may receive a user input signal. The user input signal according to the embodiments may include a signal indicating the self-driving service.

As described above, the V-PCC-based point cloud video encoder of FIG. 1, 4, 18, 20, or 21 projects 3D point cloud data (or content) into a 2D space to generate patches. The patches are generated in the 2D space by dividing the data into a geometry image representing position information (referred to as a geometry frame or a geometry patch frame) and a texture image representing color information (referred to as an attribute frame or an attribute patch frame). The geometry image and the texture image are video-compressed for each frame, and a video bitstream of the geometry image (referred to as a geometry bitstream) and a video bitstream of the texture image (referred to as an attribute bitstream) are output. In addition, auxiliary patch information (also referred to as patch information or metadata) including projection plane information and patch size information about each patch, which are needed to decode a 2D patch at the receiving side, is also video-compressed and a bitstream of the auxiliary patch information is output. In addition, the occupancy map, which indicates presence/absence of a point for each pixel as 0 or 1, is entropy-compressed or video-compressed depending on whether it is in a lossless mode or a lossy mode, and a video bitstream of the occupancy map (or referred to as an occupancy map bitstream) is output. The compressed geometry bitstream, the compressed attribute bitstream, the compressed auxiliary patch information bitstream, and the compressed occupancy map bitstream are multiplexed into a structure of a V-PCC bitstream.

According to embodiments, the V-PCC bitstream may be transmitted to the receiving side as it is, or may be encapsulated in a file/segment form by the file/segment encapsulator of FIG. 1, 18, 20, or 21 and transmitted to the reception device or stored in a digital storage medium (e.g., USB, SD, CD, DVD, Blu-ray, HDD, SSD, etc.). According to an embodiment of the present disclosure, the file is in a file format ISOBMFF.

According to embodiments, the V-PCC bitstream may be transmitted through multiple tracks in a file, or may be transmitted through one single track. Details will be described later.

In the present disclosure, point cloud data (i.e., V-PCC data) represents volumetric encoding of a point cloud consisting of a sequence of point cloud frames. In a point cloud sequence, which is a sequence of point cloud frames, each point cloud frame includes a collection of points. Each point may have a 3D position, that is, geometry information, and a plurality of attributes such as, for example, color, reflectance, surface normal, and the like. That is, each point cloud frame represents a set of 3D points specified by the Cartesian coordinates (x, y, z) (i.e. positions) of 3D points and zero or more attributes at a particular time instance.

As used herein, the term video-based point cloud compression (V-PCC) is the same as visual volumetric video-based coding (V3C). According to embodiments, the terms V-PCC and V3C may have the same meaning and be interchangeably used.

According to embodiments, point cloud content (or referred to as V-PCC content or V3C content) refers to volumetric media encoded using V-PCC.

According to embodiments, a volumetric scene may represent 3D data, and may be composed of one or more objects. That is, the volumetric scene is a region or unit composed of one or more objects constituting volumetric media. In addition, in encapsulating the data in a file format to transmit a V-PCC bitstream, a region obtained by dividing a bounding box for the entire volumetric media according to a spatial criterion is called a 3D spatial region. According to embodiments, the 3D spatial region may be referred to as a 3D region or a spatial region.

Partial point cloud data corresponding to a specific 3D spatial region in the entire point cloud data may be related to one or more 2D regions. According to embodiments, the 2D region represents one or more video frames or atlas frames including data associated with the point cloud data in the 3D region.

According to embodiments, atlas data is signaling information including an atlas sequence parameter set (ASPS), an atlas frame parameter set (AFPS), an atlas adaptation parameter set (AAPS), atlas tile group information (also referred to as atlas tile information), and an SEI message, and may be referred to as metadata about the atlas. According to embodiments, the ASPS is a syntax structure containing syntax elements that apply to zero or more entire coded atlas sequences (CASs) as determined by the content of a syntax element in the ASPS referred to by a syntax element in each tile group (or tile) header. According to embodiments, the AFPS is a syntax structure comprising syntax elements that apply to zero or more entire coded atlas frames as determined by the content of a syntax element in each tile group (or tile). According to embodiments, the AAPS may include camera parameters, e.g., camera position, rotation, scale, and camera model, related to a part of the atlas sub-bitstream. Hereinafter, according to an embodiment, the syntax element is used in the same meaning as a field or parameter.

According to embodiments, an atlas represents a collection of 2D bounding boxes, and may be patches projected into a rectangular frame.

According to embodiments, an atlas frame is a 2D rectangular array of atlas samples onto which patches are projected. An atlas sample is a position of a rectangular frame onto which patches associated with the atlas are projected.

According to embodiments, an atlas frame may be partitioned into one or more rectangular tiles. That is, a tile is a unit by which a 2D frame is partitioned. In other words, a tile is a unit for partitioning signaling information of point cloud data called an atlas. According to embodiments, tiles in an atlas frame do not overlap each other, and an atlas frame may include regions not related to a tile. In addition, the height and width may vary among the tiles included in an atlas.

According to embodiments, a 3D region may correspond to one atlas frame, and thus one 3D region may be associated with a plurality of 2D regions.

According to embodiments, a patch is a set of points constituting a point cloud, which indicates that points belonging to the same patch are adjacent to each other in a 3D space, and are mapped in the same direction among 6-face bounding box planes in the process of mapping to a 2D image. The patch is signaling information on the configuration of point cloud data.

The reception apparatus according to the embodiments may reconstruct attribute video data, geometry video data, and occupancy video data, which are actual video data having the same presentation time, based on an atlas (tile, patch).

When the user zooms in or the user changes the viewport, a portion of the entire point cloud object/data may be rendered or displayed on the changed viewport. In this case, it may be better in terms of efficiency for the PCC decoder/player to decode or process the video or atlas data associated with a portion of the point cloud data rendered or displayed on the user viewport and skip decoding or processing the video or atlas data associated with the point cloud data of the portion/region not rendered or displayed.

To this end, partial access to point cloud data needs to be supported.

Viewport related information (or referred to as viewport information) according to embodiments is information on a region of point cloud data (video or image) in a 3D space viewed by a user through a device or HMD. A viewpoint or orientation is a point at which a user is viewing point cloud data (video or image) and may represent a center point of the viewport region. That is, a viewport may be a region around a viewpoint, and the size and shape of the region may be determined by the field of view (FOV). In other words, the viewport is determined according to the position and viewpoint (or orientation) of the virtual camera or user, and the point cloud data is rendered at the viewport based on the viewport related information. For example, the reception device may preferentially decapsulate, decode, or render point cloud data (video or image) about a region currently being viewed by the user based on the viewport related information.

To this end, there is a need for a method of constructing point cloud data according to user viewport information about the point cloud data (video or image), which is static or dynamically changes with time, and/or viewing information about the point cloud data (video or image) and signaling the viewport information and/or the viewing information.

According to embodiments, the viewport related information may have the same or similar meaning as viewport information or view information.

According to embodiments, the viewport related information may include at least one of viewport camera information, recommended viewport information, or viewing information.

According to embodiments, to render point cloud data at a viewport determined according to the position and viewpoint (or orientation) of a virtual camera or a user, the V-PCC bitstream may contain viewport camera parameters and SEI messages related to the viewport position. However, the SEI messages are used only when the intended viewport is determined before encoding. However, the intended viewport of the V-PCC data may be determined after encoding. Therefore, an effective method for indicating an intended viewport of V-PCC data regardless of whether it is before/after encoding or in the middle of encoding is needed. To this end, in an embodiment, at least static or dynamic viewport related information may be signaled at a file format level.

According to embodiments, the viewport related information may be generated/encoded by the metadata encoding unit 18005 of the point cloud data transmission device of FIG. 18 or the point cloud pre-processing unit 20001 and/or the video/image encoding units 21007 and 21008 of the V-PCC system of FIG. 21, and may be acquired/decoded by the metadata decoder 19002 of the point cloud data reception device of FIG. 19 or the video/image decoding units 22001 and 22002 and/or the point cloud post-processing unit 22003 of the V-PCC system of FIG. 22.

According to embodiments, the viewport related information may be signaled in a sample, a sample entry, a sample group, a track group, or an entity group in a track of a file by the file/segment encapsulator of the point cloud data transmission device, or may be signaled in a separate metadata track.

According to embodiments, the recommended viewport information (viewing position, viewing orientation, viewing direction, viewing area, etc.) about the point cloud data (video or image) may be static or dynamically change with time. According to embodiments, in order to effectively provide point cloud video data to a user, the recommended viewport information may be stored or signaled in a track or item. In addition, depending on the changing attributes of the viewing information, the information may be carried in a sample entry, a track group, a sample group, or a separate metadata track.

According to embodiments, the viewing information (viewing position, viewing orientation, viewing direction, etc.) about the point cloud data (video or image) may be static or dynamically change with time. According to embodiments, in order to effectively provide point cloud video data to a user, the viewing information may be stored or signaled in a track or item. In addition, depending on the changing attributes of the viewing information, the information may be carried in a sample entry, a track group, a sample group, an entity group, or a separate metadata track.

That is, to allow the PCC decoder/player of the reception device to render/display point cloud data on the user viewport, the transmission device may transmit the user viewport information of the point cloud data (video or image), which is static or dynamically changes with time, and/or the viewing information about the point cloud data (video or image) by a V-PCC bitstream, signal the same in a sample entry and/or sample of a file carrying the V-PCC bitstream, or transmit the same in the form of metadata. In the present disclosure, information signaled in a V-PCC bitstream or file or transmitted in the form of metadata is referred to as signaling information.

In order to enable spatial access or partial access to rendered/displayed point cloud data when the PCC decoder/player of the reception device renders/displays the point cloud data based on the user viewport, the transmission device may transmit the 3D region information about the point cloud, which may be static or change with time, through a V-PCC bitstream, signal the same in a sample entry and/or sample of the file carrying the V-PCC bitstream, or transmit the same in the form of metadata. In the present disclosure, information signaled in a V-PCC bitstream or file or transmitted in the form of metadata is referred to as signaling information.

According to embodiments, the signaling information may be stored in a sample in a track, a sample entry, a sample group, a track group, or a separate metadata track. In particular, a part of the signaling information may be stored in a sample entry in the form of a box or a fullbox. Storage and signaling of viewport information, viewing information, 3D spatial region information, and the like included in the signaling information will be described later in detail.

According to embodiments, the signaling information for supporting the viewport-based and/or partial access may be generated by the metadata generator (e.g., the metadata encoder 18005 of FIG. 18) of the transmission device, and then signaled in a sample in a track, a sample entry, a sample group, or a track group of a file, or in a separate metadata track by the file/segment encapsulator, or may be generated by the file/segment encapsulator and signaled in a sample in a track, a sample entry, a sample group, or a track group or in a separate metadata track by the file/segment encapsulator. In the present disclosure, the signaling information may include metadata (e.g., a set value, etc.) related to point cloud data. Depending on the application, the signaling information may be defined in the system level, such as the file format, dynamic adaptive streaming over HTTP (DASH), or MPEG media transport (MMT), or the wired interface level, such as High Definition Multimedia Interface (HDMI), Display Port, Video Electronics Standards Association (VESA), or CTA.

Figure 24:
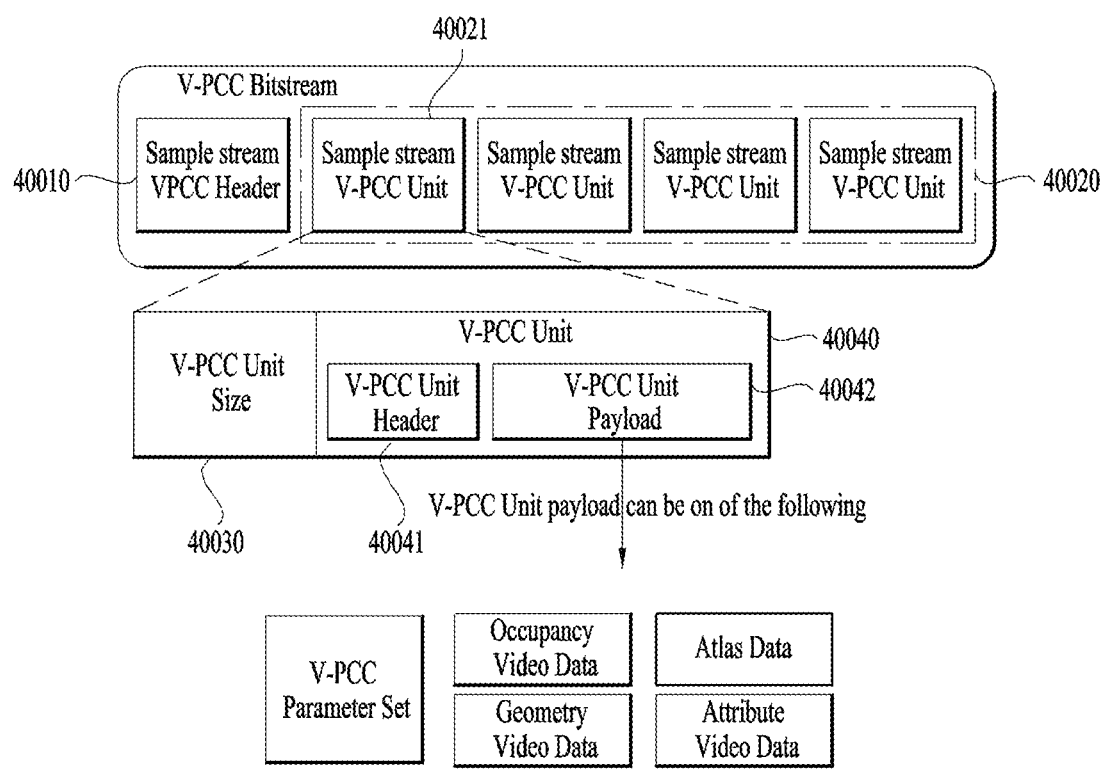
FIG. 24 shows an exemplary structure of a V-PCC bitstream according to embodiments.

FIG. 24 shows an example of a V-PCC bitstream structure according to other embodiments of the present disclosure. In an embodiment, the V-PCC bitstream of FIG. 24 is generated and output by the V-PCC-based point cloud video encoder of FIG. 1, 4, 18, 20, or 21.

A V-PCC bitstream according to the embodiments, containing a coded point cloud sequence (CPCS), may be composed of sample stream V-PCC units. The sample stream V-PCC units carry V-PCC parameter set (VPS) data, an atlas bitstream, a 2D video encoded occupancy map bitstream, a 2D video encoded geometry bitstream, and zero or more 2D video encoded attribute bitstreams.

In FIG. 24, the V-PCC bitstream may include one sample stream V-PCC header 40010 and one or more sample stream V-PCC units 40020. For simplicity, the one or more sample stream V-PCC units 40020 may be referred to as a sample stream V-PCC payload. That is, the sample stream V-PCC payload may be referred to as a set of sample stream V-PCC units. A detailed description of the sample stream V-PCC header 40010 will be described in FIG. 26.

Each sample stream V-PCC unit 40021 may include V-PCC unit size information 40030 and a V-PCC unit 40040. The V-PCC unit size information 40030 indicates the size of the V-PCC unit 40040. For simplicity, the V-PCC unit size information 40030 may be referred to as a sample stream V-PCC unit header, and the V-PCC unit 40040 may be referred to as a sample stream V-PCC unit payload.

Each V-PCC unit 40040 may include a V-PCC unit header 40041 and a V-PCC unit payload 40042.

In the present disclosure, data contained in the V-PCC unit payload 40042 is distinguished by the V-PCC unit header 40041. To this end, the V-PCC unit header 40041 contains type information indicating the type of the V-PCC unit. Each V-PCC unit payload 40042 may contain at least one of geometry video data (i.e., a 2D video encoded geometry bitstream), attribute video data (i.e., a 2D video encoded attribute bitstream), occupancy video data (i.e., a 2D video encoded occupancy map bitstream), atlas data, or a V-PCC parameter set (VPS) according to the type information in the V-PCC unit header 40041.

The VPS according to the embodiments is also referred to as a sequence parameter set (SPS). The two terms may be used interchangeably.

The atlas data according to the embodiments may represent data composed of attributes (e.g., texture (patch)) and/or depth of point cloud data, and may also be referred to as a patch data group.

Figure 25:
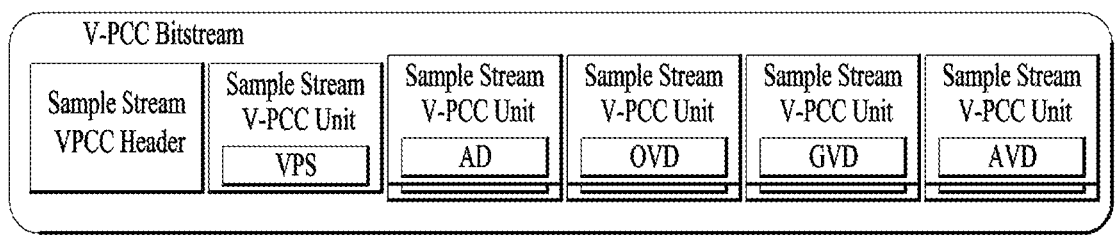
FIG. 25 illustrates an example of data carried by sample stream V-PCC units in a V-PCC bitstream according to embodiments.

FIG. 25 illustrates an example of data carried by sample stream V-PCC units in a V-PCC bitstream according to embodiments.

In the example of FIG. 25, the V-PCC bitstream contains a sample stream V-PCC unit carrying a V-PCC parameter set (VPS), sample stream V-PCC units carrying atlas data (AD), sample stream V-PCC units carrying occupancy video data (OVD), sample stream V-PCC units carrying geometry video data (GVD), and sample stream V-PCC units carrying attribute video data (AVD).

According to embodiments, each sample stream V-PCC unit contains one type of V-PCC unit among the VPS, AD, OVD, GVD, and AVD.

A field, which is a term used in syntaxes of the present disclosure described below, may have the same meaning as a parameter or element (or syntax element).

FIG. 26 shows an example of a syntax structure of a sample stream V-PCC header 40010 contained in a V-PCC bitstream according to embodiments.

The sample_stream_v-pcc_header( ) according to the embodiments may include an ssvh_unit_size_precision_bytes_minus1 field and an ssvh_reserved_zero_5bits field.

The value of the ssvh_unit_size_precision_bytes_minus1 field plus 1 may specify the precision, in bytes, of the ssvu_vpcc_unit_size element in all sample stream V-PCC units. The value of this field may be in the range of 0 to 7.

The ssvh_reserved_zero_5bits field is a reserved field for future use.

FIG. 27 shows an example of a syntax structure of a sample stream V-PCC unit (sample_stream_vpcc_unit( )) according to embodiments.

The content of each sample stream V-PCC unit is associated with the same access unit as the V-PCC unit contained in the sample stream V-PCC unit.

The sample_stream_vpcc_unit( ) according to embodiments may include an ssvu_vpcc_unit_size field and vpcc_unit(ssvu_vpcc_unit_size).

The ssvu_vpcc_unit_size field corresponds to the V-PCC unit size information 40030 of FIG. 24, and specifies the size, in bytes, of the subsequent vpcc_unit. The number of bits used to represent the ssvu_vpcc_unit_size field is equal to (ssvh_unit_sizeprecision_bytes_minus1+1)*8.

The vpcc_unit(ssvu_vpcc_unit_size) has a length corresponding to the value of the ssvu_vpcc_unit_size field, and carries one of the VPS, AD, OVD, GVD, and AVD.

FIG. 28 shows an example of a syntax structure of a V-PCC unit according to embodiments. A V-PCC unit is consists of a V-PCC unit header (vpcc_unit_header( )) 40041 and a V-PCC unit payload (vpcc_unit_payload( )) 40042. The V-PCC unit according to the embodiments may contain more data. In this case, it may further include a trailing zero 8bits field. The trailing zero 8bits field according to the embodiments is a byte corresponding to 0x00.

FIG. 29 shows an example of a syntax structure of a V-PCC unit header 40041 according to embodiments. In an embodiment, the vpcc_unit_header( ) of FIG. 29 includes a vuh_unit_type field. The vuh_unit_type field indicates the type of the corresponding V-PCC unit. The vuh_unit_type field according to the embodiments is also referred to as a vpcc_unit_type field.

FIG. 30 shows an example of V-PCC unit types assigned to the vuh_unit_type field according to embodiments.

Referring to FIG. 30, according to an embodiment, the vuh_unit_type field set to 0 indicates that the data contained in the V-PCC unit payload of the V-PCC unit is a V-PCC parameter set (VPCC_VPS). The vuh_unit_type field set to 1 indicates that the data is atlas data (VPCC_AD). The vuh_unit_type field set to 2 indicates that the data is occupancy video data (VPCC_OVD). The vuh_unit_type field set to 3 indicates that the data is geometry video data (VPCC_GVD). The vuh_unit_type field set to 4 indicates that the data is attribute video data (VPCC_AVD).

The meaning, order, deletion, addition, and the like of values assigned to the vuh_unit_type field may be easily changed by those skilled in the art, and accordingly the present disclosure will not be limited to the embodiment described above.

When the vuh_unit_type field indicates VPCC_AVD, VPCC_GVD, VPCC_OVD, or VPCC_AD, the V-PCC unit header according to the embodiments may further include a vuh_vpcc_parameter_set_id field and a vuh_atlas_id field.

The vuh_vpcc_parameter_set_id field specifies the value of vps_vpcc_parameter_set_id for the active V-PCC VPS.

The vuh_atlas_id field specifies the index of the atlas that corresponds to the current V-PCC unit.

When the vuh_unit_type field indicates VPCC_AVD, the V-PCC unit header according to the embodiments may further include a vuh_attribute_index field, a vuh_attribute_partition_index field, a vuh_map_index field, and a vuh_auxiliary_video_flag field.

The vuh_attribute_index field indicates the index of the attribute data carried in the attribute video data unit.

The vuh_attribute_partition_index field indicates the index of the attribute dimension group carried in the attribute video data unit.

When present, the vuh_map_index field may indicate the map index of the current geometry or attribute stream.

When the vuh_auxiliary_video_flag field set to 1 may indicate that the associated attribute video data unit contains RAW and/or EOM (Enhanced Occupancy Mode) coded points only. As another example, when the vuh_auxiliary_video_flag field set to 0 may indicate that the associated attribute video data unit may contain RAW and/or EOM coded points. When the vuh_auxiliary_video_flag field is not present, its value may be inferred to be equal to 0. According to embodiments, RAW and/or EOM coded points are also referred to as pulse code modulation (PCM) coded points.

When the vuh_unit_type field indicates VPCC_GVD, The V-PCC unit header according to the embodiments may further include a vuh_map_index field, a vuh_auxiliary_video_flag field, and a vuh_reserved_zero_12bits field.

When present, the vuh_map_index field indicates the index of the current geometry stream.

When the vuh_auxiliary_video_flag field set to 1 may indicate that the associated geometry video data unit contains RAW and/or EOM coded points only. As another example, when the vuh_auxiliary_video_flag field set to 0 may indicate that the associated geometry video data unit may contain RAW and/or EOM coded points. When the vuh_auxiliary_video_flag field is not present, its value may be inferred to be equal to 0. According to embodiments, RAW and/or EOM coded points are also referred to as PCM coded points.

The vuh_reserved_zero_12bits field is a reserved field for future use.

If the vuh_unit_type field indicates VPCC_OVD or VPCC_AD, the V-PCC unit header according to the embodiments may further include a vuh_reserved_zero_17bits field. Otherwise, the V-PCC unit header may further include a vuh_reserved_zero_27bits field.

The vuh_reserved_zero_17bits field and the vuh_reserved_zero_27bits field are reserved fields for future use.

FIG. 31 shows an example of a syntax structure of a V-PCC unit payload (vpcc_unit_payload( )) according to embodiments.

The V-PCC unit payload of FIG. 31 may contain one of a V-PCC parameter set (vpcc_parameter_set( )), an atlas sub-bitstream (atlas_sub_bitstream( )), and a video sub-bitstream (video_sub_bitstream( )) according to the value of the vuh_unit_type field in the V-PCC unit header.

For example, when the vuh_unit_type field indicates VPCC_VPS, the V-PCC unit payload contains vpcc_parameter_set( ) containing overall encoding information about the bitstream. When the vuh_unit_type field indicates VPCC_AD, the V-PCC unit payload contains atlas_sub_bitstream( ) carrying atlas data. In addition, according to an embodiment, when the vuh_unit_type field indicates VPCC_OVD, the V-PCC unit payload contains an occupancy video sub-bitstream (video_sub_bitstream( )) carrying occupancy video data. When the vuh_unit_type field indicates VPCC_GVD, the V-PCC unit payload contains a geometry video sub-bitstream (video_sub_bitstream( )) carrying geometry video data. When the vuh_unit_type field indicates VPCC_AVD, the V-PCC unit payload contains an attribute video sub-bitstream (video_sub_bitstream( )) carrying attribute video data.

According to embodiments, the atlas sub-bitstream may be referred to as an atlas substream, and the occupancy video sub-bitstream may be referred to as an occupancy video substream. The geometry video sub-bitstream may be referred to as a geometry video substream, and the attribute video sub-bitstream may be referred to as an attribute video substream. The V-PCC unit payload according to the embodiments conforms to the format of a High Efficiency Video Coding (HEVC) Network Abstraction Layer (NAL) unit.

FIG. 32 shows an example of a syntax structure of a V-PCC parameter set included in a V-PCC unit payload according to embodiments In FIG. 32, profile_tier_level( ) contain V-PCC codec profile related information and specifies restrictions on the bitstreams. It represents limits on the capabilities needed to decode the bitstreams. Profiles, tiers, and levels may be used to indicate interoperability points between individual decoder implementations.

The vps_vpcc_parameter_set_id field provides an identifier for the V-PCC VPS for reference by other syntax elements.

The value of the vps_atlas_count_minus1 field plus 1 indicates the total number of supported atlases in the current bitstream.

Depending on the value of the vps_atlas_count_minus1 field, namely, the total number of atlases, the following parameters may be further included in the parameter set.

vps_frame_width[j] field indicates the V-PCC frame width in terms of integer luma samples for the atlas with index j. This frame width is the nominal width that is associated with all V-PCC components for the atlas with index j.

vps_frame_height[j] field indicates the V-PCC frame height in terms of integer luma samples for the atlas with index j. This frame height is the nominal height that is associated with all V-PCC components for the atlas with index j.

vps_map_count_minus1[j] field plus 1 indicates the number of maps used for encoding the geometry and attribute data for the atlas with index j.

When vps_map_count_minus1[j] field is greater than 0, the following parameters may be further included in the parameter set.

Depending on the value of vps_map_count_minus1[j] field, the following parameters may be further included in the parameter set.

vps_multiple_map_streams_present_flag[j] field equal to 0 indicates that all geometry or attribute maps for the atlas with index j are placed in a single geometry or attribute video stream, respectively. vps_multiple_map_streams_present_flag[j] field equal to 1 indicates that all geometry or attribute maps for the atlas with index j are placed in separate video streams.

If vps_multiple_map_streams_present_flag[j] field is equal to 1, the vps_map_absolute_coding_enabled_flag[j][i] field may be further included in the parameter set. Otherwise, vps_map_absolute_coding_enabled_flag[j][i] field may be 1.

vps_map_absolute_coding_enabled_flag[j][i] field equal to 1 indicates that the geometry map with index i for the atlas with index j is coded without any form of map prediction. vps_map_absolute_coding_enabled_flag[j][i] field equal to 0 indicates that the geometry map with index i for the atlas with index j is first predicted from another, earlier coded map, prior to coding.

vps_map_absolute_coding_enabled_flag[j][0] field equal to 1 indicates that the geometry map with index 0 is coded without map prediction.

If vps_map_absolute_coding_enabled_flag[j][i] field is 0 and i is greater than 0, vps_map_predictor_index_diff[j][i] field may be further included in the parameter set. Otherwise, vps_map_predictor_index_diff[j][i] field may be 0.

vps_map_predictor_index_diff[j][i] field is used to compute the predictor of the geometry map with index i for the atlas with index j when vps_map_absolute_coding_enabled_flag[j][i] field is equal to 0.

vps_auxiliary_video_present_flag[j] field equal to 1 indicates that auxiliary information for the atlas with index j, i.e. RAW or EOM patch data, may be stored in a separate video stream, referred to as the auxiliary video stream. vps_auxiliary_video_present_flag[j] field equal to 0 indicates that auxiliary information for the atlas with index j is not be stored in a separate video stream.

occupancy_information( ) includes occupancy video related information.

geometry_information( ) includes geometry video related information.

attribute_information( ) includes attribute video related information.

vps_extension_present_flag field equal to 1 specifies that the vps_extension_length field is present in vpcc_parameter_set. vps_extension_present_flag field equal to 0 specifies that the vps_extension_length field is not present.

vps_extension_length_minus1 field plus 1 specifies the number of vps_extension_data_byte elements that follow this syntax element.

Depending on vps_extension_length_minus1 field, extension data (vps_extension_data_byte) may be further included in the parameter set.

vps_extension_data_byte field may have any value.

A patch frame (also referred to as a point cloud object or an atlas frame), which is a target of point cloud data, may be divided into one or multiple tiles. A tile according to embodiments may represent a certain region in a 3D space or a certain region in a 2D plane. In addition, the tile may be a rectangular cuboid in one bounding box or a part of a sub-bounding box or patch frame. In the present disclosure, dividing a patch frame (or point cloud object) into one or multiple tiles may be performed by the point cloud video encoder of FIG. 1, the patch generator of FIG. 18, the point cloud pre-processing unit of FIG. 20, or the patch generator of FIG. 21 or by a separate component/module.

Figure 33:
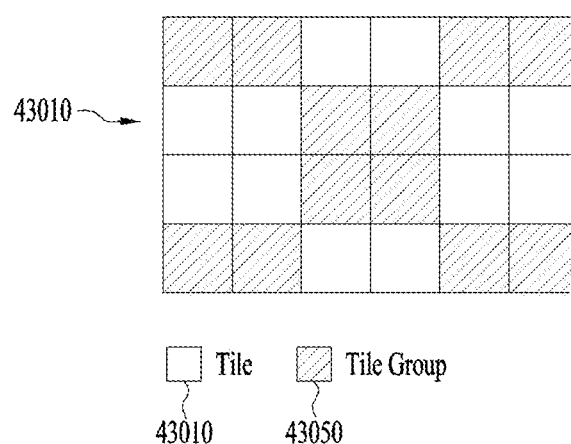
FIG. 33 shows an example of dividing a patch frame into a plurality of tiles according to the embodiments.

FIG. 33 shows an example of dividing a patch frame (or atlas frame) 43010 into a plurality of tiles by dividing the patch frame (or atlas frame) 43010 into one or more tile rows and one or more tile columns. A tile 43030 is a rectangular region of a patch frame, and a tile group 43050 may contain a number of tiles in the patch frame. In the present disclosure, the tile group 43050 contains a number of tiles of a patch frame that collectively form a rectangular (quadrangular) region of the patch frame. In the present disclosure, a tile and a tile group may not be distinguished from each other, and a tile group may correspond to one tile. For example, FIG. 33 shows an example in which a patch frame (or atlas frame) is divided into 24 tiles (i.e., 6 tile columns and 4 tile rows) and 9 rectangular (quadrangular) tile groups.

According to other embodiments, in FIG. 33, the tile group 43050 may be referred to as a tile, and the tile 43030 may be referred to as a tile partition. The term signaling information may also be changed and referred to according to the complementary relationship as described above.

Figure 34:
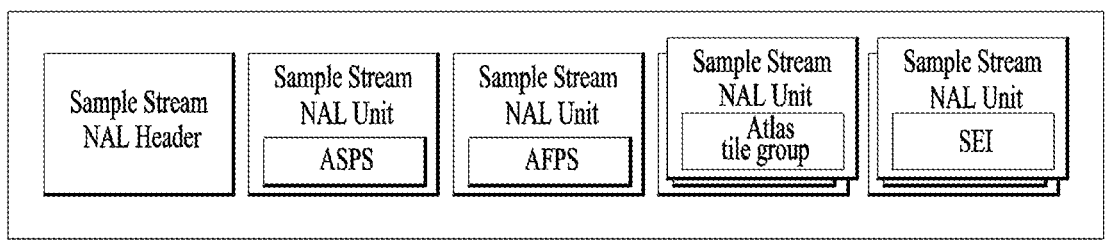
FIG. 34 is a diagram illustrating an example of a structure of an atlas substream according to embodiments.

FIG. 34 is a diagram illustrating an example of the structure of an atlas substream as described above. In an embodiment, the atlas substream of FIG. 34 conforms to the format of the HEVC NAL unit.

The atlas substream according to the embodiments may be composed of a sample stream NAL unit containing an atlas sequence parameter set (ASPS), a sample stream NAL unit containing an atlas frame parameter set (AFPS), and one or more sample stream NAL units containing information about one or more atlas tile groups, and/or one or more sample stream NAL units containing one or more SEI messages.

The one or more SEI messages according to embodiments may include a prefix SEI message and a suffix SEI message.

The atlas substream according to the embodiments may further contain a sample stream NAL header placed in front of one or more NAL units.

FIG. 35 shows an example of a syntax structure of a sample stream NAL header (sample_stream_nal_header( )) contained in the atlas substream according to embodiments.

The sample_stream_nal_header( ) according to the embodiments may include an ssnh_unit_size_precision_bytes_minus1 field and an ssnh_reserved_zero_5bits field.

The value of the ssnh_unit_size_precision_bytes_minus1 field plus 1 may specify the precision, in bytes, of the ssnu_nal_unit_size element in all sample stream NAL units. The value of this field may be in the range of 0 to 7.

The ssnh_reserved_zero_5bits field is a reserved field for future use.

FIG. 36 shows an example of a syntax structure of a sample stream NAL unit (sample_stream_nal_unit( )) according to embodiments.

The sample_stream_nal_unit( ) according to the embodiments may include an ssnu_nal_unit_size field and nal_unit (ssnu_nal_unit_size).

The ssnu_nal_unit_size field specifies the size, in bytes, of the subsequent NAL_unit. The number of bits used to represent the ssnu_nal_unit_size field is equal to (ssnh_unit_size_precision_bytes_minus1+1)*8.

The nal_unit(ssnu_nal_unit_size) has a length corresponding to the value of the ssnu_nal_unit_size field, and carries one of an atlas sequence parameter set (ASPS), an atlas frame parameter set (AFPS), atlas tile group information, and an SEI message. That is, each sample stream NAL unit may contain an ASPS, an AFPS, atlas tile group information, or an SEI message. According to embodiments, the ASPS, the AFPS, the atlas tile group information, and the SEI message are referred to as atlas data (or atlas metadata).

SEI messages according to embodiments may assist in processes related to decoding, reconstruction, display, or other purposes.

FIG. 37 shows an example of a syntax structure of nal_unit(NumBytesInNalUnit) of FIG. 36.

In FIG. 37, NumBytesInNalUnit indicates the size of a NAL unit in bytes. NumBytesInNalUnit represents the value of the ssnu_nal_unit_size field of FIG. 36.

According to embodiments, a NAL unit may include a NAL unit header (nal_unit_header( )) and a NumBytesInRbsp field. The NumBytesInRbsp field is initialized to 0 and indicates bytes belonging to the payload of the NAL unit.

The NAL unit includes an iteration statement that is repeated as many times as the value of NumBytesInNalUnit. In an embodiment, the iteration statement includes rbsp_byte[NumBytesInRbsp++]. According to an embodiment, in the iteration statement, i is initialized to 2 and is incremented by 1 every time the iteration statement is executed. The iteration statement is repeated until i reaches the value of NumBytesInNalUnit.

The rbsp_byte[NumBytesInRbsp++] is the i-th byte of a raw byte sequence payload (RBSP) carrying atlas data. The RBSP is specified as a sequential sequence of bytes. That is, the rbsp_byte[NumBytesInRbsp++] carries one of an atlas sequence parameter set (ASPS), an atlas frame parameter set (AFPS), atlas tile group information, and an SEI message.

FIG. 38 shows an example of a syntax structure of the NAL unit header of FIG. 37. The NAL unit header may include a nal_forbidden_zero_bit field, a nal_unit_type field, a nal_layer_id field, and a nal_temporal_id_plus1 field.

The nal_forbidden_zero_bit is used for error detection in the NAL unit and must be 0.

The nal_unit_type specifies the type of the RBSP data structure contained in the NAL unit. An example of the RBSP data structure according to the value of the nal_unit_type field will be described with reference to FIG. 39.

nal_layer_id specifies the identifier of the layer to which an atlas coding layer (ACL) NAL unit belongs or the identifier of a layer to which a non-ACL NAL unit applies.

nal_temporal_id_plus1 minus1 specifies a temporal identifier for the NAL unit.

FIG. 39 shows examples of types of RBSP data structures allocated to a nal_unit_type field. That is, the figure shows types of the nal_unit_type field in the NAL unit header of the NAL unit included in the sample stream NAL unit.

In FIG. 39, NAL TRAIL indicates that a coded tile group of a non-TSA, non STSA trailing atlas frame is included in the NAL unit. The RBSP syntax structure of the NAL unit is atlas_tile_group_layer_rbsp( ) or atlas_tile_layer_rbsp( ) The type class of the NAL unit is ACL. According to embodiments, a tile group may correspond to a tile.

NAL TSA indicates that a coded tile group of a TSA atlas frame is included in the NAL unit. The RBSP syntax structure of the NAL unit is atlas_tile_group_layer_rbsp( ) or atlas_tile_layer_rbsp( ) The type class of the NAL unit is ACL.

NAL_STSA indicates that a coded tile group of an STSA atlas frame is included in the NAL unit. The RBSP syntax structure of the NAL unit is atlas_tile_group_layer_rbsp( ) or atlas_tile_layer_rbsp( ) The type class of the NAL unit is ACL.

NAL_RADL indicates that a coded tile group of an RADL atlas frame is included in the NAL unit. The RBSP syntax structure of the NAL unit is atlas_tile_group_layer_rbsp( ) or atlas_tile_layer_rbsp( ) The type class of the NAL unit is ACL.

NAL_RASL indicates that a coded tile group of an RASL atlas frame is included in the NAL unit. The RBSP syntax structure of the NAL unit is atlas_tile_group_layer_rbsp( ) or aatlas_tile_layer_rbsp( ) The type class of the NAL unit is ACL.

NAL_SKIP indicates that a coded tile group of a skipped atlas frame is included in the NAL unit. The RBSP syntax structure of the NAL unit is atlas_tile_group_layer_rbsp( ) or atlas_tile_layer_rbsp( ) The type class of the NAL unit is ACL.

NAL_RSV_ACL_6 to NAL_RSV_ACL_9 indicate that reserved non-IRAP ACL NAL unit types are included in the NAL unit. The type class of the NAL unit is ACL.

NAL_BLA_W_LP, NAL_BLA_W_RADL, and NAL_BLA_N_LP indicate that a coded tile group of a BLA atlas frame is included in the NAL unit. The RBSP syntax structure of the NAL unit is atlas_tile_group_layer_rbsp( ) or atlas_tile_layer_rbsp( ). The type class of the NAL unit is ACL.

NAL_GBLA_W_LP, NAL_GBLA_W_RADL, and NAL_GBLA_N_LP indicate that a coded tile group of a GBLA atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_IDR_W_RADL and NAL_IDR_N_LP indicate that a coded tile group of an IDR atlas frame is included in the NAL unit. The RBSP syntax structure of the NAL unit is atlas_tile_group_layer_rbsp( ) or atlas_tile_layer_rbsp( ) The type class of the NAL unit is ACL.

NAL_GIDR_W_RADL and NAL_GIDR_N_LP indicate that a coded tile group of a GIDR atlas frame is included in the NAL unit. The RBSP syntax structure of the NAL unit is atlas_tile_group_layer_rbsp( ) or atlas_tile_layer_rbsp( ) The type class of the NAL unit is ACL.

NAL_CRA indicates that a coded tile group of a CRA atlas frame is included in the NAL unit. The RBSP syntax structure of the NAL unit is atlas_tile_group_layer_rbsp( ) or atlas_tile_layer_rbsp( ) The type class of the NAL unit is ACL.

NAL_GCRA indicates that a coded tile group of a GCRA atlas frame is included in the NAL unit. The RBSP syntax structure of the NAL unit is atlas_tile_group_layer_rbsp( ) or atlas_tile_layer_rbsp( ) The type class of the NAL unit is ACL.

NAL_IRAP_ACL_22 and NAL_IRAP_ACL_23 indicate that reserved IRAP ACL NAL unit types are included in the NAL unit. The type class of the NAL unit is ACL.

NAL_RSV_ACL_24 to NAL_RSV_ACL_31 indicate that reserved non-TRAP ACL NAL unit types are included in the NAL unit. The type class of the NAL unit is ACL.

NAL_ASPS indicates that an ASPS is included in the NAL unit. The RBSP syntax structure of the NAL unit is atlas_sequence_parameter_set_rbsp ( ). The type class of the NAL unit is non-ACL.

NAL_AFPS indicates that an AFPS is included in the NAL unit. The RBSP syntax structure of the NAL unit is atlas_frame_parameter_set_rbsp ( ). The type class of the NAL unit is non-ACL.

NAL_AUD indicates that an access unit delimiter is included in the NAL unit. The RBSP syntax structure of the NAL unit is access_unit_delimiter_rbsp ( ). The type class of the NAL unit is non-ACL.

NAL_VPCC_AUD indicates that a V-PCC access unit delimiter is included in the NAL unit. The RBSP syntax structure of the NAL unit is access_unit_delimiter_rbsp ( ). The type class of the NAL unit is non-ACL.

NAL_EOS indicates that the NAL unit type may be end of sequence. The RBSP syntax structure of the NAL unit is end_of_seq_rbsp ( ). The type class of the NAL unit is non-ACL.

NAL_EOB indicates that the NAL unit type may be end of bitstream. The RBSP syntax structure of the NAL unit is end_of_atlas_sub_bitstream_rbsp ( ). The type class of the NAL unit is non-ACL.

NAL_FD Filler indicates that filler_data_rbsp( ) is included in the NAL unit. The type class of the NAL unit is non-ACL.

NAL_PREFIX_NSEI and NAL_SUFFIX_NSEI indicate that non-essential supplemental enhancement information is included in the NAL unit. The RBSP syntax structure of the NAL unit is sei_rbsp ( ). The type class of the NAL unit is non-ACL.

NAL_PREFIX_ESEI and NAL_SUFFIX_ESEI indicate that essential supplemental enhancement information is included in the NAL unit. The RBSP syntax structure of the NAL unit is sei_rbsp ( ). The type class of the NAL unit is non-ACL.

NAL_AAPS indicates that an atlas adaptation parameter set is included in the NAL unit. The RBSP syntax structure of the NAL unit is atlas_adaptation_parameter_set_rbsp ( ). The type class of the NAL unit is non-ACL.

NAL_RSV_NACL_44 to NAL_RSV_NACL_47 indicate that the NAL unit type may be reserved non-ACL NAL unit types. The type class of the NAL unit is non-ACL.

NAL_UNSPEC_48 to NAL_UNSPEC_63 indicate that the NAL unit type may be unspecified non-ACL NAL unit types. The type class of the NAL unit is non-ACL.

FIG. 40 shows a syntax structure of an atlas sequence parameter set according to embodiments.

FIG. 40 shows the syntax of an RBSP data structure included in a NAL unit when the NAL unit type is atlas sequence parameter.

Each sample stream NAL unit may contain one of an atlas parameter set, for example, ASPS, AAPS, or AFPS, one or more atlas tile group about, and SEIs.

The ASPS may contain syntax elements that apply to zero or more entire coded atlas sequences (CASs) as determined by the content of a syntax element found in the ASPS referred to by a syntax element found in each tile group (or tile) header. According to embodiments, a syntax element may have the same meaning with a filed or a parameter.

In FIG. 40, asps_atlas_sequence_parameter_set_id field may provide an identifier for identifying the atlas sequence parameter set for reference by other syntax elements.

asps_frame_width field indicates the atlas frame width in terms of integer number of samples, where a sample corresponds to a luma sample of a video component.

asps_frame_height field indicates the atlas frame height in terms of integer number of samples, where a sample corresponds to a luma sample of a video component.

asps_log 2_patch_packing_block_size field specifies the value of the variable PatchPackingBlockSize that is used for the horizontal and vertical placement of the patches within the atlas.

asps_log 2_max_atlas_frame_order_cnt_lsb_minus4 field specifies the value of the variable MaxAtlasFrmOrderCntLsb that is used in the decoding process for the atlas frame order count.

asps_max_dec_atlas_frame_buffering_minus1 field plus 1 specifies the maximum required size of the decoded atlas frame buffer for the CAS in units of atlas frame storage buffers.

asps_long_term_ref_atlas_frames_flag field equal to 0 specifies that no long term reference atlas frame is used for inter prediction of any coded atlas frame in the CAS. asps_long_term_ref_atlas_frames_flag field equal to 1 specifies that long term reference atlas frames may be used for inter prediction of one or more coded atlas frames in the CAS.

asps_num_ref_atlas_frame_lists_in_asps field specifies the number of the ref_list_struct(rlsIdx) syntax structures included in the atlas sequence parameter set.

The ASAP includes an iteration statement that is repeated as many times as the value of the asps_num_ref_atlas_frame_lists_in_asps field. In an embodiment, the iteration statement includes ref_list_struct(i). According to an embodiment, in the iteration statement, i is initialized to 0 and is incremented by 1 every time the iteration statement is executed. The iteration statement is repeated until i reaches the value of the asps_num_ref_atlas_frame_lists_in_asps field.

ref_list_struct(i) will be described in detail with reference to FIG. 49.

When asps_num_ref_atlas_frame_lists_in_asps field is greater than 0, atgh_ref_atlas_frame_list_sps_flag field may be included in the atlas tile group (tile) header. When asps_num_ref_atlas_frame_lists_in_asps field is greater than 1, atgh_ref_atlas_frame_list_idx field may be included in the atlas tile group (tile) header.

asps_use_eight_orientations_flag field equal to 0 specifies that the patch orientation index for a patch with index j in a frame with index i, pdu_orientation_index[i][j] field, is in the range of 0 to 1, inclusive. asps_use_eight_orientations_flag field equal to 1 specifies that the patch orientation index for a patch with index j in a frame with index i, pdu_orientation_index[i][j] field, is in the range of 0 to 7, inclusive.

asps_extended_projection_enabled_flag field equal to 0 specifies that the patch projection information is not signaled for the current atlas tile group. asps_extended_projection_enabled_flag field equal to 1 specifies that the patch projection information is signaled for the current atlas tile group.

asps_normal_axis_limits_quantization_enabled_flag field equal to 1 specifies that quantization parameters shall be signalled and used for quantizing the normal axis related elements of a patch data unit, a merge patch data unit, or an inter patch data unit. If asps_normal_axis_limits_quantization_enabled_flag field is equal to 0, then no quantization is applied on any normal axis related elements of a patch data unit, a merge patch data unit, or an inter patch data unit.

When asps_normal_axis_limits_quantization_enabled_flag field is 1, atgh_pos_min_z_quantizer field may be included in the atlas tile group (or tile) header.

asps_normal_axis_max_delta_value_enabled_flag field equal to 1 specifies that the maximum nominal shift value of the normal axis that may be present in the geometry information of a patch with index i in a frame with index j will be indicated in the bitstream for each patch data unit, a merge patch data unit, or an inter patch data unit. If asps_normal_axis_max_delta_value_enabled_flag field is equal to 0, then the maximum nominal shift value of the normal axis that may be present in the geometry information of a patch with index i in a frame with index j shall not be indicated in the bitstream for each patch data unit, a merge patch data unit, or an inter patch data unit.

When asps_normal_axis_max_delta_value_enabled_flag field is 1, atgh_pos_delta_max_z_quantizer field may be included in the atlas tile group (or tile) header.

asps_remove_duplicate_point_enabled_flag field equal to 1 indicates that duplicated points are not constructed for the current atlas, where a duplicated point is a point with the same 2D and 3D geometry coordinates as another point from a lower index map. asps_remove_duplicate_point_enabled_flag field equal to 0 indicates that all points are reconstructed.

asps_max_dec_atlas_frame_buffering_minus1 field plus 1 specifies the maximum required size of the decoded atlas frame buffer for the CAS in units of atlas frame storage buffers.

asps_pixel_deinterleaving_flag field equal to 1 indicates that the decoded geometry and attribute videos for the current atlas contain spatially interleaved pixels from two maps. asps_pixel_deinterleaving_flag field equal to 0 indicates that the decoded geometry and attribute videos corresponding to the current atlas contain pixels from only a single map.

asps_patch_precedence_order_flag field equal to 1 indicates that patch precedence for the current atlas is the same as the decoding order. asps_patch_precedence_order_flag field equal to 0 indicates that patch precedence for the current atlas is the reverse of the decoding order.

asps_patch_size_quantizer_present_flag field equal to 1 indicates that the patch size quantization parameters are present in an atlas tile group header. asps_patch_size_quantizer_present_flag field equal to 0 indicates that the patch size quantization parameters are not present.

When asps_patch_size_quantizer_present_flag field is equal to 1, atgh_patch_size_x_info_quantizer field and atgh_patch_size_y_info_quantizer field may be included in the atlas tile group (or tile) header.

asps_eom_patch_enabled_flag field equal to 1 indicates that the decoded occupancy map video for the current atlas contains information related to whether intermediate depth positions between two depth maps are occupied. asps_eom_patch_enabled_flag field equal to 0 indicates that the decoded occupancy map video does not contain information related to whether intermediate depth positions between two depth maps are occupied.

asps_raw_patch_enabled_flag field equal to 1 indicates that the decoded geometry and attribute videos for the current atlas contains information related to RAW coded points. asps_raw_patch_enabled_flag field equal to 0 indicates that the decoded geometry and attribute videos do not contain information related to RAW coded points.

When asps_eom_patch_enabled_flag field or asps_raw_patch_enabled_flag field is equal to 1, asps auxiliary video enabled flag field may be included in the atlas sequence parameter set syntax.

asps_auxiliary_video_enabled_flag field equal to 1 indicates that information associated with RAW and EOM patch types could be placed in auxiliary video sub-bitstreams. asps_auxiliary_video_enabled_flag field equal to 0 indicates that information associated with RAW and EOM patch types can only be placed in primary video sub-bitstreams.

asps_point_local_reconstruction_enabled_flag field equal to 1 indicates that point local reconstruction mode information may be present in the bitstream for the current atlas. asps_point_local_reconstruction_enabled_flag field equal to 0 indicates that no information related to the point local reconstruction mode is present in the bitstream for the current atlas.

asps_map_count_minus1 field plus 1 indicates the number of maps that may be used for encoding the geometry and attribute data for the current atlas.

When asps_pixel_deinterleaving_enabled_flag field is equal to 1, the asps_pixel_deinterleaving_map_flag[j] field may be included in ASPS for each value of the asps_map_count_minus1 field.

asps_pixel_deinterleaving_map_flag[i] field equal to 1 indicates that decoded geometry and attribute videos corresponding to map with index i in the current atlas contain spatially interleaved pixels corresponding to two maps. asps_pixel_deinterleaving_map_flag[i] field equal to 0 indicates that decoded geometry and attribute videos corresponding to map index i in the current atlas contain pixels corresponding to a single map.

When asps_eom_patch_enabled_flag field and asps_map_count_minus1 field are equal to 0, ASPS may further include asps_eom_fix_bit_count_minus1 field.

asps_eom_fix_bit_count_minus1 field plus 1 indicates the size in bits of the EOM codeword.

When the asps_point_local_reconstruction_enabled_flag field is equal to 1, asps_point_local_reconstruction_information (asps_map_count_minus1) may be included in ASPS and transmitted.

When asps_pixel_deinterleaving_enabled_flag field or asps_point_local_reconstruction_enabled_flag field is equal to 1, ASPS may further include asps_surface_thickness_minus1 field.

asps_surface_thickness_minus1 field plus 1 specifies the maximum absolute difference between an explicitly coded depth value and interpolated depth value when asps_pixel_deinterleaving_enabled_flag field or asps_point_local_reconstruction_enabled_flag field is equal to 1.

asps_vui_parameters_present_flag field equal to 1 specifies that the vui_parameters( ) syntax structure is present. asps_vui_parameters_present_flag field equal to 0 specifies that the vui_parameters( ) syntax structure is not present.

asps_extension_flag field equal to 0 specifies that no asps_extension_data_flag field are present in the ASPS RBSP syntax structure.

asps_extension_data_flag field indicates that data for extension is included in the ASPS RBSP syntax structure.

rbsp_trailing_bits field is used to fill the remaining bits with 0 for byte alignment after adding 1, which is a stop bit, to indicate the end of RBSP data.

FIG. 41 shows an atlas frame parameter set according to embodiments.

FIG. 41 shows the syntax structure of an atlas frame parameter set contained in the NAL unit when the NAL unit type (nal_unit_type) is NAL_AFPS as shown in FIG. 39.

In FIG. 41, the atlas frame parameter set (AFPS) contains a syntax structure containing syntax elements that apply to all zero or more entire coded atlas frames.

afps_atlas_frame_parameter_set_id field may provide an identifier for identifying the atlas frame parameter set for reference by other syntax elements. That is, an identifier that may be referred to by other syntax elements may be provided through the AFPS atlas frame parameter set.

afps_atlas_sequence_parameter_set_id field specifies the value of asps_atlas_sequence_parameter_set_id for the active atlas sequence parameter set.

atlas_frame_tile_information( ) will be described with reference to FIG. 42.

afps_output_flag_present_flag field equal to 1 indicates that the atgh_atlas_output_flag or ath_atlas_output_flag field is present in the associated tile group (or tile) headers. afps_output_flag_present_flag field equal to 0 indicates that the atgh_atlas_output_flag field or ath_atlas_output_flag field is not present in the associated tile group (or tile) headers.

afps_num_ref_idx_default_active_minus1 field plus 1 specifies the inferred value of the variable NumRefIdxActive for the tile group with atgh_num_ref_idx_active_override_flag field equal to 0.

afps_additional_lt_afoc_lsb_len field specifies the value of the variable MaxLtAtlasFrmOrderCntLsb that is used in the decoding process for reference atlas frame.

afps_3d_pos_x_bit_count_minus1 field plus 1 specifies the number of bits in the fixed-length representation of pdu_3d_pos_x[j] field of patch with index j in an atlas tile group that refers to afps_atlas_frame_parameter_set_id field.

afps_3d_pos_y_bit_count_minus1 field plus 1 specifies the number of bits in the fixed-length representation of pdu_3d_pos_y[j] field of patch with index j in an atlas tile group that refers to afps_atlas_frame_parameter_set_id field.

afps_lod_mode_enabled_flag field equal to 1 indicates that the LOD parameters may be present in a patch. afps_lod_mode_enabled_flag field equal to 0 indicates that the LOD parameters are not present in a patch.

afps_override_eom_for_depth_flag field equal to 1 indicates that the values of afps_eom_number_of_patch_bit_count_minus1 field and afps_eom_max_bit_count_minus1 field are explicitly present in the bitstream. afps_override_eom_for_depth_flag field equal to 0 indicates that the values of afps_eom_number_of_patch_bit_count_minus1 field and afps_eom_max_bit_count_minus1 field are implicitly derived.

afps_eom_number_of_patch_bit_count_minus1 field plus 1 specifies the number of bits used to represent the number of geometry patches associated in an EOM attribute patch in an atlas frame that is associated with this atlas frame parameter set.

afps_eom_max_bit_count_minus1 field plus 1 specifies the number of bits used to represent the number of EOM points per geometry patch associated with an EOM attribute patch in an atlas frame that is associated with this atlas frame parameter set.

afps_raw_3d_pos_bit_count_explicit_mode_flag field equal to 1 indicates that the number of bits in the fixed-length representation of rpdu_3d_pos_x field, rpdu_3d_pos_y field, and rpdu_3d_pos_z field is explicitly coded by atgh_raw_3d_pos_axis_bit_count_minus1 field in the atlas tile group header that refers to afps_atlas_frame_parameter_set_id field. afps_raw_3d_pos_bit_count_explicit_mode_flag field equal to 0 indicates the value of atgh_raw_3d_pos_axis_bit_count_minus1 field is implicitly derived.

When afps_raw_3d_pos_bit_count_explicit_mode_flag field is equal to 1, atgh_raw_3d_pos_axis_bit_count_minus1 field may be included in the atlas tile group (or tile) header.

afps_fixed_camera_model_flag indicates whether a fixed camera model is present.

afps_extension_flag field equal to 0 specifies that no afps extension data flag fields are present in the AFPS RBSP syntax structure.

afps_extension_data_flag field may contain extension related data.

FIG. 42 shows a syntax structure of atlas_frame_tile_information according to embodiments.

FIG. 42 shows the syntax of atlas_frame_tile_information included in FIG. 41.

afti_single_tile_in_atlas_frame_flag field equal to 1 specifies that there is only one tile in each atlas frame referring to the AFPS. afti_single_tile_in_atlas_frame_flag field equal to 0 specifies that there is more than one tile in each atlas frame referring to the AFPS.

afti_uniform_tile_spacing_flag field equal to 1 specifies that tile column and row boundaries are distributed uniformly across the atlas frame and signaled using the syntax elements, afti_tile_cols_width_minus1 field and afti_tile_rows_height_minus1 field, respectively. afti_uniform_tile_spacing_flag field equal to 0 specifies that tile column and row boundaries may or may not be distributed uniformly across the atlas frame and are signaled using afti_num_tile_columns_minus1 field and afti_num_tile_rows_minus1 field and a list of syntax element pairs afti_tile_column_width_minus1 [i] and afti_tile_row_height_minus1 [i].

afti_tile_cols_width_minus1 field plus 1 specifies the width of the tile columns excluding the right-most tile column of the atlas frame in units of 64 samples when afti_uniform_tile_spacing_flag field is equal to 1.

afti_tile_rows_height_minus1 field plus 1 specifies the height of the tile rows excluding the bottom tile row of the atlas frame in units of 64 samples when afti_uniform_tile_spacing_flag field is equal to 1.

afti_num_tile_columns_minus1 field plus 1 specifies the number of tile columns partitioning the atlas frame when afti_uniform_tile_spacing_flag field is equal to 0.

afti_num_tile_rows_minus1 field plus 1 specifies the number of tile rows partitioning the atlas frame when pti_uniform_tile_spacing_flag field is equal to 0.

afti_tile_column_width_minus1[i] field plus 1 specifies the width of the i-th tile column in units of 64 samples.

afti_tile_row_height_minus1 [i] field plus 1 specifies the height of the i-th tile row in units of 64 samples.

afti_single_tileper_tile_group_flag field equal to 1 specifies that each tile group that refers to this AFPS includes one tile. afti_single_tileper_tile_group_flag field equal to 0 specifies that a tile group that refers to this AFPS may include more than one tile.

When afti_single_tileper_tile_group_flag field is equal to 0, afti_num_tile_groups_in_atlas_frame_minus1 field is carried in the atlas_frame_tile_information.

afti_num_tile_groups_in_atlas_frame_minus1 field plus 1 specifies the number of tile groups (or tiles) in each atlas frame referring to the AFPS.

afti_top_left_tile_idx[i] field and afti_bottom_right_tile_idx_delta[i] field may further be included in the AFPS for each value of the afti_num_tile_groups_in_atlas_frame_minus1 field.

afti_top_left_tile_idx[i] field specifies the tile index of the tile located at the top-left corner of the i-th tile group.

afti_bottom_right_tile_idx_delta[i] field specifies the difference between the tile index of the tile located at the bottom-right corner of the i-th tile group and afti_top_left_tile_idx[i] field.

afti_signalled_tile_group_id_flag field equal to 1 specifies that the tile group ID for each tile group is signaled.

When afti_signalled_tile_group_id_flag field is 1, afti_signalled_tile_group_id_length_minus1 field and afti_tile_group_id[i] field may be carried in the atlas frame tile information.

afti_signalled_tile_group_id_length_minus1 field plus 1 specifies the number of bits used to represent the syntax element afti_tile_group_id[i] field when present, and the syntax element atgh_address in tile group headers.

afti_tile_group_id[i] field specifies the tile group ID of the i-th tile group. The length of the afti_tile_group_id[i] field is afti_signalled_tile_group_id_length_minus1+1 bits.

FIG. 43 shows an atlas adaptation parameter set (atlas_adaptation_parameter_set_rbsp( ) according to embodiments.

FIG. 43 shows the syntax structure of an atlas adaptation parameter set (AAPS) carried by a NAL unit when the NAL unit type (nal_unit_type) is NAL_AAPS.

An AAPS RBSP includes parameters that can be referred to by the coded tile group (or tile) NAL units of one or more coded atlas frames. At most one AAPS RBSP is considered active at any given moment during the operation of the decoding process, and the activation of any particular AAPS RBSP results in the deactivation of the previously-active AAPS RBSP.

In FIG. 43, aaps_atlas_adaptation_parameter_set_id field provides an identifier for identifying the atlas adaptation parameter set for reference by other syntax elements.

aaps_atlas_sequence_parameter_set_id field specifies the value of asps_atlas_sequence_parameter_set_id field for the active atlas sequence parameter set.

aaps_camera_parameters_present_flag field equal to 1 specifies that camera parameters (atlas_camera_parameters) are present in the current atlas adaptation parameter set. aaps_camera_parameters_present_flag field equal to 0 specifies that camera parameters for the current adaptation parameter set are not be present. atlas_camera_parameters will be described with reference to FIG. 44.

aaps_extension_flag field equal to 0 specifies that no aaps_extension_data flag field are present in the AAPS RBSP syntax structure.

aaps_extension_data flag field may whether the AAPS contains extension related data.

FIG. 44 shows atlas_camera_parameters according to embodiments.

FIG. 44 shows the detailed syntax of atlas_camera_parameters of FIG. 43.

In FIG. 44, acp_camera_model field indicates the camera model for point cloud frames that are associated with the current atlas adaptation parameter set.

FIG. 45 is a table showing examples of camera models assigned to the acp_camera_model field according to embodiments.

For example, acp_camera_model field equal to 0 indicates that the camera model is UNSPECIFIED acp_camera_model field equal to 1 indicates that the camera model is the orthographic camera model.

When acp_camera_model field is 2-255, the camera model may be reserved.

According to embodiments, when a value of the acp_camera_model field is equal to 1, camera parameters may further include acp_scale_enabled_flag field, acp_offset_enabled_flag field and/or acp_rotation_enabled_flag field related to scale, offset and rotation.

acp_scale_enabled_flag field equal to 1 indicates that scale parameters for the current camera model are present. acp_scale_enabled_flag equal to 0 field indicates that scale parameters for the current camera model are not present.

When acp_scale_enabled_flag field is equal to 1, acp_scale_on_axis[d] field may be included in the atlas camera parameters for each value of d.

acp_scale_on_axis[d] field specifies the value of the scale, Scale[d], along the d axis for the current camera model. The value of d is in the range of 0 to 2, inclusive, with the values of 0, 1, and 2 corresponding to the X, Y, and Z axis, respectively.

acp_offset_enabled_flag field equal to 1 indicates that offset parameters for the current camera model are present. acp_offset_enabled_flag field equal to 0 indicates that offset parameters for the current camera model are not present.

When acp_offset_enabled_flag field is equal to 1, the acp_offset_on_axis[d] field may be included in the atlas camera parameters for each value of d.

acp_offset_on_axis[d] field indicates the value of the offset, Offset[d], along the d axis for the current camera model where d is in the range of 0 to 2, inclusive. The values of d equal to 0, 1, and 2 correspond to the X, Y, and Z axis, respectively.

acp_rotation_enabled_flag field equal to 1 indicates that rotation parameters for the current camera model are present. acp_rotation_enabled_flag field equal to 0 indicates that rotation parameters for the current camera model are not present.

When acp_rotation_enabled_flag field is equal to 1, the atlas camera parameters may further include acp_rotation_qx_field, acp_rotation_qy field and acp_rotation_qz field.

acp_rotation_qx field specifies the x component, qX, for the rotation of the current camera model using the quaternion representation.

acp_rotation_qy field specifies the y component, qY, for the rotation of the current camera model using the quaternion representation.

acp_rotation_qz field specifies the z component, qZ, for the rotation of the current camera model using the quaternion representation.

The atlas_camera parameters ( ) as described above may be included in at least one SEI message and transmitted.

FIG. 46 shows atlas_tile_group_layer according to embodiments.

FIG. 46 shows the syntax structure of atlas_tile_group_layer carried in a NAL unit according to a NAL unit type as shown in FIG. 39.

According to embodiments, a tile group may correspond to a tile. In the present disclosure, the term "tile group" may be referred to as the term "tile." Similarly, the term "atgh" may be interpreted as the term "ath."

atlas_tile_group_layer field or atlas_tile_layer field may contain atlas_tile_group_header (atlas_tile_group_header) or atlas_tile_header(atlas_tile_header). The atlas tile group (or tile) header (atlas_tile_group_header or atlas_tile_header) will be described with reference to FIG. 47.

When atgh_type field for an atlas tile group (or tile) is not SKIP_TILE_GRP, atlas tile group (or tile) data may be contained in atlas_tile_group_layer or atlas_tile_layer.

FIG. 47 shows an example of a syntax structure of atlas tile group (or tile) header (atlas_tile_group_header( ) or atlas_tile_header( )) included in atlas_tile_group_layer according to embodiments.

In FIG. 47, atgh_atlas_frame_parameter_set_id field specifies the value of afps_atlas_frame_parameter_set_id field for the active atlas frame parameter set for the current atlas tile group.

atgh_atlas_adaptation_parameter_set_id field specifies the value of aaps_atlas_adaptation_parameter_set_id field for the active atlas adaptation parameter set for the current atlas tile group.

atgh_address field specifies the tile group (or tile) address of the tile group (or tile). When not present, the value of atgh_address field is inferred to be equal to 0. The tile group (or tile) address is the tile group ID (or tile ID) of the tile group (or tile). The length of atgh_address field is afti_signalled_tile_group_id_length_minus1 field+1 bits. If afti_signalled_tile_group_id flag field is equal to 0, the value of atgh_address field is in the range of 0 to afti_num_tile_groups_in_atlas_frame_minus1 field, inclusive. Otherwise, the value of atgh_address field is in the range of 0 to 2(afti_signalled_tile_group_id_length_minus1 field+1)−1, inclusive. The afti_signalled_tile_group_id_length_minus1 field and afti_signalled_tile_group_id flag field are included in the AFTI.

atgh_type field specifies the coding type of the current atlas tile group (tile).

FIG. 48 shows examples of coding types assigned to the atgh_type field according to embodiments.

For example, when the value of atgh_type field is 0, the coding type of the atlas tile group (or tile) is P_TILE_GRP (Inter atlas tile group (or tile)).

When the value of atgh_type field is 1, the coding type of the atlas tile group (or tile) is I_TILE_GRP (Intra atlas tile group (or tile)).

When the value of atgh_type is 2 field, the coding type of the atlas tile group (or tile) is SKIP_TILE_GRP (SKIP atlas tile group (or tile)).

A value of afps_output_flag_present_flag field included in the AFTI is equal to 1, atlas tile group (or tile) header may further include atgh_atlas_output_flag field.

atgh_atlas_output_flag field affects the decoded atlas output and removal processes.

atgh_atlas_frm_order_cnt_lsb field specifies the atlas frame order count modulo MaxAtlasFrmOrderCntLsb for the current atlas tile group.

According to embodiments, if the value of the asps_num_ref_atlas_frame_lists_in_asps field included in the atlas sequence parameter set (ASPS) is greater than 1, the atlas_tile_group (or tile) header may further include an atgh_ref_atlas_frame_list_sps_flag field. asps_num_ref_atlas_frame_lists_in_asps specifies the number of ref_list_struct(rlsIdx) syntax structures included in the ASPS.

atgh_ref_atlas_frame_list_sps_flag field equal to 1 specifies that the reference atlas frame list of the current atlas tile group (or tile) is derived based on one of the ref_list_struct (rlsIdx) syntax structures in the active ASPS. atgh_ref_atlas_frame_list_sps_flag field equal to 0 specifies that the reference atlas frame list of the current atlas tile list is derived based on the ref_list_struct(rlsIdx) syntax structure that is directly included in the tile group header of the current atlas tile group.

According to embodiments, the atlas tile group (or tile) header includes ref_list_struct(asps_num_ref_atlas_frame_lists_in_asps) when atgh_ref_atlas_frame_list_sps_flag field is equal to 0, and includes an atgh_ref_atlas_frame_list_sps_flag field when atgh_ref_atlas_frame_list_sps_flag is greater than 1.

atgh_ref_atlas_frame_list_idx field specifies the index of the ref_list_struct(rlsIdx) syntax structure that is used for derivation of the reference atlas frame list for the current atlas tile group (or tile). The reference atlas frame list is a list of the ref_list_struct (rlsIdx) syntax structures included in the active ASPS.

According to embodiments, the atlas_tile_group (or tile) header further includes an atgh_additional_afoc_lsb_present_flag[j] field according to the value of the NumLtrAtlasFrmEntries field, and may further include an atgh_additional_afoc_lsb_val[j] field if atgh_additional_afoc_lsb_present_flag[j] is equal to 1.

atgh_additional_afoc_lsb_val[j] specifies the value of FullAtlasFrmOrderCntLsbLt[RlsIdx][j] for the current atlas_tile_group (or tile).

According to embodiments, if the atgh_type field does not indicate SKIP_TILE_GRP, the atlas tile group (or tile) header may further include an atgh_pos_min_z_quantizer field, an atgh_pos_delta_max_z_quantizer field, an atgh_patch_size_x_info_quantizer field, an atgh_patch_size_y_info_quantizer field, an atgh_raw_3d_pos_axis_bit_count_minus1 field, and/or an atgh_num_ref_idx_active_minus1 field depending on the information included in the ASPS or the AFPS.

According to embodiments, the atgh_pos_min_z_quantizer field is included when the value of the asps_normal_axis_limits_quantization_enabled_flag field included in the ASPS is 1. The atgh_pos_delta_max_z_quantizer field is included when both the value of asps_normal_axis_limits_quantization_enabled_flag and the value of the asps_axis_max_enabled_flag field included in the ASPS are 1.

According to embodiments, the atgh_patch_size_x_info_quantizer field and the atgh_patch_size_y_info_quantizer field are included when the value of the asps_patch_size_quantizer_present_flag field included in the ASPS is 1. The atgh_raw_3d_pos_axis_bit_explicit_minus1 field is included when the value of the afps_raw_3d_pos_bit_count_explicit_mode_flag field included in the AFPS is 1.

According to embodiments, when the atgh_type field indicates P_TILE_GRP and num_ref_entries[RlsIdx] is greater than 1, the atlas tile group (or tile) header further includes an atgh_num_ref_idx_active_override_flag field. When the value of the atgh_num_ref_idx_active_override_flag field is 1, the atgh_num_ref_idx_active_minus1 field is included in the atlas tile group (or tile) header.

atgh_pos_min_z_quantizer specifies the quantizer that is to be applied to the pdu_3d_pos_min_z[p] of a patch with index p. If atgh_pos_min_z_quantizer field is not present, its value may be inferred to be equal to 0.

atgh_pos_delta_max_z_quantizer field specifies the quantizer that is to be applied to a value of the pdu_3d_pos_delta_max_z[p] field of the patch with index p. If atgh_pos_delta_max_z_quantizer field is not present, its value may be inferred to be equal to 0.

atgh_patch_size_x_info_quantizer field specifies the value of the quantizer PatchSizeXQuantizer that is to be applied to the variables pdu_2d_size_x_minus1[p], mpdu_2d_delta_size_x[p], ipdu_2d_delta_size_x[p], rpdu_2d_size_x_minus1 [p], and epdu_2d_size_x_minus1 [p] of a patch with index p. If atgh_patch_size_x_info_quantizer field is not present, its value may be inferred to be equal to asps_log_2_patch_packing_block_size field.

atgh_patch_size_y_info_quantizer field specifies the value of the quantizer PatchSizeYQuantizer that is to be applied to the variables pdu_2d_size_y_minus1[p], mpdu_2d_delta_size_y[p], ipdu_2d_delta_size_y[p], rpdu_2d_size_y_minus1 [p], and epdu_2d_size_y_minus1 [p] of a patch with index p. If atgh_patch_size_y_info_quantizer field is not present, its value may be inferred to be equal to asps_log 2_patch_packing_block_size field.

atgh_raw_3d_pos_axis_bit_count_minus1 field plus 1 specifies the number of bits in the fixed-length representation of rpdu_3d_pos_x, rpdu_3d_pos_y, and rpdu_3d_pos_z.

atgh_num_ref_idx_active_override_flag field equal to 1 specifies that the syntax element atgh_num_ref_idx_active_minus1 field is present for the current atlas tile group (or tile). atgh_num_ref_idx_active_override_flag field equal to 0 specifies that the syntax element atgh_num_ref_active_minus1 is not present. If atgh_num_ref_idx_active_override_flag field is not present, its value may be inferred to be equal to 0.

atgh_num_ref_idx_active_minus1 field plus 1 specifies the maximum reference index for reference the atlas frame list that may be used to decode the current atlas tile group. When the value of atgh_num_ref_idx_active_minus1 field is equal to 0, no reference index for the reference atlas frame list may be used to decode the current atlas tile group (or tile).

byte_alignment used to fill the remaining bits with 0 for byte alignment after adding 1, which is a stop bit, to indicate the end of data.

As described above, one or more ref_list_struct(rlsIdx) syntax structures may be included in the ASPS and/or may be included directly in the atlas tile group (or tile) header.

FIG. 49 shows an example of a syntax structure of ref_list_struct( ) according to embodiments.

In FIG. 49, the num_ref_entries[rlsIdx] field specifies the number of entries in the ref_list_struct(rlsIdx) syntax structure.

The following elements as many as the value of num_ref_entries[rlsIdx] field may be included in the reference list structure.

When the asps_long_term_ref_atlas_frames_flag_field is equal to 1, the reference atlas frame flag (st_ref_atlas_frame_flag[rlsIdx][i]) may be included in the reference list structure.

When the i-th entry is the first short term reference atlas frame entry in ref_list_struct(rlsIdx) syntax structure, the abs_delta_afoc_st[rlsIdx][i] field specifies the absolute difference between the atlas frame order count values of the current atlas tile group and the atlas frame referred to by the i-th entry. When the i-th entry is a short term reference atlas frame entry but not the first short term reference atlas frame entry in ref_list_struct(rlsIdx), the field specifies the absolute difference between the atlas frame order count values of the atlas frames referred to by the i-th entry and by the previous short term reference atlas frame entry in the ref_list_struct(rlsIdx) syntax structure.

When st_ref_atlas_frame_flag[rlsIdx][i] field is equal to 1, abs_delta_afoc_st[rlsIdx][i] field may be included in the reference list structure.

abs_delta_afoc_st[rlsIdx][i] field specifies, when the i-th entry is the first short term reference atlas frame entry in ref_list_struct(rlsIdx) syntax structure, the absolute difference between the atlas frame order count values of the current atlas tile group and the atlas frame referred to by the i-th entry, or specifies, when the i-th entry is a short term reference atlas frame entry but not the first short term reference atlas frame entry in the ref_list_struct(rlsIdx) syntax structure, the absolute difference between the atlas frame order count values of the atlas frames referred to by the i-th entry and by the previous short term reference atlas frame entry in the ref_list_struct(rlsIdx) syntax structure.

When abs_delta_afoc_st[rlsIdx][i] field has a value greater than 0, the entry sign flag (strpf_entry_sign_flag [rlsIdx][i]) field may be included in the reference list structure.

strpf_entry_sign_flag[rlsIdx][i] field equal to 1 specifies that i-th entry in the syntax structure ref_list_struct(rlsIdx) field has a value greater than or equal to 0. strpf_entry_sign_flag[rlsIdx][i] field equal to 0 specifies that the i-th entry in the syntax structure ref_list_struct(rlsIdx) has a value less than 0. When not present, the value of strpf_entry_sign_flag [rlsIdx][i] field may be inferred to be equal to 1.

When asps long term ref atlas frames flag included in ASPS is equal to 0, afoc_lsb_lt[rlsIdx][i] field may be included in the reference list structure.

afoc_lsb_lt[rlsIdx][i] field specifies the value of the atlas frame order count modulo MaxAtlasFrmOrderCntLsb of the atlas frame referred to by the i-th entry in the ref_list_struct (rlsIdx) field. The length of the afoc_lsb_lt[rlsIdx][i] field is asps_log 2_max_atlas_frame_order_cnt_lsb_minus4+4 bits.

FIG. 50 shows atlas tile group data (atlas_tile_group_data_unit) according to embodiments.

FIG. 50 shows the syntax of atlas tile group data (atlas_tile_group_data_unit ( )) included in the atlas tile group (or tile) layer of FIG. 46. The atlas tile group data may correspond to atlas tile data, and a tile group may be referred to as a tile.

In FIG. 50, as p is incremented from 0 by 1, atlas-related elements (or fields) according to the index p may be included in the atlas tile group (or tile) data.

atgdu_patch_mode[p] field indicates the patch mode for the patch with index p in the current atlas tile group. When the atgh_type field included in the atlas tile group (or tile) header indicates SKIP_TILE_GRP, it indicates that the entire tile group (or tile) information is copied directly from the tile group (or tile) with the same atgh_address as that of the current tile group (or tile) that corresponds to the first reference atlas frame.

When atgdu_patch_mode[p] field is not I_END and atgdu_patch_mode[p] is not P_END, patch_information_data and atgdu_patch_mode[p] may be included in the atlas tile group data (or atlas tile data) for each index p.

FIG. 51 shows examples of patch mode types assigned to the atgdu_patch_mode field when the atgh_type field indicates I_TILE_GRP according to embodiments.

For example, atgdu_patch_mode field equal to 0 indicates the non-predicted patch mode with the identifier of I_INTRA.

atgdu_patch_mode field equal to 1 indicates the RAW point patch mode with the identifier of I_RAW.

atgdu_patch_mode field equal to 2 indicates the EOM point patch mode with the identifier of I_EOM.

atgdu_patch_mode field equal to 14 indicates the patch termination mode with the identifier of I_END.

FIG. 52 shows examples of patch mode types assigned to the atgdu_patch_mode field when the atgh_type field indicates P_TILE_GRP according to embodiments.

For example, atgdu_patch_mode field equal to 0 indicates the patch skip mode with the identifier of P_SKIP.

atgdu_patch_mode field equal to 1 indicates the patch merge mode with the identifier of P_MERGE.

atgdu_patch_mode field equal to 2 indicates the inter predicted patch mode with the identifier of P_INTER.

atgdu_patch_mode field equal to 3 indicates the non-predicted patch mode with the identifier of P_INTRA.

atgdu_patch_mode field equal to 4 indicates the RAW point patch mode with the identifier of P_RAW.

atgdu_patch_mode field equal to 5 indicates the EOM point patch mode with the identifier of P_EOM.

atgdu_patch_mode field equal to 14 indicates the patch termination mode with the identifier of P_END.

FIG. 53 shows examples of patch mode types assigned to the atgdu_patch_mode field when the atgh_type field indicates SKIP_TILE_GRP according to embodiments.

For example, atgdu_patch_mode equal to 0 indicates the patch skip mode with the identifier of P_SKIP.

According to embodiments, the atlas tile group (or tile) data unit may further include an AtgduTotalNumberOfPatches field. The AtgduTotalNumberOfPatches field indicates the number of patches and may be set as a final value of p.

FIG. 54 shows patch information data (patch_information_data(patchIdx, patchMode)) according to embodiments.

FIG. 54 shows an example of a syntax structure of patch information data (patch_information_data(p, atgdu_patch_mode[p])) included in the atlas tile group (or tile) data unit of FIG. 50. In patch_information_data(p, atgdu_patch_mode[p]) of FIG. 50, p corresponds to patchIdx of FIG. 54, and atgdu_patch_mode[p] corresponds to patchMode of FIG. 54.

For example, when the atgh_type field indicates SKIP_TILE_GR, skip_patch data unit (patchIdx) is included as patch_information_data.

When the atgh_type field indicates P_TILE_GR, one of skip_patch_data unit(patchIdx), merge_patch_data_unit (patchIdx), patch_data_unit(patchIdx), inter_patch_data_unit(patchIdx), raw_patch_data_unit(patchIdx), and eom_patch_data_unit(patchIdx) may be included as patch information data according to patchMode.

For example, the skip_patch_data unit(patchIdx) is included when patchMode indicates the patch skip mode (P_SKIP). The merge_patch_data_unit(patchIdx) is included when patchMode indicates the patch merge mode (P_MERGE). The patch_data_unit(patchIdx) is included when patchMode indicates P_INTRA. The inter_patch_data_unit(patchIdx) is included when patchMode indicates P_INTER. The raw_patch_data_unit(patchIdx) is included when patchMode indicates the RAW point patch mode (P_RAW). The eom_patch_data_unit(patchIdx) is included when patchMode is the EOM point patch mode (P_EOM).

When the atgh_type field indicates I_TILE_GR, one of patch_data_unit(patchIdx), raw_patch_data_unit(patchIdx), and eom_patch_data_unit(patchIdx) may be included as patch information data according to patchMode.

For example, the patch_data_unit(patchIdx) is included when patchMode indicates I_INTRA. The raw_patch_data_unit(patchIdx) is included when patchMode indicates the RAW point patch mode (I_RAW). The eom_patch_data_unit(patchIdx) is included when patchMode indicates the EOM point patch mode (I_EOM).

FIG. 55 shows a syntax structure of a patch data unit (patch_data_unit(patchIdx)) according to embodiments. As described above, when the atgh_type field indicates P_TILE_GR and the patchMode indicates P_INTRA, or when the atgh_type field indicates I_TILE_GR and the patchMode indicates I_INTRA, patch_data_unit(patchIdx) may be included as patch_information_data.

In FIG. 55, the pdu_2d_pos_x[p] field indicates the x-coordinate (or left offset) of the top-left corner of the patch bounding box for a patch with index p in the current atlas tile group (or tile) (tileGroupIdx). The atlas tile group (or tile) may have a tile group (or tile) index (tileGroupIdx). The tileGroupIdx may be expressed as a multiple of PatchPackingBlockSize.

The pdu_2d_pos_y[p] field indicates the y-coordinate (or top offset) of the top-left corner of the patch bounding box for a patch having the index p in the current atlas tile group (or tile) (tileGroupIdx). The tileGroupIdx may be expressed as a multiple of PatchPackingBlockSize.

pdu_2d_size_x_minus1 [p] field plus 1 specifies the quantized width value of the patch with index p in the current atlas tile group (or tile), tileGroupIdx.

pdu_2d_size_y_minus1 [p] field plus 1 specifies the quantized height value of the patch with index p in the current atlas tile group (or tile), tileGroupIdx.

pdu_3d_pos_x[p] field specifies the shift to be applied to the reconstructed patch points in patch with index p of the current atlas tile group (or tile) along the tangent axis.

pdu_3d_pos_y[p] field specifies the shift to be applied to the reconstructed patch points in patch with index p of the current atlas tile group (or tile) along the bitangent axis.

pdu_3d_pos_min_z[p] field specifies the shift to be applied to the reconstructed patch points in patch with index p of the current atlas tile group (or tile) along the normal axis.

When a value of asps_normal_axis_max_delta_value_enabled_flag field included in ASPS is equal to 1, pdu_3d_pos_delta_max_z[patchIdx] field may be included in the patch data unit.

If present, pdu_3d_pos_delta_max_z[p] field specifies the nominal maximum value of the shift expected to be present in the reconstructed bitdepth patch geometry samples, after conversion to their nominal representation, in patch with index p of the current atlas tile group (or tile) along the normal axis.

pdu_projection_id[p] field specifies the values of the projection mode and of the index of the normal to the projection plane for the patch with index p of the current atlas tile group (or tile).

pdu_orientation_index[p] field indicates the patch orientation index for the patch with index p of the current atlas tile group (or tile). pdu_orientation_index[p] field will be described with reference to FIG. 56.

When a value of afps_lod_mode_enabled_flag field included in AFPS is equal to 1, pdu_lod_enabled_flag [patchIndex] may be included in the patch_data_unit.

When pdu_lod_enabled_flag[patchIndex] field is greater than 0, pdu_lod_scale_x_minus1[patchIndex] field and pdu_lod_scale_y[patchIndex] field may be included in the patch data unit.

When pdu_lod_enabled_flag[patchIndex] field is equal to 1 and patchIndex is p, it specifies that the LOD parameters are present for the current patch with index p. If pdu_lod_enabled_flag[p] field is equal to 0, no LOD parameters are present for the current patch.

pdu_lod_scale_x_minus1 [p] field plus 1 specifies the LOD scaling factor to be applied to the local x coordinate of a point in a patch with index p of the current atlas tile group (or tile), prior to its addition to the patch coordinate Patch3dPosX[p].

pdu_lod_scale_y[p] field specifies the LOD scaling factor to be applied to the local y coordinate of a point in a patch with index p of the current atlas tile group (or tile), prior to its addition to the patch coordinate Patch3dPosY[p].

When a value of asp_spoint_local_reconstruction_enabled_flag field included in ASPS is equal to 1, point_local_reconstruction_data(patchIdx) may be included in the patch data unit.

According to embodiments, point_local_reconstruction_data(patchIdx) may contain information allowing the decoder to restore points that are missing due to compression loss or the like.

FIG. 56 shows rotations and offsets with respect to patch orientations according to embodiments.

FIG. 56 shows a rotation matrix and offsets assigned to the patch orientation index (pdu_orientation_index[p] field) of FIG. 55.

The method/device according to the embodiments may perform an orientation operation on point cloud data. The operation may be performed using an identifier, a rotation, and an offset as shown in FIG. 56.

According to embodiments, the NAL unit may include SEI information. For example, non-essential supplemental enhancement information or essential supplemental enhancement information may be included in the NAL unit according to nal_unit_type.

FIG. 57 exemplarily shows a syntax structure of SEI information including sei_message( ) according to embodiments.

SEI messages assist in processes related to decoding, reconstruction, display, or other purposes. According to embodiments, there may be two types of SEI messages: essential and non-essential.

Non-essential SEI messages may not be required for the decoding process. Conforming decoders may not be required to process this information for output order conformance.

Essential SEI messages may be an integral part of the V-PCC bitstream and should not be removed from the bitstream. The essential SEI messages may be categorized into two types as follows:

Type-A essential SEI messages contain information required to check bitstream conformance and for output timing decoder conformance. Every V-PCC decoder conforming to point A may not discard any Type-A essential SEI messages and consider them for bitstream conformance and for output timing decoder conformance.

Type-B essential SEI messages: V-PCC decoders that conform to a particular reconstruction profile may not discard any Type-B essential SEI messages and consider them for 3D point cloud reconstruction and conformance purposes.

According to embodiments, an SEI message consists of an SEI message header and an SEI message payload. The SEI message header includes an sm_payload_type_byte field and an sm_payload_size_byte field.

The sm_payload_type_byte field indicates the payload type of an SEI message. For example, whether the SEI message is a prefix SEI message or a suffix SEI message may be identified based on the value of the sm_payload_type_byte field.

The sm_payload_size_byte field indicates the payload size of an SEI message.

According to embodiments, the sm_payload_type_byte field is set to the value of PayloadType in the SEI message payload, and the sm_payload_size_byte field is set to the value of PayloadSize in the SEI message payload.

FIG. 58 shows an example of a syntax structure of an SEI message payload (sei_payload(payloadType, payloadSize)) according to embodiments.

In an embodiment, when nal_unit_type is NAL_PREFIX_NSEI or NAL_PREFIX_ESEI, the SEI message payload may include sei(payloadSize) according to PayloadType.

In another embodiment, when nal_unit_type is NAL_SUFFIX_NSEI or NAL_SUFFIX_ESEI, the SEI message payload may include sei(payloadSize) according to PayloadType.

The V-PCC bitstream having the structure as shown in FIG. 24 may be transmitted to the receiving side as it is, or may be encapsulated in the ISOBMFF file format by the file/segment encapsulator of FIG. 1, 18, 20, or 21 and transmitted to the receiving side.

In the latter case, the V-PCC bitstream may be transmitted through multiple tracks in a file, or may be transmitted through a single track. In this case, the file may be decapsulated into the V-PCC bitstream by the file/segment decapsulator of the reception device of FIG. 20 or 22.

For example, a V-PCC bitstream carrying a V-PCC parameter set, a geometry bitstream, an occupancy map bitstream, an attribute bitstream, and/or an atlas data bitstream may be encapsulated in a ISOBMFF (ISO Base Media File Format)-based file format by the file/segment encapsulator in FIG. 20 or 21. In this case, according to an embodiment, the V-PCC bitstream may be stored in a single track or multiple tracks in an ISOBMFF-based file.

According to embodiments, an ISOBMFF-based file may be referred to as a container, a container file, a media file, a V-PCC file, or the like. Specifically, the file may be composed of a box and/or information, which may be referred to as ftyp, meta, moov, or mdat.

The ftyp box (file type box) may provide information related to a file type or file compatibility for the file. The receiving side may identify the file with reference to the ftyp box.

The meta box may include a vpcg{0,1,2,3} box (V-PCC group box).

The mdat box, which is also referred to as a media data box, contains actual media data. According to embodiments, a video coded geometry bitstream, a video coded attribute bitstream, a video coded occupancy map bitstream, and/or an atlas data bitstream is contained in a sample of the mdat box in a file. According to embodiments, the sample may be referred to as a V-PCC sample.

The moov box, which is also referred to as a movie box, may contain metadata about the media data (e.g., a geometry bitstream, an attribute bitstream, an occupancy map bitstream, etc.) of the file. For example, it may contain information necessary for decoding and playback of the media data, and information about samples of the file. The moov box may serve as a container for all metadata. The moov box may be a box of the highest layer among the metadata related boxes. According to an embodiment, only one moov box may be present in a file.

A box according to embodiments may include a track (trak) box providing information related to a track of the file. The trak box may include a media (mdia) box providing media information about the track and a track reference container (tref) box for referencing the track and a sample of the file corresponding to the track.

The mdia box may include a media information container (minf) box providing information on the corresponding media data and a handler (hdlr) box (HandlerBox) indicating the type of a stream.

The minf box may include a sample table (stbl) box that provides metadata related to a sample of the mdat box.

The stbl box may include a sample description (stsd) box that provides information on an employed coding type and initialization information necessary for the coding type.

According to embodiments, the stsd box may include a sample entry for a track storing a V-PCC bitstream.

In the present disclosure, a track carrying part or all of the V-PCC bitstream in a file may be referred to as a V-PCC track or volumetric visual track (or volumetric track).

In order to store the V-PCC bitstream according to the embodiments in a single track or multiple tracks in a file, the present disclosure may define a volumetric visual track, a volumetric visual media header, a volumetric sample entry, volumetric samples, and a sample and simple entry of a V-PCC track.

The term V-PCC used herein may be the same as visual volumetric video-based coding (V3C). The two terms may be used to complement each other.

According to embodiments, video-based point cloud compression (V-PCC) represents volumetric encoding of point cloud visual information.

That is, the minf box in the trak box of the moov box may further include a volumetric visual media header box. The volumetric visual media header box contains information on a volumetric visual track containing a volumetric visual scene.

Each volumetric visual scene may be represented by a unique volumetric visual track. An ISOBMFF file may contain multiple scenes and therefore multiple volumetric visual tracks may be present in the ISOBMFF file.

According to embodiments, the volumetric visual track may be identified by a volumetric visual media handler type 'vole' in the HandlerBox of the MediaBox and/or a volumetric visual media header (vvhd) in the minf box of the mdia box (MediaBox). The minf box is referred to as a media information container or a media information box. The minf box is included in the mdia box. The mdia box is included in a trak box. The trak box is included in the moov box of the file. A single volumetric visual track or multiple volumetric visual tracks may be present in the file.

According to embodiments, volumetric visual tracks may use the VolumetricVisualMediaHeaderBox in the MediaInformationBox. The MediaInformationBox is referred to as a minf box, and the VolumetricVisualMediaHeaderBox is referred to as a vvhd box.

According to embodiments, the volumetric visual media header (vvhd) box may be defined as follows.
Box Type: 'vvhd'
Container: MediaInformationBox
Mandatory: Yes
Quantity: Exactly one The syntax of the volumetric visual media header box (that is, the vvhd type box) according to embodiments is shown below.

```
aligned(8) class VolumetricVisualMediaHeaderBox
    extends FullBox('vvhd', version = 0, 1) {
}
```

The "version" may be an integer indicating the version of the box.

According to embodiments, volumetric visual tracks may use VolumetricVisualSampleEntry to transmit signaling information, and may use VolumetricVisualSample to transmit actual data.

According to embodiments, a volumetric visual sample entry may be referred to as a sample entry or a V-PCC sample entry, and a volumetric visual sample may be referred to as a sample or a V-PCC sample.

According to embodiments, a single volumetric visual track or multiple volumetric visual tracks may be present in the file. According to embodiments, the single volumetric visual track may be referred to as a single track or a V-PCC single track, and the multiple volumetric visual tracks may be referred to as multiple tracks or multiple V-PCC tracks.

An example of the syntax structure of VolumetricVisualSampleEntry is shown below.

```
class VolumetricVisualSampleEntry(codingname) extends
    SampleEntry (codingname){
        unsigned int(8)[32] compressor_name;
}
```

The compressor_name field is a name of a compressor for informative purposes. It is formatted in a fixed 32-byte field, with the first byte set to the number of bytes to be displayed, followed by that number of bytes of displayable data encoded using UTF-8, and then padding to complete 32 bytes total (including the size byte). This field may be set to 0.

According to embodiments, the format of a volumetric visual sample may be defined by a coding system.

According to embodiments, a V-PCC unit header box may be present in both the V-PCC track included in the sample entry and all video coded V-PCC component tracks included in the scheme information. The V-PCC unit header box may contain a V-PCC unit header for data carried by the respective tracks as follows.

```
aligned(8) class VPCCUnitHeaderBox extends FullBox('vunt',
    version = 0, 0) {
        vpcc_unit_header( ) unit_header;
}
```

That is, the VPCCUnitHeaderBox may include vpcc_unit_header( ) FIG. 30 shows examples of a syntax structure of vpcc_unit_header( ).

According to embodiments, the sample entry (i.e., the upper class of the VolumetricVisualSampleEntry) from which the VolumetricVisualSampleEntry is inherited includes a VPCC decoder configuration box (VPCCConfigurationBox).

According to embodiments, the VPCCConfigurationBox may include VPCCDecoderConfigurationRecord as shown below.

```
class VPCCConfigurationBox extends Box('VpcC') {
    VPCCDecoderConfigurationRecord( ) VPCCConfig;
}
```

According to embodiments, the syntax of the VPCCDecoderConfigurationRecord( ) may be defined as follows.

```
aligned(8) class VPCCDecoderConfigurationRecord {
    unsigned int(8) configurationVersion = 1;
    unsigned int(2) lengthSizeMinusOne;
    bit(1) reserved = 1;
    unsigned int(5) numOfVPCCParameterSets;
    for (i=0; i < numOfVPCCParameterSets; i++) {
        unsigned int(16) VPCCParameterSetLength;
        vpcc_unit(VPCCParameterSetLength) vpccParameterSet;
    }
    unsigned int(8) numOfSetupUnitArrays;
    for (j=0; j < numOfSetupUnitArrays; j++) {
        bit(1) array_completeness;
        bit(1) reserved = 0;
        unsigned int(6) NAL_unit_type;
        unsigned int(8) numNALUnits;
        for (i=0; i < numNALUnits; i++) {
            unsigned int(16) SetupUnitLength;
            nal_unit(SetupUnitLength) setupUnit;
        }
    }
}
```

The configurationVersion is a version field. Incompatible changes to the record are indicated by a change of the version number.

When the value of the lengthSizeMinusOne field plus 1 may indicate that the length in bytes of the NALUnitLenght field included in the VPCCDecoderConfigurationRecord or the V-PCC sample of a stream to which the VPCCDecoderConfigurationRecord is applied. For example, the size of 1 byte is indicated by '0'. The value of this field is the same as the value of the ssnh_unit_size_precision_bytes_minus1 field in sample_stream_nal_header( ) for the atlas sub-stream. FIG. 35 shows an example of a syntax structure of sample_stream_nal_header( ) including the ssnh_unit_size_precision_bytes_minus1 field. The value of the ssnh_unit_size_precision_bytes_minus1 field plus 1 may indicate the accuracy of the ssnu_vpcc_unit_size element in all sample stream NAL units in units of bytes.

The numOfVPCCParameterSets specifies the number of V-PCC parameter sets (VPSs) signaled in the VPCCDecoderConfigurationRecord.

The VPCCParameterSet is a sample_stream_vpcc_unit( ) instance for a V-PCC unit of type VPCC_VPS. The V-PCC unit may include vpcc_parameter_set( ). That is, the VPCCParameterSet array may include vpcc_parameter_set( ). FIG. 27 shows an example of a syntax structure of sample_stream_vpcc_unit( ).

The numOfSetupUnitArrays indicates the number of arrays of atlas NAL units of the indicated type(s).

An iteration statement repeated as many times as the value of the numOfSetupUnitArrays may contain array_completeness.

array_completeness equal to 1 indicates that all atlas NAL units of the given type are in the following array and none are in the stream. array_completeness equal to 0 indicates that additional atlas NAL units of the indicated type may be in the stream. The default and permitted values are constrained by the sample entry name.

NAL_unit_type indicates the type of the atlas NAL units in the following array. NAL_unit_type is restricted to take one of the values indicating a NAL_ASPS, NAL_AFPS, NAL_AAPS, NAL_PREFIX_ESEI, NAL_SUFFIX_ESEI, NAL_PREFIX_NSEI, or NAL_SUFFIX_NSEI atlas NAL unit.

The numNALUnits field indicates the number of atlas NAL units of the indicated type included in the VPCCDecoderConfigurationRecord for the stream to which the VPCCDecoderConfigurationRecord applies. The SEI array shall only contain SEI messages.

The SetupUnitLength field indicates the size of the setupUnit field in bytes. This field includes the size of both the NAL unit header and the NAL unit payload but does not include the length field itself.

The setupUnit is a sample_stream_nal_unit( ) instance containing a NAL unit of type NAL_ASPS, NAL_AFPS, NAL_AAPS, NAL_PREFIX_ESEI, NAL_PREFIX_NSEI, NAL_SUFFIX_ESEI, or NAL_SUFFIX_NSEI.

According to embodiments, the SetupUnit arrays may include atlas parameter sets that are constant for the stream referred to by the sample entry in which the VPCCDecoderConfigurationRecord is present as well as atlas sub-stream essential or non-essential SEI messages. According to embodiments, the atlas setup unit may be referred to simply as a setup unit.

According to embodiments, the file/segment encapsulator may add, to the sample entry, signaling information related to grouping of samples, grouping of tracks, encapsulation in a single track of the V-PCC bitstream, encapsulation in multiple tracks of the V-PCC bitstream, or viewport, or signaling information for supporting spatial access in the form of a box or FullBox, or may add the same to a separate metadata track. The respective boxes will be described in detail below.

Hereinafter, viewport related information and/or 3D region related information, which are included in the signaling information signaled in a sample, a sample entry, a sample group, or a track group in at least one track of a file or signaled in a separate metadata track, will be described.

3D Point Information Structure

According to embodiments, 3D point information may include position information about each point as follows.

```
aligned(8) class 3DPoint( ) {
    unsigned int(16) point_x;
    unsigned int(16) point_y;
    unsigned int(16) point_z;
}
```

3DPoint( ) may contain a pos_x field, a pos_y field, and a pos_z field.

The pos_x field, pos_y field, and pos_z field may indicate x, y, and z coordinate values in Cartesian coordinates.

Cuboid Region Information Structure

According to embodiments, cuboid region information may include cuboid region information related to an anchor point signaled in the Cartesian coordinate system as follows.

```
aligned(8) class CuboidRegionStruct( ) {
    unsigned int(16) cuboid_dx;
    unsigned int(16) cuboid_dy;
    unsigned int(16) cuboid_dz;
}
```

CuboidRegionStruct( ) may include a cuboid_region_dx field, a cuboid_region_dy field, and a cuboid_region_dz field.

The cuboid_dx, cuboid_dy, and cuboid_dz may indicate the dimensions of the cuboid sub-region in the Cartesian coordinates along the x, y, and z axes, respectively, relative to a certain point (or an anchor point).

3D Spatial Region Information Structure

According to embodiments, 3D spatial region information may include 3D point information and cuboid region information as follows.

```
aligned(8) class 3DSpatialRegionStruct(dimensions_included_flag) {
    unsigned int(16)        3d_region_id;
    3DPoint                 3d_region_anchor;
    if (dimensions_included_flag) {
        CuboidRegionStruct( );
    }
}
```

In the 3D SpatialRegionStruct(dimensions_included_flag), dimensions_included_flag is a flag indicating whether dimensions of the 3D spatial region are signaled. That is, the 3D spatial region information includes CuboidRegionStruct( ) when the value of the dimensions_included_flag field is 'true'.

The 3d_region_id is an identifier for identifying a 3D spatial region.

The 3d_region_anchor indicates a 3D point in the Cartesian coordinate system used as an anchor for the 3D spatial region. For example, when the 3D region is of the cuboid type, the anchor point may be the origin of the cuboid, and the cuboid_region_dx, cuboid_region_dy, and cuboid_region_dz may indicate the values of the x-, y-, and z-coordinates.

Viewport Camera Information Structure

```
aligned(8) class ViewportCameraParameterStruct( ) {
    unsigned int(10) camera_id;
    unsigned int(8) camera_type;
    if (camera_type==0){
        signed int(32) erp_horizontal_fov;
        signed int(32) erp_vertical_fov;
    }
    if (camera_type==1){
        signed int(32) perspective_horizontal_fov;
        signed int(32) perspective_vertical_fov;
    }
    if (camera_type==2){
        signed int(32) ortho_aspect_ratio;
        signed int(32) ortho_horizontal_size;
    }
    unsigned int(32) clipping_near_plane;
    unsigned int(32) clipping_far_plane;
}
```

According to embodiments, the viewport camera information structure (ViewportCameraParameterStruct( )) may be referred to as intrinsic camera information (IntCameraInfoStruct).

According to embodiments, the viewport camera information structure (ViewportCameraParameterStruct( )) may include a camera_id field and a camera_type field.

The camera_id contains an identifying number that may be used to identify viewport camera parameters.

The camera_type field indicates the projection method of the viewport camera. camera_type equal to 0 may specify equirectangular projection. camera_type equal to 1 may specify perspective projection. camera_type equal to 2 may specify orthographic projection.

According to embodiments, when camera_type is equal to 0, the viewport camera information structure (ViewportCameraParameterStruct( )) may further include an erp_horizontal_fov field and an erp_vertical_fov field. When camera_type is equal to 1, ViewportCameraParameterStruct( ) may further include a perspective_horizontal_fov field and a perspective_vertical_fov field. When camera_type is equal to 2, ViewportCameraParameterStruct( ) may further include an ortho_aspect_ratio field and an ortho_horizontal_size field.

erp_horizontal_fov indicates the horizontal size of the viewport region, and erp_vertical_fov indicates the vertical size of the viewport region.

perspective_horizontal_fov indicates the horizontal field of view for perspective projection.

perspective_vertical_fov indicates the relative aspect ratio of the viewport for perspective projection.

ortho_aspect_ratio indicates the relative aspect ratio of the viewport for orthogonal projection (horizontal/vertical).

ortho_horizontal_size indicates the horizontal size of the orthogonal viewport.

The viewport camera information structure (ViewportCameraParameterStruct( )) may further include a clipping_near_plane field and a clipping_far_plane field.

clipping_near_plane indicates the distance of a near clipping plane for a given viewport.

clipping_far_plane indicates the distance of a far clipping plane for a given viewport.

Viewport Information Structure

According to embodiments, the viewport information structure (ViewportInfoStruct( ) may include information related to a viewport position, a viewport camera parameter, and a viewport orientation as shown below. According to embodiments, the viewport information structure (ViewportInfoStruct( )) may be referred to as extrinsic camera information (ExtCameraInfoStruct).

```
aligned(8) class ViewportInfoStruct(vp_pos_present) {
    unsigned int(15) viewport_id;
    unsigned_int(1) camera_param_present;
    unsigned_int(1) vp_center_view_flag;
    if (camera_param_present){
        unsigned int(32) camera_id;
        ViewportCameraParameterStruct( );
        if (vp_pos_present){
            signed int(32) vp_pos_x;
            signed int(32) vp_pos_y;
            signed int(32) vp_pos_z;
        }
        signed int(32) vp_quat_x;
        signed int(32) vp_quat_y;
        signed int(32) vp_quat_z;
        if (!vp_center_view_flag){
            unsigned int(1) vp_left_view_flag;
        }
    }
}
```

According to embodiments, vp_pos_present in ViewportInfoStruct (vp_pos_present) may indicate whether viewport position information is included in the viewport information structure (ViewportInfoStruct).

According to embodiments, ViewportInfoStruct( ) may include a viewport id field, a camera_param_present field, and a vp_center_view_flag field.

The viewport id field includes an identifying number that may be used to identify a viewport.

The camera_parameter_present field may indicate whether camera_id is present. For example, camera_parameter_present equal to 1 indicates that camera_id is present. camera_parameters_present flag equal to 0 indicates that camera_id is not present.

vp_center_view_flag may indicate whether signaled viewport information corresponds to the center of the viewport or one of two stereo positions of the viewport. For example, vp_center_view_flag equal to 1 may indicate that the signaled viewport information corresponds to the center of the viewport. vp_center_view_flag equal to 0 may indicate that the signaled viewport information corresponds to one of the two stereo positions of the viewport.

According to embodiments, when camera_param_present is equal to 1, ViewportInfoStruct( ) may further include a camera_id field and ViewportCameraParameterStruct( ).

camera_id is an identifier for identifying viewport camera parameters.

ViewportCameraParameterStruct( ) may include viewport camera information and parameters related to the viewport.

According to embodiments, when the value of the vp_pos_present field is 'true', ViewportInfoStruct( ) may further include a vp_pos_x field, a vp_pos_y field, and a vp_pos_z field.

vp_pos_x, vp_pos_y, and vp_pos_z indicate a position of a viewport along the x, y, and z axes.

According to embodiments, ViewportInfoStruct( ) may further include a vp_quat_x field, a vp_quat_y field, and a vp_quat_z field.

vp_quat_x, vp_quat_y, and vp_quat_z indicate the x, y, and z components, respectively, of the rotation of the viewport region using the quaternion representation.

According to embodiments, when the value of the vp_center_view_flag field is 'false' (i.e., 0), ViewportInfoStruct( ) may further include a vp_left_view_flag field.

The vp_left_view_flag field may indicate whether signaled viewport information corresponds to a left stereo position of the viewport. For example, vp_left_view_flag equal to 1 may indicate that the signaled viewport information corresponds to the left stereo position of the viewport. vp_left_view_flag equal to 0 may indicate that the signaled viewport information corresponds to the right stereo position of the viewport.

Viewing Information Structure

According to an embodiment, Viewinginformation-Struct( ) may include ViewportInfoStruct( ) as follows.

```
aligned(8) class ViewingInformationStruct( ) {
    unsigned int(1)  vi_pos_flag;
    ViewportInfoStruct(vi_pos_flag);
}
```

According to embodiments, ViewinginformationStruct( ) may include a vi_pos_flag field, and may include ViewportInfoStruct(vi_pos_flag) when vi_pos_flag is equal to 1.

That is, the vi_pos_flag field may indicate whether the viewport information structure is included in the viewing information structure. When vi_pos_flag field is equal to 1, the viewing information structure may include the viewport information structure.

ViewportInfoStruct( ) has been described in detail above, and thus description thereof will be skipped to avoid redundant description.

In the present disclosure, for simplicity, the viewport information structure will be referred to as viewport information or viewport-related information, and the viewing information structure will be referred to as viewing information or viewing-related information.

According to another embodiment, the viewing information structure (ViewinginformationStruct( )) may include information related to a viewing position, a viewing orientation, and viewing direction as follows.

```
aligned(8) class ViewingInformationStruct ( ) {
    unsigned int(2)      reserved=0;
    unsigned int(1)      pos_present;
    unsigned int(1)      dir_present;
    unsigned int(1)      orientation_present;
    unsigned int(1)      coord_present;
    if(pos_present){
        unsigned int(1)  refreseh_pos_flag;
        unsigned int(16) pos_x;
        unsigned int(16) pos_y;
        unsigned int(16) pos_z;
    }
    if(coord_present){
        unsigned int(4)  coord_type;
        unsigned int(16) up_x;
        unsigned int(16) up_y;
        unsigned int(16) up_z;
        unsigned int(16) front_x;
        unsigned int(16) front_y;
        unsigned int(16) front_z;
    }
    if(dir_present){
        unsigned int(1)  refreseh_dir_flag;
        unsigned int(8)  dir_coord;
        unsigned int(16) dir_x;
        unsigned int(16) dir_y;
        unsigned int(16) dir_z;
    }
    if(orientation_present){
        unsigned int(1)  refreseh_rot_flag;
        unsigned int(8)  rot_coord;
        unsigned int(16) rot_x;
        unsigned int(16) rot_y;
        unsigned int(16) rot_z;
    }
}
```

According to embodiments, ViewinginformationStruct( ) may include a pos_present field, a dir_present field, an orientation_present field, and a coord_present field.

pos_present is a flag indicating whether viewing position information is signaled in ViewinginformationStruct( ).

dir_present is a flag indicating whether information on the direction in which the user views is signaled in ViewinginformationStruct( ).

orientation_present is a flag indicating whether viewing orientation information about a user is signaled to ViewinginformationStruct( ).

coord_present is a flag indicating whether coordinate system-related information for determining the user viewport, the users viewing orientation, and the user viewing direction is signaled in the ViewinginformationStruct( ).

When the value of the pos_present field is 'true', ViewinginformationStruct( ) may further include a refreseh_pos_flag field, a pos_x field, a pos_y field, and a pos_z field.

refreseh_pos_flag is a flag indicating whether the signaled viewing information is used for rendering.

pos_x, pos_y, and pos_z may indicate offsets of the viewing position along the x, y, and z axes in the 3D space.

When the value of the coord_present field is 'true', ViewinginformationStruct( ) may further include a coord_type field, an up_x field, an up_y field, an up_z field, a front_x field, a front_y field, and a front_z field.

coord_type may indicate the type of the coordinate system. For example, it may be a right-handed coordinate system or a left-handed coordinate system.

up_x, up_y, and up_z may indicate an up vector, that is, an upward direction in a 3D coordinate system. They may indicate an up vector by connecting the viewing position signaled by pos_x, pos_y, and pos_z to a point in the 3D space signaled by up_x, up_y, and up_z.

front_x, front_y, and front_z may indicate a front vector, that is, a forward direction in a 3D coordinate system. They may indicate the front vector by connecting the viewing position signaled by pos_x, pos_y, and pos_z to a point in the 3D space signaled by front_x, front_y, and front_z.

When the value of the dir_present field is 'true', ViewinginformationStruct( ) may further include a refreseh_dir_flag field, a dir_coord field, a dir_x field, a dir_y field, and a dir_z field.

refreseh_dir_flag is a flag indicating whether the signaled direction information is used for rendering.

dir_coord may indicate coordinates for indicating a viewing direction of a user in a 3D space. For example, it may indicate world coordinates, camera coordinates, or coordinates signaled when coord_present is equal to 1, or the like.

dir_x, dir_y, and dir_z may indicate information on a viewing direction of a user in a 3D space. The coordinates for this may conform to the coordinates indicated by dir_coord.

When the value of the orientation_present field is 'true', ViewinginformationStruct( ) may further include a refreseh_rot_flag field, a rot_coord field, a rot_x field, a rot_y field, and a rot_z field.

refreseh_rot_flag is a flag indicating whether the signaled viewing orientation is used for rendering.

In an embodiment, the left vector or right vector may be inferred based on coord_type, up_x, up_y, up_z, front_x, front_y, and front_z.

rot_coord may indicate coordinates for indicating a viewing orientation of a user in a 3D space. For example, it may indicate world coordinates, camera coordinates, coordinates signaled when coord_present is equal to 1, or the like.

rot_x, rot_y, and rot z may indicate information on a viewing orientation of the user in a 3D space. The coordinates for this may conform to the coordinates indicated by rot_coord. They may be expressed as values of rotation on the x, y, and z axes.

According to embodiments, the viewport information structure, the viewing information structure, and the 3D region information structure may be included in a sample entry of a single track, sample entries of multiple tracks, information for sample grouping, information for track grouping, information for item grouping, or the like.

According to embodiments, static viewport related information may be signaled in V3CViewportInforBox that is present in a V-PCC track sample entry or a V-PCC bitstream track sample entry.

V3CViewportInforBox according to the embodiments may be defined as follows.

Box Types: 'v3vp'
Container: V3CSampleEntry or V3 CBitstreamSampleEntry
Mandatory: No
Quantity: Zero or one
According to embodiments, the syntax of V3CViewportInforBox may be defined as follows.

```
aligned(8) class V3CViewportInfoBox extends
FullBox ('v3vp', 0, 0) {
    V3CViewportConfigBox( );
    for (i = 0; i < num_viewports; i++){
        ViewportInfoStruct( );
    }
}
```

-continued

```
aligned(8) class V3CViewportConfigBox extends
FullBox('v3vc', 0, 0) {
    ViewportCameraParamsStruct vp_camera_params;
    unsigned int(8) num_viewports;
}
``` vp_camera_params indicates a viewport camera parameter and may be applied to viewports signaled in the sample entry.

num_viewports indicates the number of viewports signaled in the sample entry.

Since ViewportInfoStruct( ) has been described in detail above, description thereof will be skipped to avoid redundant description.

Sample Group

According to embodiments, the file/segment encapsulator of FIG. 20 or 21 may generate a sample group by grouping one or more samples. According to embodiments, the file/segment encapsulator or the metadata processor of FIG. 20 or 21 may signal signaling information related to the sample group in a sample, a sample group, or a sample entry. That is, the sample group information related to the sample group may be added to a sample, a sample group, or a sample entry. The sample group information will be described in detail together with the corresponding sample group below. According to embodiments, the sample group information may include viewport camera parameter sample group information, viewport sample group information, and viewing information sample group information.

Viewport Camera Parameter Sample Group

One or more samples to which the same viewport camera parameter information is applicable may be grouped. The sample group configured in this way may be referred to as a viewport camera parameter sample group.

According to embodiments, the syntax of viewport camera parameter sample group information (ViewportCameraParamSampleGroupDescriptionEntry) realted to the viewport camera parameter sample group may be defined as follows.

```
aligned(8) class ViewportCameraParamSampleGroupDescriptionEntry( )
extends
SampleGroupDescriptionEntry('vcsg') {
    ViewportCameraParameterStruct ( );
}
```

According to embodiments, the 'vcsg' grouping_type for sample grouping represents the assignment of samples in tracks to the viewport camera information carried in the viewport camera parameter sample group.

According to embodiments, when SampleToGroupBox with grouping_type equal to 'vcsg' is present, an accompanying SampleGroupDescriptionBox with the same grouping type is present, and contains the ID of the group to which the samples belong.

The viewport camera parameter sample group information (ViewportCameraParamSampleGroupDescriptionEntry) with grouping_type equal to 'vcsg' may include ViewportCameraParameterStruct( ).

The ViewportCameraParameterStruct( ) includes viewport camera parameters applied to the samples of the sample group, such as, for example, camera type, field of views, and clipping plane distance.

The viewport camera parameters, i.e., fields, included in the ViewportCameraParameterStruct( ) have been described in detail above regarding the 'Viewport Camera Information Structure', and thus description thereof will be skipped to avoid redundant description.

Recommended Viewport Sample Group

One or more samples to which the same viewport information is applicable may be grouped. The sample group configured in this way may be referred to as a recommended viewport sample group.

According to embodiments, the syntax of viewport sample group information (ViewportSampleGroupDescriptionEntry) related to the recommended viewport sample group may be defined as follows.

```
aligned(8) class ViewportSampleGroupDescriptionEntry( ) extends
SampleGroupDescriptionEntry('rvsg') {
    ViewportInfoStruct (1);
}
```

According to embodiments, the 'rvsg' grouping_type for sample grouping represents the assignment of samples in tracks to the viewport information carried in the recommended viewport sample group.

According to embodiments, when SampleToGroupBox with grouping_type equal to 'rvsg' is present, an accompanying SampleGroupDescriptionBox with the same grouping type is present, and contains the ID of the sample group to which the samples belong to.

ViewportSampleGroupDescriptionEntry with grouping_type equal to 'rvsg' may include ViewportInfoStruct(1).

ViewportInfoStruct(1) includes viewport information applicable to the samples of this sample group, such as, for example, viewing position information, viewing orientation information, viewing direction information, and/or viewport camera information.

The viewport information, i.e., fields, included in ViewportInfoStruct(1) have been described in detail above regarding the 'Viewport Information Structure', and thus description thereof will be skipped to avoid redundant description.

Viewing Information Sample Group

One or more samples to which the same viewing information is applicable may be grouped, and the sample group configured in this way may be referred to as a viewing information sample group.

According to embodiments, the syntax of the viewing information sample group information (ViewingInformationSampleGroupDescriptionEntry) related to the viewing information sample group may be defined as follows.

```
aligned(8) class
ViewingInformationSampleGroupDescriptionEntry( ) extends
SampleGroupDescriptionEntry('visg') {
    ViewingInformationStruct ( );
}
```

According to embodiments, the 'visg' grouping_type for sample grouping represents the assignment of samples in tracks carrying atlas sub-bitstream or V-PCC component bitstream to viewing information (including a viewing position, a viewing orientation, and/or a viewing direction) carried in the viewing information sample group. The tracks carrying atlas sub-bitstream may include a V-PCC track or a V-PCC bitstream track.

According to embodiments, when SampleToGroupBox with grouping_type equal to 'visg' is present, an accompanying SampleGroupDescriptionBox with the same grouping type is present, and contains the ID of the group to which the samples belong to.

The viewing information sample group information (ViewingInformationsampleGroupDescriptionEntry) with grouping_type equal to 'visg' may include ViewingInformationStruct( ).

ViewingInformationStruct( ) may include viewing information applied to the samples of the sample group, such as, for example, a viewing position, a viewing orientation, and/or a viewing direction.

The viewing information, that is, the fields included in the ViewingInformationStruct( ) has been described in detail above regarding the 'Viewing Information Structure', and thus description thereof will be skipped to avoid redundant description.

Track Group

According to embodiments, the file/segment encapsulator of FIG. 20 or 21 may generate a track group by grouping one or more tracks. According to embodiments, the file/segment encapsulator or the metadata processor of FIG. 20 or 21 may signal signaling information related to the track group in a sample, a track group, or a sample entry. That is, track group information related to the track group may be added to a sample, a track group, or a sample entry. The track group information will be described in detail together with the track group below. According to embodiments, the track group information may include viewport camera parameter track group information, viewport track group information, and viewing information track group information.

Viewport Camera Parameter Track Group

According to embodiments, one or more tracks to which the same viewport camera parameter information is applicable may be grouped. The track group configured in this way may be referred to as a viewport camera parameter track group.

According to embodiments, the syntax of box-type viewport camera parameter track group information (ViewportCameraParamGroupBox) related to the viewport camera parameter track group may be defined as follows.

```
aligned(8) class ViewportCameraParamGroupBox extends
TrackGroupTypeBox('vctg') {
    ViewportCameraParameterStruct ( );
}
```

According to embodiments, TrackGroupTypeBox with track_group_type equal to 'vctg' indicates that this track belongs to a group of tracks carrying V-PCC component bitstream or atlas sub-bitstream that is associated with the viewport camera parameter information.

According to embodiments, tracks belonging to the same viewport camera parameter information have the same value of track_group_id for track_group_type 'vctg'. The track_group_id of tracks from one viewport camera parameter information differs from the track_group_id of tracks from any other viewport camera parameter information.

The viewport camera parameter track group information (ViewportCameraParamGroupBox) with the grouping type of 'vctg' may include ViewportCameraParameterStruct( ).

ViewportCameraParameterStruct( ) includes viewport camera parameters applied to the tracks of this track group, such as, for example, camera type, field of views (FOVs), and clipping plane distance.

The viewport camera parameters, i.e., fields, included in ViewportCameraParameterStruct( ) have been described in detail above regarding the 'Viewport Camera Information Structure', and thus description thereof will be skipped to avoid redundant description.

Viewport Information Track Group

According to embodiments, one or more tracks to which the same viewport information is applicable may be grouped. The track group configured in this way may be referred to as a viewport information track group.

According to embodiments, the syntax of the box-type viewport track group information (ViewportGroupBox) related to the viewport information track group may be defined as follows.

```
aligned(8) class ViewportGroupBox extends
TrackGroupTypeBox('rvtg') {
    ViewportInfoStruct (1);
}
```

According to embodiments, TrackGroupTypeBox with track_group_type equal to 'rvtg' may indicate that this track belongs to a group of tracks carrying a V-PCC component bitsream or atlas sub-bitstream that are associated with the viewport information.

According to embodiments, tracks belonging to the same viewport information have the same value of track_group_id for track_group_type 'rvtg', and the track_group_id of tracks from one viewport information differs from the track_group_id of tracks from any other viewport information.

The viewport track group information (ViewportGroup-Box) with the grouping type of 'rvtg' may include ViewportInfoStruct(1).

ViewportInfoStruct(1) includes viewport information applicable to the tracks of this track group, such as, for example, viewing position information, viewing orientation information, viewing direction information, and/or viewport camera information.

The viewport information, i.e., fields, included in the ViewportInfoStruct(1) have been described in detail above regarding the 'Viewport Information Structure', and thus description thereof will be skipped to avoid redundant description.

Viewing Information Track Group

According to embodiments, one or more tracks to which the same viewing information (including a viewing position, a viewing orientation, and/or a viewing direction) is applicable may be grouped. The track group configured in this way may be referred to as a viewing information track group.

According to an embodiment, the syntax of box-type viewing information track group information (ViewingInformationGroupBox) related to the viewing information track group may be defined as follows.

```
aligned(8) class ViewingInformationGroupBox extends
TrackGroupTypeBox('vitg') {
    ViewingInformationStruct( );
}
```

According to embodiments, TrackGroupTypeBox with track_group_type equal to 'vitg' may indicate that this track belongs to a group of tracks carrying a V-PCC component bitsream or atlas sub-bitstream that are associated with viewing information. The viewing information includes a viewing position, a viewing orientation, and a viewing direction.

According to embodiments, tracks associated with the same viewing information have the same value of track_group_id for track_group_type 'vitg', and the track_group_id of tracks from the viewing information differs from the track_group_id of tracks from any other viewing information.

Viewing information track group information (ViewingInformationGroupBox) with the grouping type of 'vitg' may include ViewingInformationStruct( ).

ViewingInformationStruct( ) may include viewing information applied to the tracks of this track group, such as, for example, a viewing position, a viewing orientation, and/or a viewing direction.

According to embodiments, when a viewing information timed metadata track is present, ViewingInformationStruct( ) indicates initial viewing information applied to the tracks of this track group. For example, the initial viewing information may be signaled in a sample entry of the viewing information timed metadata track.

The viewing information, that is, the fields included in ViewingInformationStruct( ) has been described in detail above regarding the 'Viewing Information Structure', and thus description thereof will be omitted to avoid redundant description.

Entity Group

According to embodiments, the file/segment encapsulator of FIG. 20 or FIG. 21 may generate an entity group by grouping one or more entities (tracks or items). According to embodiments, the file/segment encapsulator or metadata processor of FIG. 20 or 21 may signal signaling information related to the entity group in a sample, an entity group, or a sample entry. That is, entity group information related to the entity group may be added to a sample, an entity group, or a sample entry. The entity group information will be described in detail together with the entity group below. According to embodiments, the entity group information may include viewport camera parameter entity group information, viewport entity group information, and viewing information entity group information.

Viewport Camera Parameter Entity Group

According to embodiments, one or more entities (e.g., tracks or items) to which the same viewport camera parameter information is applicable may be grouped. The entity group configured in this way may be referred to as a viewport camera parameter entity group.

According to embodiments, viewport camera parameter entity group information (ViewportCameraParamEntityGroupBox) related to the viewport camera parameter entity group may be stored in a sample, an entity group, or a sample entry in the form of a box.

ViewportCameraParamEntityGroupBox according to the embodiments may be defined as follows.

Box Types: 'vceg'
Container: GroupsListBox
Mandatory: No
Quantity: Zero or more

According to embodiments, viewport camera parameter entity group information (ViewportCameraParamEntityGroupBox) having 'vceg' as a value of the box type may be included in a group list box (GroupListBox).

According to embodiments, the viewport camera parameter entity group information (ViewportCameraParamEntityGroupBox) is static viewport related information, and may be signaled in a V-PCC track sample entry or a V-PCC bitstream track sample entry.

According to embodiments, the syntax of ViewportCameraParamEntityGroupBox may be defined as follows.

```
aligned(8) class ViewportCameraParamEntityGroupBox (version, flags)
extends
EntityToGroupBox ('vceg', version, flags) {
    for(i=0; i<num_entities_in_group; i++) {
        ViewportCameraParameterStruct( );
    }
}
```

According to embodiments, EntityToGroupBox with entity_group_type equal to 'vceg' indicates that tracks or items belong to the group that are associated with the viewport camera parameter information.

The signaled viewport camera parameter information may be applied to the timed track or non-timed items of this entity group.

According to embodiments, in the above syntax, "version" is an integer indicating the version of the corresponding box.

num_entities_in_group may indicate the number of entities included in this entity group.

Viewport camera parameter entity group information (ViewportCameraParamEntityGroupBox) having the grouping type of 'vceg' may include ViewportCameraParameterStruct( ) according to the value of the num_entities_in_group field.

The ViewportCameraParameterStruct( ) includes viewport camera parameters applicable to the entities of the entity group, such as, for example, a camera type, a field of views (FOVs), and a clipping plane distance.

The viewport camera parameters, i.e., the fields, included in ViewportCameraParameterStruct( ) have been described in detail above regarding the 'Viewport Camera Information Structure', and thus description thereof will be omitted here to avoid redundant description.

Viewport Information Entity Group

According to embodiments, one or more entities (e.g., tracks or items) to which the same viewport information is applicable may be grouped. The entity group configured in this way may be referred to as a viewport information entity group.

According to embodiments, viewport information entity group information (ViewportEntityGroupBox) related to the viewport information entity group may be stored in a sample, an entity group, or a sample entry in the form of a box.

ViewportEntityGroupBox according to the embodiments may be defined as follows.

Box Types: 'vpeg'
Container: GroupsListBox
Mandatory: No
Quantity: Zero or more

According to embodiments, the syntax of ViewportEntityGroupBox related to the viewport information entity group may be defined as follows.

```
aligned(8) class ViewportEntityGroupBox (version, flags)
extends EntityToGroupBox ('vpeg', version, flags) {
    for(i=0; i<num_entities_in_group; i++) {
        ViewportInfoStruct (1);
    }
}
```

According to embodiments, EntityToGroupBox with entity_group_type equal 'vpeg' indicates that tracks or items belong to the group that is associated with viewport information (including, for example, a viewing position, a viewing orientation, s viewing direction, viewport camera information).

The signaled viewport information may be applied to the timed track or non-timed items of this entity group.

According to embodiments, in the syntax above, "version" is an integer indicating the version of the box.

num_entities_in_group may indicate the number of entities in this entity group.

Viewport information entity group information (ViewportEntityGroupBox) having the grouping type of 'vpeg' may include ViewportInfoStruct(1) according to the value of the num_entities_in_group field.

ViewportInfoStruct(1) includes viewport information applicable to the tracks or items of this entity group, such as, for example, viewing position information, viewing orientation information, viewing direction information, and/or viewport camera information.

The viewport information, i.e., fields, included in ViewportInfoStruct(1) have been described in detail above regarding the 'Viewport Information Structure', and thus description thereof will be skipped to avoid redundant description.

Viewing Information Entity Group

According to embodiments, one or more entities (e.g., tracks or items) to which the same viewing information (including a viewing position, a viewing orientation and/or a viewing direction) is applicable may be grouped. The entity group configured in this way may be referred to as a viewing information entity group.

According to embodiments, viewing information entity group information (ViewingEntityGroupBox) related to the viewing information entity group may be stored in a sample, an entity group, or a sample entry in the form of a box.

ViewingEntityGroupBox according to the embodiments may be defined as follows.

Box Types: 'vieg'
Container: GroupsListBox
Mandatory: No
Quantity: Zero or more

According to embodiments, the syntax of ViewingEntityGroupBox related to the viewing information entity group may be defined as follows.

```
aligned(8) class ViewingEntityGroupBox (version, flags)
extends EntityToGroupBox ('vieg', version, flags) {
    for(i=0; i<num_entities_in_group; i++) {
        ViewingInformationStruct( );
    }
}
```

According to embodiments, EntityToGroupBox with track_group_type equal to 'vieg' indicates that tracks or items belong to the group that is associated with viewing information (including a viewing position, a viewing orientation, and/or a viewing direction).

The signaled viewing information may be applied to the timed track or non-timed items of this entity group.

According to embodiments, in the syntax above, "version" is an integer indicating the version of the box.

num_entities_in_group may indicate the number of entities in this entity group.

Viewing information entity group information (ViewingEntityGroupBox) having the grouping type of 'vieg' may include ViewingInformationStruct( ) according to the value of the num_entities_in_group field.

ViewingInformationStruct( ) may include viewing information applied to tracks or items of this entity group, such as, for example, viewing position information, viewing orientation information, and/or viewing direction information.

The viewing information, that is, fields included in the ViewingInformationStruct( ) has been described in detail above regarding the 'Viewing Information Structure', and thus description thereof will be skipped to avoid redundant description.

As described above, the V-PCC bitstream may be stored and transmitted in a single track or multiple tracks.

Hereinafter, a multi-track container of a V-PCC bitstream related to multiple tracks will be described.

According to embodiments, in the general layout of a multi-track container (also referred to as a multi-track ISOBMFF V-PCC container), V-PCC units in a V-PCC elementary stream may be mapped to individual tracks within a container file based on their types). There are two types of tracks in the multi-track ISOBMFF V-PCC container according to the embodiments. One of the types is a V-PCC track, and the other is a V-PCC component track.

The V-PCC track according to the embodiments is a track carrying the volumetric visual information in the V-PCC bitstream, which includes the atlas sub-bitstream and the sequence parameter sets (or V-PCC parameter sets).

V-PCC component tracks according to the embodiments are restricted video scheme tracks which carry 2D video encoded data for the occupancy map, geometry, and attribute sub-bitstreams of the V-PCC bitstream. In addition, the following conditions may be satisfied for V-PCC component tracks:

a) in the sample entry, a new box is inserted which documents the role of the video stream contained in this track, in the V-PCC system;
b) a track reference is introduced from the V-PCC track, to the V-PCC component track, to establish the membership of the V-PCC component track in the specific point-cloud represented by the V-PCC track;
c) the track-header flags are set to 0, to indicate that this track does not contribute directly to the overall layup of the movie but contributes to the V-PCC system.

Tracks belonging to the same V-PCC sequence may be time-aligned. Samples that contribute to the same point cloud frame across the different video-encoded V-PCC component tracks and the V-PCC track has the same presentation time. The V-PCC atlas sequence parameter sets and atlas frame parameter sets used for such samples have a decoding time equal or prior to the composition time of the point cloud frame. In addition, all tracks belonging to the same V-PCC sequence have the same implied or explicit edit lists.

Synchronization between the elementary streams in the component tracks may be handled by the ISOBMFF track timing structures (stts, ctts, and cslg), or equivalent mechanisms in movie fragments.

According to embodiments, the sync samples in the V-PCC track and V-PCC component tracks may or may not be time-aligned. In the absence of time-alignment, random access may involve pre-rolling the various tracks from different sync start-times, to enable starting at the desired time. In the case of time-alignment (required by, for example, a V-PCC profile such as the basic toolset profile), the sync samples of the V-PCC track should be considered as the random access points for the V-PCC content, and random access should be done by only referencing the sync sample information of the V-PCC track.

Based on this layout, a V-PCC ISOBMFF container may include the following:

A V-PCC track which contains V-PCC parameter sets and atlas sub-bitstream parameter sets (in the sample entry) and samples carrying atlas sub-bitstream NAL units. This track also includes track references to other tracks carrying the payloads of video compressed V-PCC units (i.e., unit types VPCC_OVD, VPCC_GVD, and VPCC_AVD).

A restricted video scheme track where the samples contain access units of a video-coded elementary stream for occupancy map data (i.e., payloads of V-PCC units of type VPCC_OVD).

One or more restricted video scheme tracks where the samples contain access units of video-coded elementary streams for geometry data (i.e., payloads of V-PCC units of type VPCC_GVD).

Zero or more restricted video scheme tracks where the samples contain access units of video-coded elementary streams for attribute data (i.e., payloads of V-PCC units of type VPCC_AVD).

Next, V-PCC tracks are described below.

The syntax structure of the V-PCC Track Sample Entry according to the embodiments is configured as follows.

Sample Entry Type: 'vpc1', 'vpcg'
Container: SampleDescriptionBox
Mandatory: A 'vpc1' or 'vpcg' sample entry is mandatory
Quantity: One or more sample entries may be present
The sample entry type is 'vpc1' or 'vpcg'.

Under the 'vpc1' sample entry, all atlas sequence parameter sets, atlas frame parameter sets, atlas adaptation parameter sets, V-PCC essential SEIs or V-PCC non-essential SEIs are in the setupUnit array (i.e., sample entry).

Under the 'vpcg' sample entry, the atlas sequence parameter sets, atlas frame parameter sets, atlas adaptation parameter sets, V-PCC essential SEIs or V-PCC non-essential SEIs may be present in this array (i.e., sample entry), or in the stream(i.e., sample).

An optional BitRateBox may be present in the VPCC volumetric sample entry to signal the bit rate information of the V-PCC track.

As shown below, the V-PCC track uses VPCCSampleEntry that inherits VolumetricVisualSampleEntry. VPCCSampleEntry includes VPCCConfigurationBox, VPCCUnitHeaderBox, and/or ViewportInformationBox( ). The VPCCConfigurationBox includes VPCCDecoderConfigurationRecord.

```
aligned(8) class VPCCSampleEntry( ) extends
VolumetricVisualSampleEntry ('vpc1') {
    VPCCConfigurationBox config;
    VPCCUnitHeaderBox unit_header;
    VPCC3DBoundingInformationBox( );
    ViewportInformationBox( );
}
```

VPCC3DBoundingInformationBox indicates the 3D bounding box information of V-PCC content corresponding to samples carried in the track. 3d_bb_updated_flag equal to 1 indicates that the signaled 3D bounding box information is initial 3D bounding box information of V-PCC content corresponding to samples carried by the track. The 3D bounding box information, which changes dynamically, may be signaled through sample grouping or timed metadata tracks. 3d_bb_updated_flag equal to 0 indicates that the 3D bounding box information of the corresponding V-CC content does not change. When 3d_bb_type is equal to 0, information on the largest bounding box among the 3D bounding boxes associated with the sample data may be signaled. When 3d_bb_type is equal to 1, associated initial 3D bounding box information may be signaled. The 3D bounding box information, which changes dynamically, may be signaled through sample grouping or a separate metadata track.

ViewportInformationBox contains viewport information about V-PCC content corresponding to samples carried in this track. According to an embodiment, the viewport information includes viewing position information, viewing orientation information, viewing direction information, and/or viewport camera information. It may indicate initial viewport information when a viewport information sample group or a viewport information timed metadata track is present.

According to embodiments, the syntax of ViewportInformationBox( ) stored in a sample entry of the V-PCC track may be defined as follows.

```
aligned(8) class ViewportInformationBox( ) {
    unsigned int(1) vp_camera_present;
    unsigned int(1) vp_pos_present;
    unsigned int (6) vp_type;
    if(vp_camera_present) {
        ViewportCameraParameterStruct( );
    }
    ViewportInfoStruct(vp_pos_present);
}
```

According to embodiments, ViewportInformationBox( ) may include a vp_camera_present field, a vp_pos_present field, and a vp_type field.

vp_camera_present may indicate whether viewport camera information is included in this viewport information box. When the value of the vp_camera_present field is 1, viewport camera information (ViewportCameraParameterStruct( )) may be included.

ViewportCameraParameterStruct( ) may include viewport camera information and parameters related to the viewport.

The viewport camera parameters, i.e., fields, included in ViewportCameraParameterStruct( ) have been described in detail above regarding the 'Viewport Camera Information Structure', and thus description thereof will be omitted here to avoid redundant description.

vp_type may indicate the type of the viewport. A recommended viewport or a viewing orientation may be indicated by the value of the vp_type field.

vp_pos_present may indicate whether viewport position information is included in ViewportInfoStruct. For example, when the value of the vp_pos_present field is 1, the viewport position information may be included in ViewportInfoStruct. When the value is 0, ViewportInfoStruct may indicate the orientation of the viewport, that is, viewing orientation information.

The viewport information, that is, fields included in the ViewportInfoStruct( ) has been described in detail above regarding the 'Viewport Information Structure', and thus description thereof will be omitted to avoid redundant description.

Hereinafter, the V-PCC track sample format will be described.

Each sample in the V-PCC track corresponds to a single coded atlas access unit (also called a point cloud frame). Samples corresponding to this frame in various component tracks shall have the same composition time as the V-PCC track sample. Each V-PCC sample shall contain only one V-PCC unit payload of type VPCC_AD as shown below.

```
aligned(8) class VPCCSample {
    unsigned int PointCloudPictureLength = sample_size;   // size of sample (e.g., from SampleSizeBox)
    for (i=0; i<PointCloudPictureLength; ) {
        sample_stream_nal_unit nalUnit
        i += (VPCCDecoderConfigurationRecord.lengthSizeMinusOne+1) + nalUnit.ssnu_nal_unit_size;
    }
}
```

According to the embodiments, a sync sample in a V-PCC track is a sample that contains an intra random access point (IRAP) coded atlas access unit. Atlas sub-bitstream parameter sets (e.g., ASPS, AAPS, AFPS) and SEI messages may be repeated, if needed, in the sync sample to allow for random access.

Next, video-encoded V-PCC component tracks are described below.

Carriage of coded video tracks that use MPEG-specified codecs may conform to ISOBMFF derived specifications. For example, for carriage of AVC and HEVC coded videos, reference may be made to the ISO/IEC 14496-15. ISOBMFF may also provide an extension mechanism if other codec types are required.

Since it is not meaningful to display the decoded frames from attribute, geometry, or occupancy map tracks without reconstructing the point cloud at the player side, a restricted video scheme type may be defined for these video-coded tracks.

Next, the restricted video scheme is described below.

V-PCC component video tracks may be represented in the file as restricted video, and may be identified by 'pccv' in the scheme_type field of the SchemeTypeBox of the RestrictedSchemeInfoBox of the restricted video sample entries.

It should be noted that there is no restriction on the video codec used for encoding of the attribute, geometry, and occupancy map V-PCC components. Moreover, these components may be encoded using different video codecs.

Scheme information (SchemeInformationBox) according to embodiments may be present and contain a VPCCUnitHeaderBox.

Next, referencing V-PCC component tracks is described below.

To link a V-PCC track to component video tracks, three TrackReferenceTypeBoxes may be added to a TrackReferenceBox within the TrackBox of the V-PCC track, one for each component. The TrackReferenceTypeBox contains an array of track IDs designating the video tracks which the V-PCC track references. The reference type of a TrackReferenceTypeBox identifies the type of the component, such as an occupancy map, geometry, or attribute. The track reference types are as follows.

In 'pcco', the referenced track(s) contain the video-coded occupancy map V-PCC component.

In 'pccg', the referenced track(s) contain the video-coded geometry V-PCC component.

In 'pcca', the referenced track(s) contain the video-coded attribute V-PCC component.

The type of the V-PCC component carried by the referenced restricted video track and signaled in the RestrictedSchemeInfoBox of the track shall match the reference type of the track reference from the V-PCC track.

Next, a single track container of the V-PCC bitstream is described below.

A single-track encapsulation of V-PCC data requires the V-PCC encoded elementary bitstream to be represented by a single-track declaration.

Single-track encapsulation of PCC data may be utilized in the case of simple ISOBMFF encapsulation of a V-PCC encoded bitstream. Such a bitstream may be directly stored as a single track without further processing. V-PCC unit header data structures may be kept in the bitstream. A single track container for V-PCC data may be provided to media workflows for further processing (e.g., multi-track file generation, transcoding, DASH segmentation, etc.).

An ISOBMFF file which contains single-track encapsulated V-PCC data may contain 'pest' in the compatible_brands[ ] list of the FileTypeBox.

According to embodiments, a syntax structure of a sample entry of V-PCC bitstream (or elementary stream) track may define as below Sample Entry Type: 'vpe1', 'vpeg'
Container: SampleDescriptionBox
Mandatory: A 'vpe1' or 'vpeg' sample entry is mandatory
Quantity: One or more sample entries may be present
V-PCC bitstream tracks use VolumetricVisualSampleEntry with a sample entry type of 'vpe1' or 'vpeg'.

A V-PCC bitstream sample entry includes a VPCCConfigurationBox.

Under the 'vpe1' sample entry, all atlas sequence parameter sets, atlas adaptation parameter sets, atlas frame parameter sets, V-PCC essential SEI or V-PCC non-essential SEIs may be in the setupUnit array. Under the 'vpeg' sample entry, atlas sequence parameter sets, atlas frame parameter sets, atlas adaptation parameter sets, V-PCC essential SEI or V-PCC non-essential SEIs may be present in this array, or in the stream.

As shown below, the V-PCC bitstream track uses the V-PCC bitstream sample entry (VPCCBitstreamSampleEntry) that inherits VolumetricVisualSampleEntry. VPCCBitstreamSampleEntry includes a V-PCC configuration box (VPCCConfigurationBox) and/or a viewport information box (ViewportInformationBox( )). VPCCConfigurationBox includes a V-PCC decoder configuration record (VPCCDecoderConfigurationRecord). aligned(8) class VPCCBitStreamSampleEntry( ) extends VolumetricVisualSampleEntry ('vpe1')

```
    }
        VPCCConfigurationBox config;
        VPCC3DBoundingInformationBox( );
        ViewportInformationBox( );
    }
```

VPCC3DBoundingInformationBox( ) indicates the 3D bounding box information about V-PCC content corresponding to samples carried in the track.

ViewportInformationBox contains the viewport information about the V-PCC content corresponding to the samples carried in the track. According to an embodiment, the viewport information includes viewing position information, viewing orientation information, viewing direction information, and/or viewport camera information. ViewportInformationBox may indicate the initial viewport information when a viewport information sample group or a viewport information timed metadata track is present.

The information included in ViewportInformationBox has been described above, and thus description thereof will be skipped to avoid redundant description.

Hereinafter, the V-PCC bitstream sample format will be described.

A V-PCC bitstream sample may contain one or more V-PCC units (i.e., one V-PCC access unit) which belong to the same presentation time. A sample may be self-contained (e.g., a sync sample) or may be decoding-wise dependent on other V-PCC bitstream samples.

Next, a V-PCC bitstream sync sample is described below.

A V-PCC bitstream sync sample may satisfy all the following conditions:

It is independently decodable;

None of the samples that come after the sync sample in decoding order have any decoding dependency on any sample prior to the sync sample; and All samples that come after the sync sample in decoding order are successfully decodable.

Next, a V-PCC bitstream sub-sample is described below.

A V-PCC bitstream sub-sample is a V-PCC unit which is contained in a V-PCC bitstream sample.

A V-PCC bitstream track contains one Sub SampleInformationBox in the SampleTableBox, or in the TrackFragmentBox of each of the MovieFragmentBoxes, which lists the V-PCC bitstream sub-samples.

The 32-bit unit header of the V-PCC unit which represents the sub-sample may be copied to the 32-bit codec specific parameters field of the sub-sample entry in the Sub SampleInformationBox. The V-PCC unit type of each sub-sample is identified by parsing the codec_specific_parameters field of the sub-sample entry in the SubSampleInformationBox.

Timed Metadata Track

Hereinafter, the timed metadata track will be described.

According to embodiments, when the file/segment encapsulator of FIG. 20 or FIG. 21 encapsulates a V-PCC bitstream into a file, a metadata track to carry metadata contained in the V-PCC bitstream may be generated. According to embodiments, the metadata track may be referred to as a timed metadata track.

In an embodiment, the present disclosure describes a viewport timed metadata track carrying viewport information.

According to embodiments, a dynamic viewport information timed metadata track may indicate viewport information (or viewport related information) including a viewing position (or referred to as a viewport position), a viewing orientation, a viewing direction, rotation, and/or viewport camera parameters, and may dynamically change over time. The viewport information timed metadata track is linked to respective tracks (e.g., V-PCC track or V-PCC bitstream track) carrying atlas sub-bitstreams or V-PCC component bitstreams. That is, the viewport information timed metadata track indicates a viewport used in rendering related V-PCC component tracks (or media tracks). This dynamic viewport timed metadata track contains a 'cdsc' track reference to the related V-PCC track or V-PCC bitstream tracks.

According to embodiments, intrinsic camera information and/or extrinsic camera information that dynamically change over time may be signaled in a sample or sample entry of the viewport information timed metadata track.

According to embodiments, a sample entry (ViewportInformationSampleEntry) in the viewport information timed metadata track may contain initial instrinsic camera information and/or initial extrinsic camera information.

According to embodiments, the syntax of the sample entry (ViewportInformationSampleEntry) in the viewport information timed metadata track may be defined as follows.

```
aligned(8) class ViewportInformationSampleEntry extends
MetadataSampleEntry('dyvp') {
    unsigned int(1) dynamic_camera_present;
    unsigned int(1) dynamic_pos_present;
    unsigned int(1) dynamic_ori_present;
    ViewportInformationBox default_viewport;
}
```

The sample entry of the viewport information timed metadata track may contain initial viewport information applied to the corresponding V-PCC content when the viewport information changes over time. The viewport information includes a viewing position, a viewing orientation, a viewing direction, and/or viewport camera parameters.

According to embodiments, the ViewportInformationSampleEntry in the viewport information timed metadata track may include a dynamic_camera_present field, a dynamic_pos_present field, a dynamic_ori_present field, and a viewport information box (ViewportInformationBox).

The dynamic_camera_present may indicate whether viewport camera parameter information may be present in the sample of the metadata track.

The dynamic_pos_present may indicate whether viewport location information may be present in the sample of the metadata track.

The dynamic_ori_present may indicate whether viewport orientation or direction information may be present in the sample of the metadata track.

The default viewport may include viewport information (e.g., a viewing position (or a viewport position), a viewing orientation, a viewing direction, a viewing rotation, and a viewport camera parameter) applied by default. Depending on the value of vp_type included in the corresponding viewport information box (ViewportInformationBox), the timed metadata track may contain information about a changed recommended viewport or viewing orientation.

According to embodiments, the syntax of ViewportInformationSample in the viewport information timed metadata track may be defined as follows. That is, this sample corresponds to a sample entry of sample entry type 'dyvp'.

```
aligned(8) class ViewportInformationSample {
    ViewportInformationBox( );
    ViewingInformationStruct( );
}
```

ViewportInformationBox( ) has been described in detail above, and thus description thereof will be skipped to avoid redundant description.

ViewingInformationStruct( ) includes dynamically changed viewing information.

According to embodiments, ViewportInformationSample in the viewport information timed metadata track may include intrinsic camera information and/or extrinsic camera information that dynamically change over time.

In another embodiment, the present disclosure describes a viewing timed metadata track carrying viewing information.

According to embodiments, the dynamic viewing information timed metadata track may indicate viewing information including a viewing position, a viewing orientation and/or a viewing direction, and may dynamically change over time. The viewing information timed metadata track is linked to respective tracks (e.g., V-PCC track or V-PCC bitstream track) carrying an atlas sub-bitstream or V-PCC component bitstreams.

According to embodiments, the syntax of the sample entry (ViewingInformationSampleEntry) in the viewing information timed metadata track may be defined as follows.

```
aligned(8) class ViewingInformationSampleEntry extends
MetadataSampleEntry('dyvi') {
    ViewingInformationBox ( );
}
```

The sample entry of the viewing information timed metadata track may include initial viewing information applied to the V-PCC content when viewing information changes over time. The viewing information (ViewingInformationBox( )) includes a viewing position, a viewing orientation, and/or a viewing direction.

According to embodiments, the syntax of the sample (ViewingInformationSample) in the viewing information timed metadata track may be defined as follows. That is, the sample corresponds to a sample entry of sample entry type 'dyvi'.

```
aligned(8) class ViewportInformationSample {
    ViewingInformationStruct( );
}
```

ViewingInformationStruct( ) includes dynamically changed viewing information. The viewing information includes a viewing position, a viewing orientation, and/or a viewing direction.

In the reception device according to the embodiments, rendering of the point cloud data may be performed by the renderer 10009 of FIG. 1, the point cloud renderer 19007 of FIG. 19, the renderer 20009 of FIG. 20, or the point cloud renderer 22004 of FIG. 22. According to embodiments, the point cloud data may be rendered in a 3D space based on metadata. The user may view all or part of the result of rendering through a VR/AR display or a general display. According to embodiments, the point cloud data may be rendered based on the above-described viewport-related information. The viewport-related information may include at least one of viewport camera information, recommended viewport information, and viewing information. The viewport-related information may be transmitted/received through a sample entry, a sample group, a track group, an entity group, or a separate metadata track according to changed attributes.

Based on the orientation information and/or the viewport-related information indicating the region the user is currently viewing, the point cloud video decoder of the reception device according to the embodiments may efficiently extract or decode only media data of a specific region, that is, the region indicated by the orientation information and/or the viewport-related information. Based on the orientation information and/or the viewport-related information, the point cloud video encoder of the transmission device according to the embodiments may encode only media data of the specific region, that is, the region indicated by the orientation information and/or viewport-related information, or may encapsulate the encoded media data into a file and transmit the same.

According to embodiments, the file/segment encapsulator of the transmission device may encapsulate the entire point cloud data into a file/segment based on the orientation information and/or the viewport-related information, or may encapsulate the point cloud data indicated by the orientation information and/or viewport-related information into a file/segment.

According to embodiments, the file/segment decapsulator of the reception device may decapsulate a file containing the entire point cloud data based on the orientation information and/or viewport-related information, or may decapsulate a file containing the point cloud data indicated by the orientation information and/or the viewport-related information.

According to embodiments, the viewport-related information may include at least one of viewport camera information, viewport information, or viewing information. The viewport camera information, viewport information, and viewing information have been described in detail above, and thus description thereof will be skipped.

According to embodiments, the viewport-related information may be generated/encoded by the metadata encoder 18005 of the point cloud data transmission device of FIG. 18 or the point cloud preprocessor 20001 and/or the video/image encoders 21007 and 21008 of the V-PCC system of FIG. 21, and may be acquired/decoded by the metadata decoder 19002 of the point cloud data reception device of FIG. 19 or the video/image decoders 22001 and 22002 and/or the point cloud post-processor 22003 of the V-PCC system of FIG. 22.

Next, carriage of non-timed V-PCC data is described below.

Figure 59:
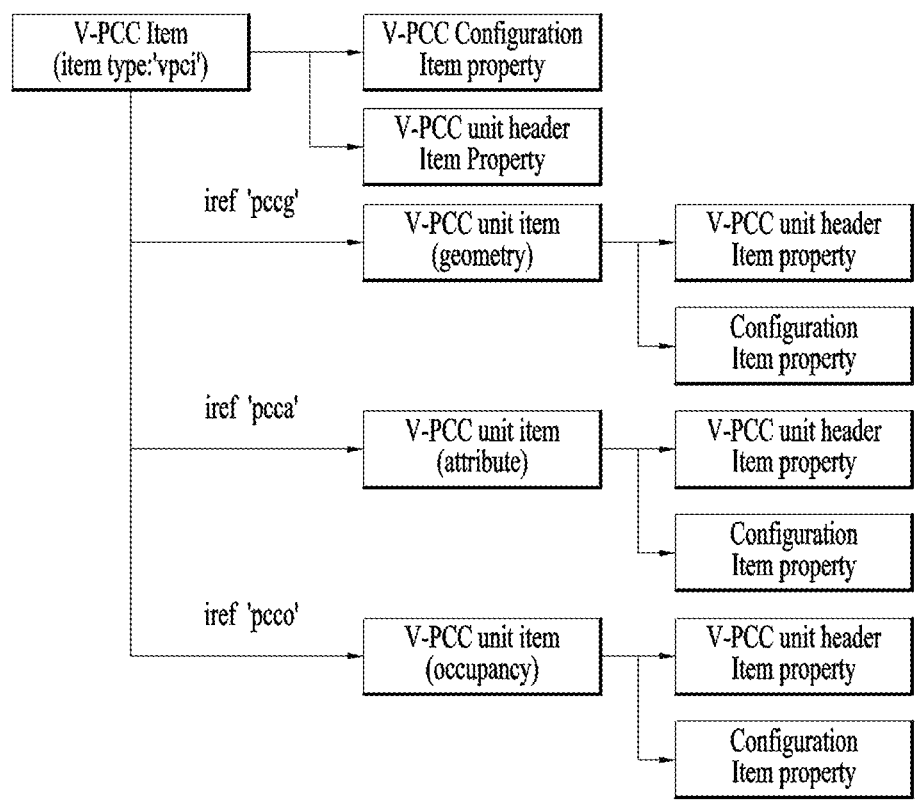
FIG. 59 is a diagram illustrating an example in which a spatial portion of point cloud data in a viewing frustum is actually displayed on a viewport according to embodiments.

FIG. 59 is a diagram illustrating an exemplary structure for encapsulating non-timed V-PCC data according to embodiments.

The non-timed V-PCC data according to embodiments may be stored in a file as image items.

According to embodiments, two item types called a V-PCC item and a V-PCC unit item are defined for encapsulating non-timed V-PCC data).

According to embodiments, a new handler type 4CC code 'vpcc' is defined and stored in the HandlerBox of the MetaBox in order to indicate the presence of V-PCC items, V-PCC unit items and other V-PCC encoded content representation information.

A V-PCC item is an item which represents an independently decodable V-PCC access unit.

According to embodiments, a new handler type 4CC code 'vpcc' is defined and stored in the HandlerBox of the MetaBox in order to indicate the presence of V-PCC items. According to embodiments, V-PCC items may store V-PCC unit payload(s) of an atlas sub-bitstream.

If there is a PrimaryItemBox, the item id in this box is set to indicate the V-PCC item.)

A V-PCC unit item according to embodiments is an item representing a V-PCC unit data. According to embodiments, V-PCC unit items may store V-PCC unit payload(s) of occupancy, geometry, and attribute video data units.

A V-PCC unit item according to embodiments shall store only one V-PCC access unit related data.

According to embodiments, an item type for a V-PCC unit item may be set depending on the codec used to encode corresponding video data units.

According to embodiments, a V-PCC unit item may be associated with corresponding V-PCC unit header item property and codec specific configuration item property.

According to embodiments, V-PCC unit items may be marked as hidden items. This is because it is not meaningful to display independently).

According to embodiments, in order to indicate the relationship between a V-PCC item and V-PCC unit items, three new item reference types with 4CC codes 'pcco', 'pccg' and 'pcca' are defined. Item reference according to embodiments is defined "from" a V-PCC item "to" the related V-PCC unit items.

The 4CC codes of item reference types according to embodiments are as follows:

In type 'pcco', the referenced V-PCC unit item(s) contain the occupancy video data units.)

In type 'pccg', the referenced V-PCC unit item(s) contain the geometry video data units.

In type 'pcca', the referenced V-PCC unit item(s) contain the attribute video data units.

Next, V-PCC-related item properties is described below.)

According to embodiments, descriptive item properties are defined to carry the V-PCC parameter set information and V-PCC unit header information, respectively:

The following is an example of the syntax structure of a V-PCC configuration item property.

Box Types: 'vpcp'
Property type: Descriptive item property
Container: ItemPropertyContainerBox
Mandatory (per item): Yes, for a V-PCC item of type 'vpci'
Quantity (per item): One or more for a V-PCC item of type 'vpci'

According to embodiments, V-PCC parameter sets are stored as descriptive item properties and are associated with the V-PCC items.

According to embodiments, essential is set to 1 for a 'vpcp' item property.

```
aligned(8) class vpcc_unit_payload_struct ( ) {
    unsigned int(16) vpcc_unit_payload_size;
    vpcc_unit_payload( );
}
```

The vpcc_unit_payload_size field specifies a size in bytes of vpcc_unit_paylod( ).

The vpcc_unit_paylod( ) includes a V-PCC unit of a type VPCC_VPS.

```
aligned(8) class VPCCConfigurationProperty extends
ItemProperty('vpcc') {
    vpcc_unit_payload_struct( )[ ];
}
```

The following is an example of a syntax structure of a V-PCC unit header item property.

Box Types: 'vunt'
Property type: Descriptive item property
Container: ItemPropertyContainerBox
Mandatory (per item): Yes, for a V-PCC item of type 'vpci' and for a V-PCC unit item
Quantity (per item): One According to embodiments, a V-PCC unit header is stored as descriptive item properties and is associated with the V-PCC items and the V-PCC unit items.

According to embodiments, essential is set to 1 for a 'vunt' item property.

```
aligned(8) class VPCCUnitHeaderProperty ( ) extends
ItemFullProperty('vunt', version=0, 0) {
    vpcc_unit_header( );
}
```

According to embodiments, a viewport camera information item property may be defined as follow.
Box Types: 'vpci'
Property type: Descriptive item property
Container: ItemPropertyContainerBox
Mandatory (per item): no
Quantity (per item): zero or one According to embodiments, the viewport camera information property information (ViewportCameraInformationProperty) having 'vpci' as the box type value may be included in the item property container box (ItemPropertyContainerBox).

According to embodiments, the syntax of the ViewportCameraInformationProperty may be defined as follows.

```
aligned(8) class ViewportCameraInformationProperty ( )
extends ItemFullProperty('vpci', version=0, 0) {
    ViewportCameraParameterStruct ( );
}
```

According to embodiments, ViewportCameraInformationProperty indicates viewport camera information according to the image to be rendered for the user.

ViewportCameraParameterStruct( ) is stored as an item property and is related to V-PCC items and V-PCC unit items. That is, ViewportCameraParameterStruct( ) includes viewport camera parameters related to the V-PCC item. The viewport camera parameters include camera type, FOVs, and clipping plane distance.

According to embodiments, the viewing information item property may be defined as follows.
Box Types: 'vpvi'
Property type: Descriptive item property
Container: ItemPropertyContainerBox
Mandatory (per item): no
Quantity (per item): zero or one According to embodiments, the viewing information property information (ViewingInformationProperty) having 'vpvi' as the box type value may be included in the ItemPropertyContainerBox.

According to embodiments, the syntax of the ViewingInformationProperty may be defined as follows.

```
aligned(8) class ViewingInformationProperty ( ) extends
ItemFullProperty('vpvi', version=0, 0) {
    ViewingInformationStruct ( );
}
```

According to embodiments, ViewingInformationProperty indicates viewing information according to the image to be rendered for the user.

ViewingInformationStruct( ) is stored as an item property and is related to V-PCC items and V-PCC unit items. That is, ViewingInformationStruct( ) includes viewing information related to the V-PCC item. The viewing information includes a viewing position, a viewing orientation, and/or a viewing direction.

Figure 60:
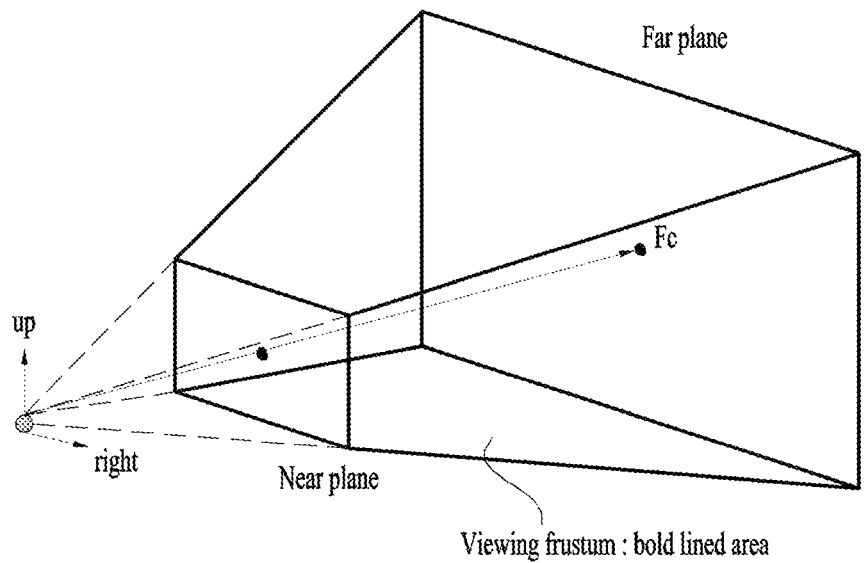
FIG. 60 is a diagram illustrating an example in which a spatial portion of point cloud data in a viewing frustum is actually displayed on a viewport according to embodiments.

FIG. 60 is a diagram illustrating an example in which a spatial portion of point cloud data in a viewing frustum is actually displayed on a viewport according to embodiments.

According to embodiments, a viewport to which point cloud data is actually provided may be defined based on a viewing frustum as shown in FIG. 60. A portion indicated by a thick line in FIG. 60 may be the viewing frustum, and point cloud data present in the viewing frustum may be actually rendered and provided to the user.

Figure 61:
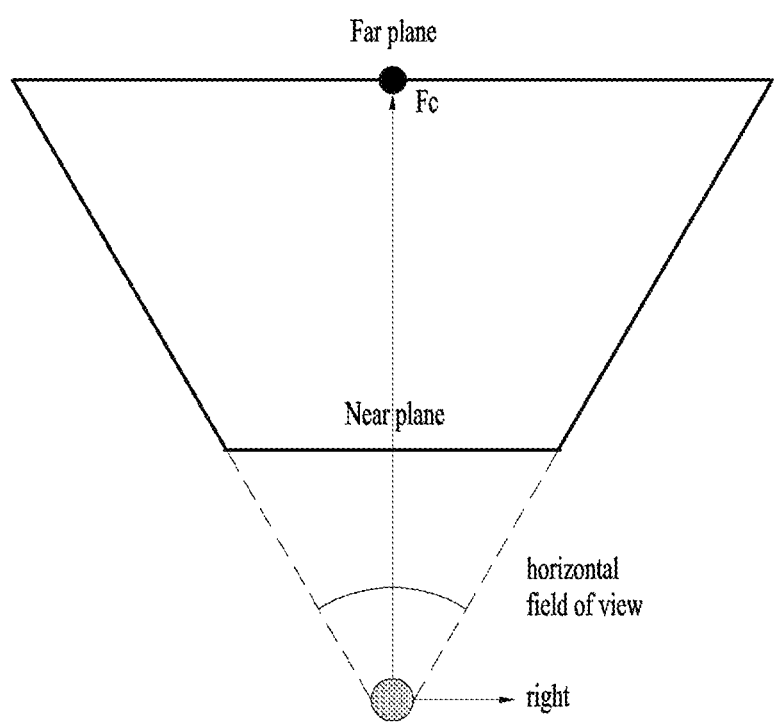
FIG. 61 shows an exemplary top view of a viewing frustum according to embodiments.

FIG. 61 shows an exemplary top view of a viewing frustum according to embodiments. That is, FIG. 61 shows an example of a horizontal FOV of a virtual camera or a user/user view (eye).

Figure 62:
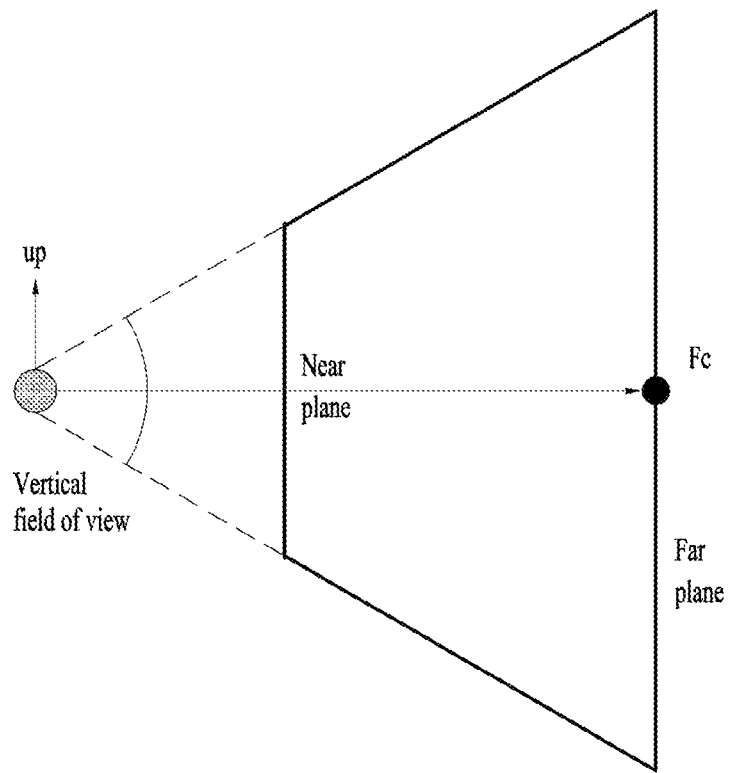
FIG. 62 shows an exemplary side view of a viewing frustum according to embodiments.

FIG. 62 shows an exemplary side view of a viewing frustum according to embodiments. That is, FIG. 62 shows an example of a vertical FOV of a virtual camera or a user/user view (eye).

According to embodiments, the virtual camera may match the user's eye, that is, the user's perspective/view in a three-dimensional space. That is, it may be the user's view/eye in 3D space.

Figure 63:
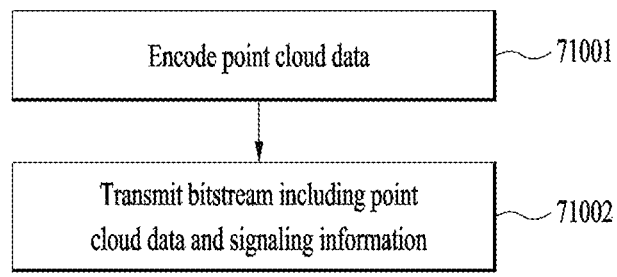
FIG. 63 is a flowchart of a method for transmitting point cloud data according to embodiments.

FIG. 63 illustrates an example of a method of transmitting point cloud data according to embodiments.

The point cloud data transmission method according to the embodiments may include encoding point cloud data (71001), and/or transmitting a bitstream containing the point cloud data and signaling information (71002).

In operation 71001 according to the embodiments, the point cloud data may be encoded. In operation 71001 according to the embodiments, only media data of a specific region may be encoded based on the viewport related information described above. The viewport related information according to the embodiments may include at least one of viewport camera information, recommended viewport information, and viewing information. Since detailed information included in the viewport related information has been sufficiently described above, description thereof will be omitted. For example, the transmission device 10000 of FIG. 1 and/or the point cloud video encoder 10002 may perform the encoding. According to embodiments, point cloud data as shown in FIG. 3 may be encoded. The point cloud data may be encoded by the V-PCC encoding process of FIG. 4. The point cloud data may be encoded based on the method as in FIGS. 5 to 14. In addition, the point cloud data may be encoded by the encoder of FIG. 15. In operation 71002 according to the embodiments, the point cloud data or a bitstream containing the point cloud data and signaling information may be transmitted. The bitstream containing the point cloud data may be transmitted by the transmission device 10000 and the transmitter 10004 of FIG. 1. The signaling information is also referred to as metadata, and may include the above-described syntaxes (including viewport related information). The point cloud data (or the bitstream containing the point cloud data) may be transmitted in the form of a file/segment by the file/segment encapsulator 10003.

In operation 71002 according to the embodiments, all the point cloud data may be encapsulated into a file/segment based on viewport related information, or point cloud data indicated by the viewport related information may be encapsulated into a file/segment. The viewport related information according to the embodiments may include at least one of viewport camera information, recommended viewport information, and viewing information. Since detailed information included in the viewport-related information has been sufficiently described above, description thereof will be omitted. The viewport related information may be transmitted through a sample, a sample entry, a sample group, a track group, or an entity group in a track of a file or a separate metadata track of the file. The point cloud data transmission process may be performed by the transmission device of FIG. 18. In addition, the point cloud data may be transmitted by the V-PCC system of FIGS. 20 to 22. Furthermore, the point cloud data may be provided to the user in combination with various devices over the network of FIG. 23.

The point cloud data transmission method/device according to the embodiments may be combined with all/part of the above-described embodiments to provide point cloud content.

Figure 64:
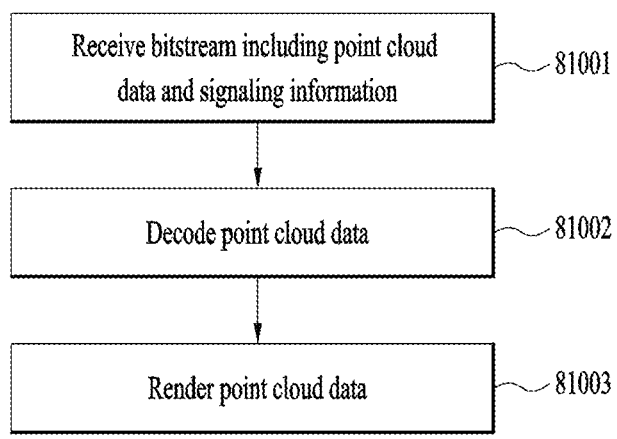
FIG. 64 is a flowchart of a method for receiving point cloud data according to embodiments.

FIG. 64 illustrates an example of a method of receiving point cloud data according to embodiments.

The point cloud data reception method according to the embodiments includes receiving a bitstream containing point cloud data and signaling information (81001), decoding the point cloud data (81002), and/or rendering the point cloud data (81003).

In operation 81001 according to the embodiments, a bitstream containing point cloud data may be received. In the point cloud data reception method, the bitstream containing the point cloud data may be received in the form of a file/segment. According to embodiments, in operation 81001, the file including all point cloud data may be decapsulated based on viewport related information, or a file including point cloud data indicated by the viewport related information may be decapsulated. According to embodiments, the viewport related information may be obtained from a sample, a sample entry, a sample group, a track group, or an entity group in a track of a file or a separate metadata track of the file. The viewport related information according to the embodiments may include at least one of viewport camera information, recommended viewport information, and viewing information. Since detailed information included in the viewport-related information has been sufficiently described above, description thereof will be omitted. The reception device 10005 and the receiver 10006 of FIG. 1 may receive a bitstream (or a file/segment including the bitstream). The file/segment decapsulator 10007 of FIG. 1 may decapsulate the point cloud data and/or viewport related information in the form of a file/segment. It has been described above that the reception device according to the embodiments performs the receiving process of FIG. 19 from the receiving operation to the rendering operation.

In operation 81002 according to the embodiments, the point cloud data is decoded. In operation 81002 according to the embodiments, only the media data of a specific region, namely, a region indicated by the viewport information, may be efficiently extracted or decoded from the file based on the viewport related information indicating the region currently being viewed by the user. The viewport related information according to the embodiments may include at least one of viewport camera information, recommended viewport information, and viewing information. Since detailed information included in the viewport-related information has been sufficiently described above, description thereof will be omitted. The point cloud video decoder 10008 of FIG. 1 may decode the point cloud data. The decoder may perform the V-PCC decoding process by the operations shown in FIG. 16. The bitstream containing the point cloud data may be decoded by a decoder as shown in FIG. 17. The point cloud data may be processed by a system configured to process point cloud data as shown in FIGS. 20 to 22. In addition, as shown in FIG. 23, the point cloud data may be provided to a user through various devices/environments connected over a network.

In operation 81003 according to the embodiments, the point cloud data is rendered/displayed.

In operation 81003 according to the embodiments, the rendering of the point cloud data may be performed by the renderer 10009 of FIG. 1, the point cloud renderer 19007 of FIG. 19, the renderer 2001 of FIG. 20, or the point cloud renderer 22004 of FIG. 22. According to embodiments, the point cloud data may be rendered in a 3D space based on metadata. The user may view all or part of the rendered result through a VR/AR display or a general display. In particular, the point cloud data may be rendered according to viewport related information.

The viewport related information according to the embodiments may be information on a region currently viewed by the user through a device or an HMD in a 3D space. Based on this information, a gaze analysis may be performed to check the way the user consumes the point cloud video, a region of the point cloud video the user is gazing at, and the time for which the user gazes at the region. The gaze analysis may be performed at the receiving side and the result of the gaze analysis may be transmitted to the transmitting side through a feedback channel. A display device such as VR/AR/MR may extract a viewport region based on orientation information, a position/orientation of the user's head, and a vertical or horizontal FOV supported by the device. The viewport related information may be extracted or calculated by the reception device. The viewport related information analyzed by the reception device may be transmitted to the transmission device through a feedback channel.

The viewport related information according to the embodiments may include at least one of viewport camera information, recommended viewport information, and viewing information. Since detailed information included in the viewport-related information has been sufficiently described above, description thereof will be omitted.

The method/device for receiving point cloud data according to the embodiments may be combined with all/part of the above-described embodiments to provide point cloud content.

As described above, the file encapsulation or file encapsulator according to the embodiments may store the corresponding information in a track or image item in a file according to the degree of change in the viewport camera parameters, viewport, and viewing orientation of the V-PCC video or image. It may also store the viewing information of a V-PCC video or image in a track or image item in the file.

The file decapsulation or file decapsulator according to the embodiments may acquire viewport camera parameters, viewport, or viewing orientation information contained in a track or image item in a file, and may effectively extract, decode, and render track data or image data in the file based thereon. It may also acquire viewing information contained in a track or an image item in the file, and may render a point cloud video or image based thereon.

The data of the above-described V-PCC and V-PCC system may be generated by the encapsulator (which may be referred to as a generator) of the transmission device according to the embodiments, and may be transmitted by the transmitter of the transmission device. In addition, the data of the V-PCC and V-PCC system may be received by the receiver of the reception device according to the embodiments, and may be acquired by the decapsulator (which may be referred to as a parser) of the reception device. The decoder, the renderer, and the like of the reception device may provide appropriate point cloud data to the user based on the data of the V-PCC and V-PCC system.

The point cloud data transmission method, the transmission device, the point cloud data reception method, and the reception device according to the embodiments may provide a good-quality point cloud service.

The point cloud data transmission method, the transmission device, the point cloud data reception method, and the reception device according to the embodiments may achieve various video codec schemes.

The point cloud data transmission method, the transmission device, the point cloud data reception method, and the reception device according to the embodiments may provide universal point cloud content such as a self-driving service.

The point cloud data transmission method, the transmission device, the point cloud data reception method, and the reception device according to the embodiments may provide an optimal point cloud content service by configuring a V-PCC bitstream and allowing a file to be transmitted, received and stored.

With the point cloud data transmission method, the transmission device, the point cloud data reception method, and the reception device according to the embodiments, the V-PCC bitstream may be efficiently accessed by multiplexing the V-PCC bitstream on a V-PCC unit basis. In addition, the atlas stream of the V-PCC bitstream may be effectively stored in a track in the file so as to be transmitted and received.

With the point cloud data transmission method, the transmission device, the point cloud data reception method, and the reception device according to the embodiments, a V-PCC bitstream may be divided and stored in one or multiple tracks in a file, and signaling information indicating a relationship between the multiple tracks storing store the V-PCC bitstream may be signaled. In addition, an indication for an alternative V-PCC track stored in the file may be provided. Therefore, the file of the point cloud bitstream may be efficiently stored and transmitted.

With the point cloud data transmission method, the transmission device, the point cloud data reception method, and the reception device according to the embodiments, metadata for data processing and rendering in a V-PCC bitstream may be included in the V-PCC bitstream so as to be transmitted and received. Thereby, an optimal point cloud content service may be provided.

With the point cloud data transmission method, the transmission device, the point cloud data reception method, and the reception device according to the embodiments, viewport-related information for data processing and rendering in a V-PCC bitstream may be transmitted and received through a track at a file format level. Thereby, an optimal point cloud content service may be provided.

The point cloud data transmission method, the transmission device, the point cloud data reception method, and the reception device according to the embodiments may enable a player or the like to perform spatial or partial access to a point cloud object/content based on viewport-related information. Accordingly, the point cloud bitstream may be efficiently accessed and processed according to the user viewport.

With the point cloud data transmission method, the transmission device, the point cloud data reception method, and the reception device according to the embodiments, a track or item containing point cloud data in a file may be selected based on viewport-related information, or part of the data in the track or item may be parsed and decoded or rendered. In addition, unnecessary data, that is, unnecessary operation on the point cloud data not related to the user viewport may be reduced. Thereby, parsing of the point cloud data in the file and decoding/rendering of the point cloud data may be effectively performed.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

It will be appreciated by those skilled in the art that various modifications and variations may be made in the embodiments without departing from the scope of the disclosures. Thus, it is intended that the present disclosure cover the modifications and variations of the embodiments provided they come within the scope of the appended claims and their equivalents.

Both apparatus and method disclosures are described in the present disclosure and descriptions of both the apparatus and method disclosures are complementarily applicable.

In this document, the term "I" and "," should be interpreted as indicating "and/or." For instance, the expression "A/B" may mean "A and/or B." Further, "A, B" may mean "A and/or B." Further, "AB/C" may mean "at least one of A, B, and/or C." "A, B, C" may also mean "at least one of A, B, and/or C."

Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition.

As described above, related details have been described in the best mode for carrying out the embodiments.

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

What is claimed is:

1. A point cloud data transmission method, the method comprising:
encoding, by an encoder, geometry data, attribute data and occupancy map data in point cloud data;
encapsulating, by an encapsulator, a bitstream into a file, the bitstream including the encoded geometry data, the encoded attribute data, and the encoded occupancy map data,
wherein the bitstream is composed of a sample stream header and one or more sample stream video-based data units,
wherein each sample stream video-based data unit is composed of video-based data unit size information and a video-based data unit,
wherein the sample stream header includes information for specifying a precision of the video-based data unit size information in the one or more sample stream video-based data units,
wherein the video-based data unit size information includes information for identifying a size of the video-based data unit,
wherein the video-based data unit is composed of a header and a payload,
wherein the header includes type information for identifying data included in the payload, and
wherein the data included in the payload is one of the encoded geometry data, the encoded attribute data, the encoded occupancy map data, at least one parameter set, and atlas data; and
transmitting, by a transmitter, the file,
wherein the bitstream is stored in one or more tracks of the file,
wherein the file further includes viewport-related information, and
wherein the viewport-related information includes at least (i) camera identification information for identifying viewport camera parameters and camera type information for indicating a projection type of a viewport camera, or (ii) flag information for indicating whether a position of a viewport corresponds to a center of the viewport or one of two stereo positions of the viewport.

2. The method of claim 1,
wherein the geometry data, the attribute data and the occupancy map data are encoded by a video-based point cloud compression (V-PCC) scheme.

3. The method of claim 1,
wherein the viewport-related information further includes identification information for identifying the viewport and position information of the viewport.

4. A point cloud data transmission apparatus, the apparatus comprising:
an encoder configured to encode geometry data, attribute data and occupancy map data in point cloud data;
an encapsulator configured to encapsulating a bitstream into a file, the bitstream including the encoded geometry data, the encoded attribute data and the encoded occupancy map data,
wherein the bitstream is composed of a sample stream header and one or more sample stream video-based data units,
wherein each sample stream video-based data unit is composed of video-based data unit size information and a video-based data unit,
wherein the sample stream header includes information for specifying a precision of the video-based data unit size information in the one or more sample stream video-based data units,
wherein the video-based data unit size information includes information for identifying a size of the video-based data unit,
wherein the video-based data unit is composed of a header and a payload,
wherein the header includes type information for identifying data included in the payload, and wherein the data included in the payload is one of the encoded geometry data, the encoded attribute data, the encoded occupancy map data, at least one parameter set, and atlas data; and a transmitter configured to transmit the file, wherein the bitstream is stored in one or more tracks of the file, wherein the file further includes viewport-related information, and wherein the viewport-related information includes at least camera identification information for identifying viewport camera parameters and camera type information for indicating a projection type of a viewport camera, or flag information for indicating whether a position of a viewport corresponds to a center of the viewport or one of two stereo positions of the viewport.

5. The apparatus of claim 4, wherein the point cloud data are encoded by a video-based point cloud compression (V-PCC) scheme.

6. The apparatus of claim 4, wherein the viewport-related information further includes identification information for identifying the viewport and position information of the viewport.

7. A point cloud data reception method, the method comprising:

receiving, by a receiver, a file;

decapsulating, by a decapsulator, the file into a bitstream including geometry data, attribute data and occupancy map data, wherein the bitstream is stored in one or more tracks of the file, wherein the file further includes viewport-related information, wherein the bitstream is composed of a sample stream header and one or more sample stream video-based data units, wherein each sample stream video-based data unit is composed of video-based data unit size information and a video-based data unit, wherein the sample stream header includes information for specifying a precision of the video-based data unit size information in the one or more sample stream video-based data units, wherein the video-based data unit size information includes information for identifying a size of the video-based data unit, wherein the video-based data unit is composed of a header and a payload, wherein the header includes type information for identifying data included in the payload, and wherein the data included in the payload is one of the geometry data, the attribute data, the occupancy map data, at least one parameter set, and atlas data;

decoding, by a decoder, the geometry data, the attribute data, and the occupancy map data to restore point cloud data; and rendering, by a renderer, the point cloud data based on the viewport-related information, and wherein the viewport-related information includes at least camera identification information for identifying viewport camera parameters and camera type information for indicating a projection type of a viewport camera, or flag information for indicating whether a position of a viewport corresponds to a center of the viewport or one of two stereo positions of the viewport.

8. The method of claim 7, wherein the geometry data, the attribute data and the occupancy map data are decoded by a video-based point cloud compression (V-PCC) scheme.

9. The method of claim 7, wherein the viewport-related information further includes identification information for identifying the viewport and position information of the viewport.

10. A point cloud data reception apparatus, the apparatus comprising:

a receiver configured to receive a file;

a decapsulator configured to decapsulate the file into a bitstream including geometry data, attribute data and occupancy map data, wherein the bitstream is stored in one or more tracks of the file, wherein the file further includes viewport-related information, wherein the bitstream is composed of a sample stream header and one or more sample stream video-based data units, wherein each sample stream video-based data unit is composed of video-based data unit size information and a video-based data unit, wherein the sample stream header includes information for specifying a precision of the video-based data unit size information in the one or more sample stream video-based data units, wherein the video-based data unit size information includes information for identifying a size of the video-based data unit, wherein the video-based data unit is composed of a header and a payload, wherein the header includes type information for identifying data included in the payload, and wherein the data included in the payload is one of the geometry data, the attribute data, the occupancy map data, at least one parameter set, and atlas data;

a decoder configured to decode the geometry data, the attribute data, and the occupancy map data to restore point cloud data; and a renderer configured to render the point cloud data based on the viewport-related information, and wherein the viewport-related information includes at least camera identification information for identifying viewport camera parameters and camera type information for indicating a projection type of a viewport camera, or flag information for indicating whether a position of a viewport corresponds to a center of the viewport or one of two stereo positions of the viewport.

11. The apparatus of claim 10, wherein the geometry data, the attribute data and the occupancy map data are decoded by a video-based point cloud compression (V-PCC) scheme.

12. The apparatus of claim 10, wherein the viewport-related information further includes identification information for identifying the viewport and position information of the viewport.

* * * * *